United States Patent
Deng et al.

(10) Patent No.: US 12,439,026 B2
(45) Date of Patent: *Oct. 7, 2025

(54) METHODS AND APPARATUSES FOR CROSS-COMPONENT PREDICTION

(71) Applicant: Lemon Inc., Grand Cayman (KY)

(72) Inventors: Zhipin Deng, Beijing (CN); Kai Zhang, Los Angeles, CA (US); Li Zhang, Los Angeles, CA (US)

(73) Assignee: LEMON INC., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 18/316,189

(22) Filed: May 11, 2023

(65) Prior Publication Data
US 2023/0283766 A1     Sep. 7, 2023

Related U.S. Application Data

(63) Continuation of application No. 17/157,706, filed on Jan. 25, 2021, now Pat. No. 11,683,474.

(51) Int. Cl.
| | | |
|---|---|---|
| *H04N 19/103* | (2014.01) | |
| *H04N 19/176* | (2014.01) | |
| *H04N 19/184* | (2014.01) | |
| *H04N 19/186* | (2014.01) | |

(52) U.S. Cl.
CPC ......... *H04N 19/103* (2014.11); *H04N 19/176* (2014.11); *H04N 19/184* (2014.11); *H04N 19/186* (2014.11)

(58) Field of Classification Search
CPC .. H04N 19/103; H04N 19/176; H04N 19/184; H04N 19/186
See application file for complete search history.

(56) References Cited

U.S. PATENT DOCUMENTS

| | | |
|---|---|---|
| 2018/0063527 A1 | 3/2018 | Chen et al. |
| 2020/0177911 A1 | 6/2020 | Aono et al. |
| 2020/0244956 A1* | 7/2020 | Lee ............ H04N 19/124 |
| 2020/0252619 A1 | 8/2020 | Zhang et al. |
| 2022/0038683 A1* | 2/2022 | Choi ............ H04N 19/436 |

OTHER PUBLICATIONS

ITU-T and ISO/IEC, "High efficiency video coding", Rec. ITU-T H.265 | ISO/IEC 23008-2 (in force edition).
VTM software: https://vcgit.hhi.fraunhofer.de/jvet/VVCSoftware_VTM.git.
Bross et al., "Versatile Video Coding (Draft 8)," JVET-Q2001, Jan. 2020.
Chen et al., "Algorithm description for Versatile Video Coding and Test Model 8 (VTM 8)," JVET-Q2002, Jan. 2020.

* cited by examiner

*Primary Examiner* — Nam D Pham
(74) *Attorney, Agent, or Firm* — Astute IP Law Group

(57) ABSTRACT

Example implementations include a method, apparatus and computer-readable medium of video coding, comprising receiving the code block and one or more neighbor samples and determining the value of beta based on at least one of an average chroma value, a midrange chroma value, a median chroma value, an average luma value, a midrange luma value, or a median luma value of two or more neighbor samples.

20 Claims, 46 Drawing Sheets

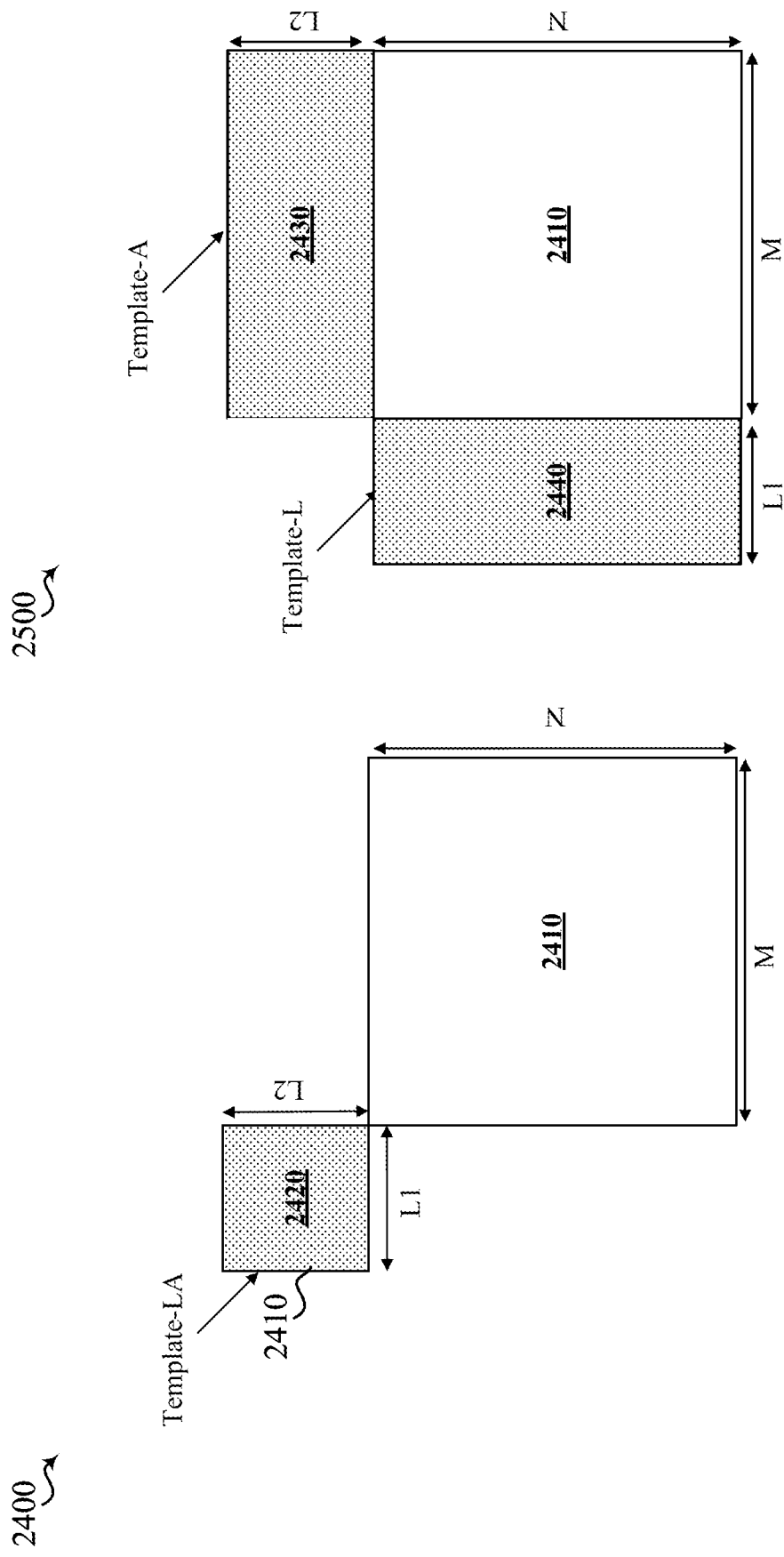

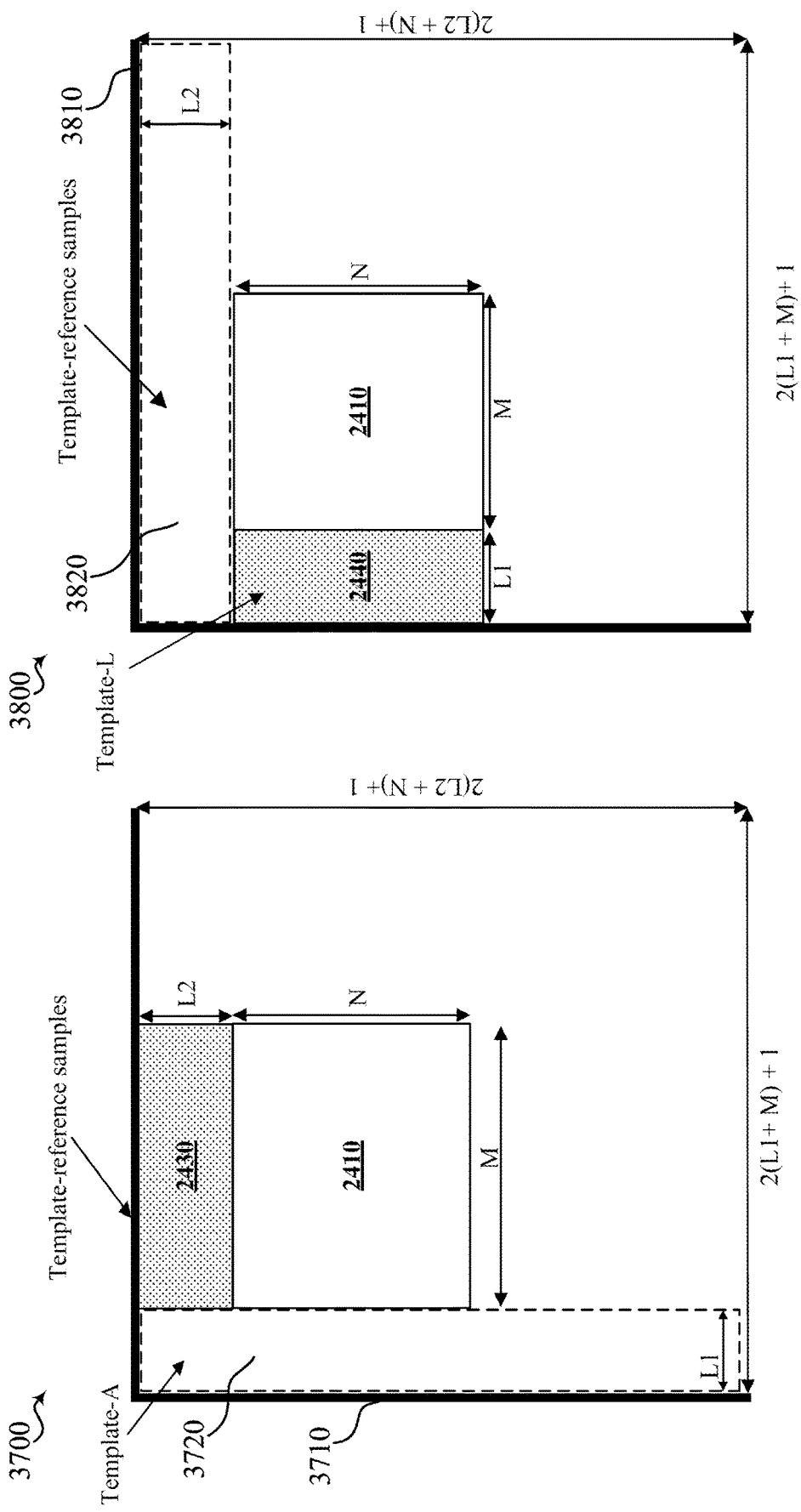

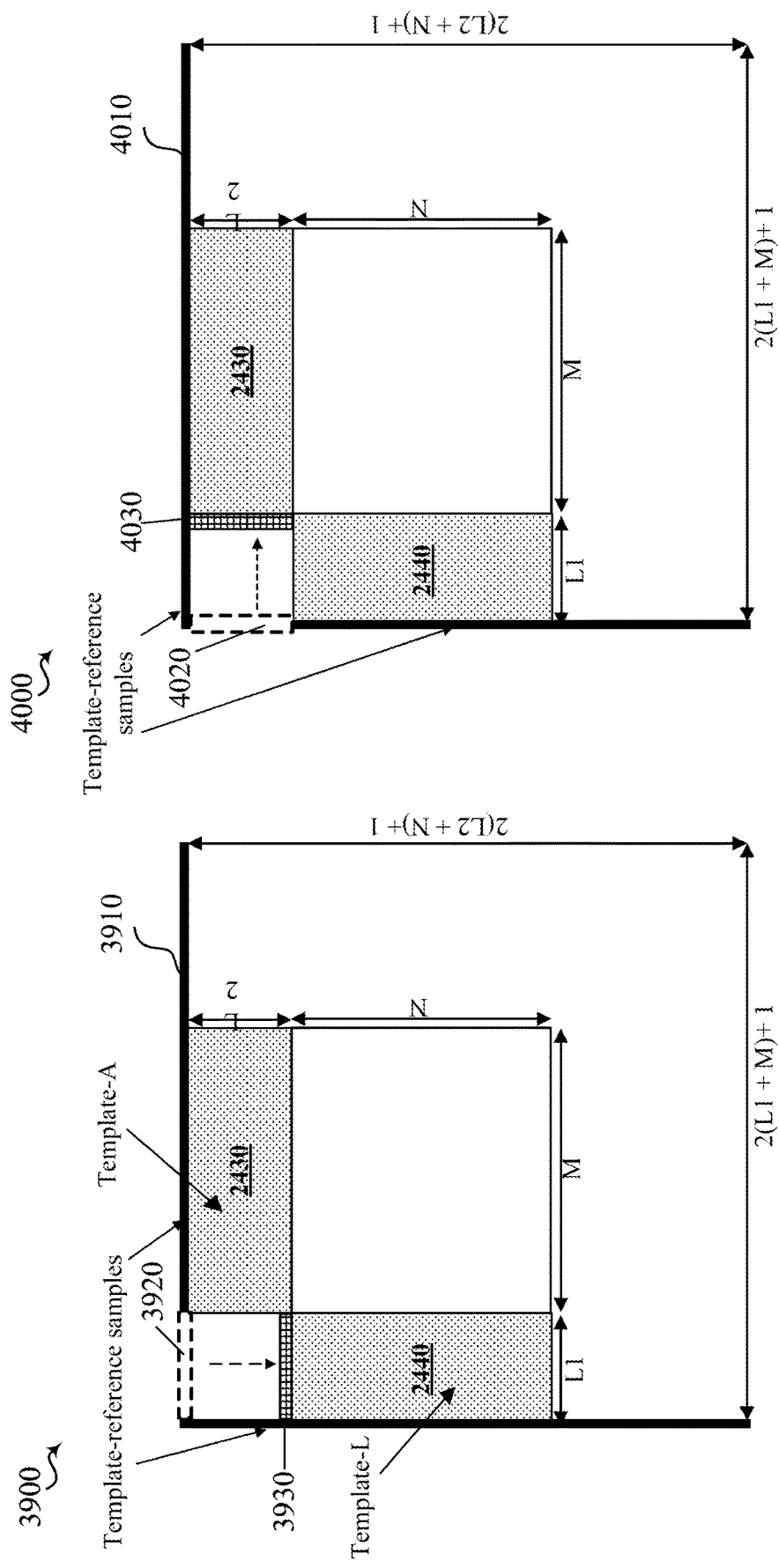

4200

4204

DETERMINING, FOR A CONVERSION BETWEEN A CURRENT VIDEO BLOCK OF A VIDEO THAT IS A CHROMA BLOCK CODED WITH A CROSS-COMPONENT PREDICTION MODE AND A BITSTREAM OF THE VIDEO, AN OFFSET PARAMETER OF A CROSS-COMPONENT PREDICTION MODEL THAT IS BASED ON A DERIVED SAMPLE VALUE FROM TWO OR MORE NEIGHBOR SAMPLES OF THE CURRENT VIDEO BLOCK

4205

PERFORMING THE CONVERSION BASED ON THE DETERMINING

DETERMINING, FOR A CONVERSION BETWEEN A CURRENT VIDEO BLOCK OF A VIDEO THAT IS A CHROMA BLOCK CODED WITH A MULTIPLE-MODEL CROSS-COMPONENT PREDICTION MODE AND A BITSTREAM OF THE VIDEO, A SCALING PARAMETER ASSOCIATED WITH A MODEL OR A GROUP IS DEPENDENT ON NEIGHBOR SAMPLES OF THE CURRENT VIDEO BLOCK ASSOCIATED WITH THE MODEL OR THE GROUP

4305

PERFORMING THE CONVERSION BASED ON THE DETERMINING

DETERMINING, FOR A CONVERSION BETWEEN A CURRENT VIDEO BLOCK OF A VIDEO THAT IS A CHROMA BLOCK CODED WITH A CROSS-COMPONENT PREDICTION MODE AND A BITSTREAM OF THE VIDEO, MODEL PARAMETERS FOR A CROSS-COMPONENT PREDICTION MODEL FOR THE CURRENT VIDEO BLOCK

4405

PERFORMING THE CONVERSION BASED ON THE DETERMINING, WHEREIN DURING THE DETERMINING, RESAMPLING MORE THAN ONE ROW OF NEIGHBOR SAMPLES OF THE CURRENT VIDEO BLOCK OR MORE THAN ONE COLUMN OF NEIGHBOR SAMPLES OF THE CURRENT VIDEO BLOCK IS APPLIED

DETERMINING, FOR A CONVERSION BETWEEN A CURRENT VIDEO BLOCK OF A VIDEO THAT IS A CHROMA BLOCK CODED WITH A CROSS-COMPONENT PREDICTION MODE AND A BITSTREAM OF THE VIDEO, MODEL PARAMETERS FOR A CROSS-COMPONENT PREDICTION MODEL FOR THE CURRENT VIDEO BLOCK

4505

PERFORMING THE CONVERSION BASED ON THE DETERMINING, WHEREIN THE MODEL PARAMETERS ARE BASED ON NEIGHBORING SAMPLES OF THE CURRENT VIDEO BLOCK, WHEREIN AT LEAST ONE OF A NUMBER OR POSITIONS OF THE NEIGHBORING SAMPLES ARE DEPENDENT ON AT LEAST ONE OF A BLOCK WIDTH OR A BLOCK HEIGHT OF THE CURRENT VIDEO BLOCK

DETERMINING, FOR A CONVERSION BETWEEN A CURRENT VIDEO BLOCK OF A VIDEO THAT IS A CHROMA BLOCK CODED WITH A CROSS-COMPONENT PREDICTION MODE AND A BITSTREAM OF THE VIDEO, MODEL PARAMETERS FOR A CROSS-COMPONENT PREDICTION MODEL FOR THE CURRENT VIDEO BLOCK

4605

PERFORMING THE CONVERSION BASED ON THE DETERMINING, WHEREIN, DURING THE DETERMINING, PERFORMING A BIT-DEPTH SHIFT OPERATION IS APPLIED

DETERMINING, FOR A CONVERSION BETWEEN A CURRENT VIDEO BLOCK OF A VIDEO THAT IS A CHROMA BLOCK CODED WITH A CROSS-COMPONENT PREDICTION MODE AND A BITSTREAM OF THE VIDEO, MODEL PARAMETERS FOR A CROSS-COMPONENT PREDICTION MODEL FOR THE CURRENT VIDEO BLOCK

4805

PERFORMING THE CONVERSION BASED ON THE DETERMINING, WHEREIN, DURING THE DETERMINING, SELECTING NEIGHBOR SAMPLES FOR A CROSS-COMPONENT PREDICTION IS APPLIED

DETERMINING, FOR A CONVERSION BETWEEN A CURRENT VIDEO BLOCK OF A VIDEO THAT IS A CHROMA BLOCK CODED WITH A CROSS-COMPONENT PREDICTION MODE AND A BITSTREAM OF THE VIDEO, MODEL PARAMETERS FOR A CROSS-COMPONENT PREDICTION MODEL FOR THE CURRENT VIDEO BLOCK

4905

PERFORMING THE CONVERSION BASED ON THE DETERMINING, WHEREIN, DURING THE DETERMINING, FILTERING NEIGHBOR SAMPLES FOR A CROSS-COMPONENT PREDICTION IS APPLIED

DETERMINING, FOR A CONVERSION BETWEEN A CURRENT VIDEO BLOCK OF A VIDEO THAT IS A CHROMA BLOCK AND A BITSTREAM OF THE VIDEO, UTILIZING ONE OR MORE MODELS FOR A CROSS-COMPONENT PREDICTION ASSOCIATED WITH A CROSS-COMPONENT PREDICTION MODE

5005

PERFORMING THE CONVERSION BASED ON THE DETERMINING

DETERMINING, FOR A CONVERSION BETWEEN A CURRENT VIDEO BLOCK OF A VIDEO THAT IS A CHROMA BLOCK AND A BITSTREAM OF THE VIDEO, A FIRST PREDICTION FOR THE CURRENT VIDEO BLOCK BASED ON A FIRST MODEL FOR A CROSS-COMPONENT PREDICTION ASSOCIATED WITH A CROSS-COMPONENT PREDICTION MODE AND A SECOND PREDICTION FOR THE CURRENT VIDEO BLOCK BASED ON A SECOND MODEL FOR A NON-CROSS-COMPONENT PREDICTION ASSOCIATED WITH A NON-CROSS-COMPONENT PREDICTION MODE

5105

PERFORMING THE CONVERSION BASED ON THE DETERMINING

GENERATING A FIRST PREDICTION BLOCK BASED ON A FIRST MODEL FOR A CROSS-COMPONENT PREDICTION ASSOCIATED WITH A CROSS-COMPONENT PREDICTION MODE

5210

GENERATING A SECOND PREDICTION BLOCK BASED ON A SECOND MODEL FOR A NON-CROSS-COMPONENT PREDICTION ASSOCIATED WITH A NON-CROSS-COMPONENT PREDICTION MODE

FIG. 52

METHODS AND APPARATUSES FOR CROSS-COMPONENT PREDICTION

CROSS-REFERENCE TO RELATED CASES

This is a continuation of U.S. patent application Ser. No. 17/157,706 entitled "METHODS AND APPARATUSES FOR CROSS-COMPONENT PREDICTION," filed on Jan. 25, 2021, the entire contents of which is hereby incorporated in its entirety.

BACKGROUND

The present disclosure relates generally to video coding, and more particularly, to performing cross-component prediction of samples in a coding block.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Aspects of the present disclosure include determining, for a conversion between a current video block of a video that is a chroma block coded with a cross-component prediction mode and a bitstream of the video, an offset parameter of a cross-component prediction model that is based on a derived sample value from two or more neighbor samples of the current video block and performing the conversion based on the determining.

Aspects of the present disclosure include determining, for a conversion between a current video block of a video that is a chroma block coded with a multiple-model cross-component prediction mode and a bitstream of the video, a scaling parameter associated with a model or a group is dependent on neighbor samples of the current video block associated with the model or the group and performing the conversion based on the determining.

Aspects of the present disclosure include determining, for a conversion between a current video block of a video that is a chroma block coded with a cross-component prediction mode and a bitstream of the video, model parameters for a cross-component prediction model for the current video block and performing the conversion based on the determining, wherein during the determining, resampling more than one row of neighbor samples of the current video block or more than one column of neighbor samples of the current video block is applied.

Aspects of the present disclosure include determining, for a conversion between a current video block of a video that is a chroma block coded with a cross-component prediction mode and a bitstream of the video, model parameters for a cross-component prediction model for the current video block, and performing the conversion based on the determining, wherein the model parameters are based on neighboring samples of the current video block, wherein at least one of a number or positions of the neighboring samples are dependent on at least one of a block width or a block height of the current video block.

Aspects of the present disclosure include determining, for a conversion between a current video block of a video that is a chroma block coded with a cross-component prediction mode and a bitstream of the video, model parameters for a cross-component prediction model for the current video block and performing the conversion based on the determining, wherein the model parameters are based on neighboring samples of the current video block, wherein at least one of a number or positions of the neighboring samples are dependent on at least one of a block width or a block height of the current video block.

Aspects of the present disclosure include determining, for a conversion between a current video block of a video that is a chroma block coded with a cross-component prediction mode and a bitstream of the video, model parameters for a cross-component prediction model for the current video block and performing the conversion based on the determining, wherein, during the determining, performing a bit-depth shift operation is applied.

Aspects of the present disclosure include determining, for a conversion between a current video block of a video that is a chroma block coded with a cross-component prediction mode and a bitstream of the video, model parameters for a cross-component prediction model for the current video block using a non-linear model and performing the conversion based on the determining.

Aspects of the present disclosure include determining, for a conversion between a current video block of a video that is a chroma block coded with a cross-component prediction mode and a bitstream of the video, model parameters for a cross-component prediction model for the current video block and performing the conversion based on the determining, wherein, during the determining, selecting neighbor samples for a cross-component prediction is applied.

Aspects of the present disclosure include determining, for a conversion between a current video block of a video that is a chroma block coded with a cross-component prediction mode and a bitstream of the video, model parameters for a cross-component prediction model for the current video block, performing the conversion based on the determining, wherein, during the determining, filtering neighbor samples for a cross-component prediction is applied.

Aspects of the present disclosure include determining, for a conversion between a current video block of a video that is a chroma block and a bitstream of the video, utilizing one or more models for a cross-component prediction associated with a cross-component prediction mode and performing the conversion based on the determining and performing the conversion based on the determining.

Aspects of the present disclosure include determining, for a conversion between a current video block of a video that is a chroma block and a bitstream of the video, a first prediction for the current video block based on a first model for a cross-component prediction associated with a cross-component prediction mode and a second prediction for the current video block based on a second model for a non-cross-component prediction associated with a non-cross-component prediction mode and performing the conversion based on the determining.

To the accomplishment of the foregoing and related ends, the one or more aspects include the features hereinafter fully described and particularly pointed out in the claims. The following description and the annexed drawings set forth in detail some illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 24 is a diagram of an example template including a left-above sub-template in accordance with some aspects of the present disclosure.

FIG. 25 is a diagram of an example template including a left sub-template and an above sub-template in accordance with some aspects of the present disclosure.

FIG. 37 is a diagram of example template-reference samples with a horizontal gap for a template including an above sub-template in accordance with some aspects of the present disclosure.

FIG. 38 is a diagram of example template-reference samples with a vertical gap for a template including an above sub-template in accordance with some aspects of the present disclosure.

FIG. 39 is a diagram of example template-reference samples with a vertically shifted portion for a template in accordance with some aspects of the present disclosure.

FIG. 40 is a diagram of example template-reference samples with a horizontally shifted portion for a template in accordance with some aspects of the present disclosure.

FIG. 42 is a flowchart of a first example method of deriving beta in accordance with some aspects of the present disclosure.

FIG. 43 is a flowchart of a second example method of deriving beta in accordance with some aspects of the present disclosure FIG. 44 is a flowchart of a first example method of cross-component prediction in accordance with some aspects of the present disclosure.

FIG. 45 is a flowchart of a second example method of cross-component prediction in accordance with some aspects of the present disclosure.

FIG. 46 is a flowchart of a third example method of cross-component prediction in accordance with some aspects of the present disclosure.

FIG. 48 is a flowchart of a fifth example method of cross-component prediction in accordance with some aspects of the present disclosure.

FIG. 49 is a flowchart of a first example method of neighbor selection in accordance with some aspects of the present disclosure.

FIG. 50 is a flowchart of a second example method of neighbor selection in accordance with some aspects of the present disclosure.

FIG. 51 is a flowchart of an example method of multi-model cross-component prediction in accordance with some aspects of the present disclosure.

FIG. 52 is a flowchart of an example method of integrating models for cross-component prediction with non-cross-component prediction models in accordance with some aspects of the present disclosure.

DETAILED DESCRIPTION

Figure 1:
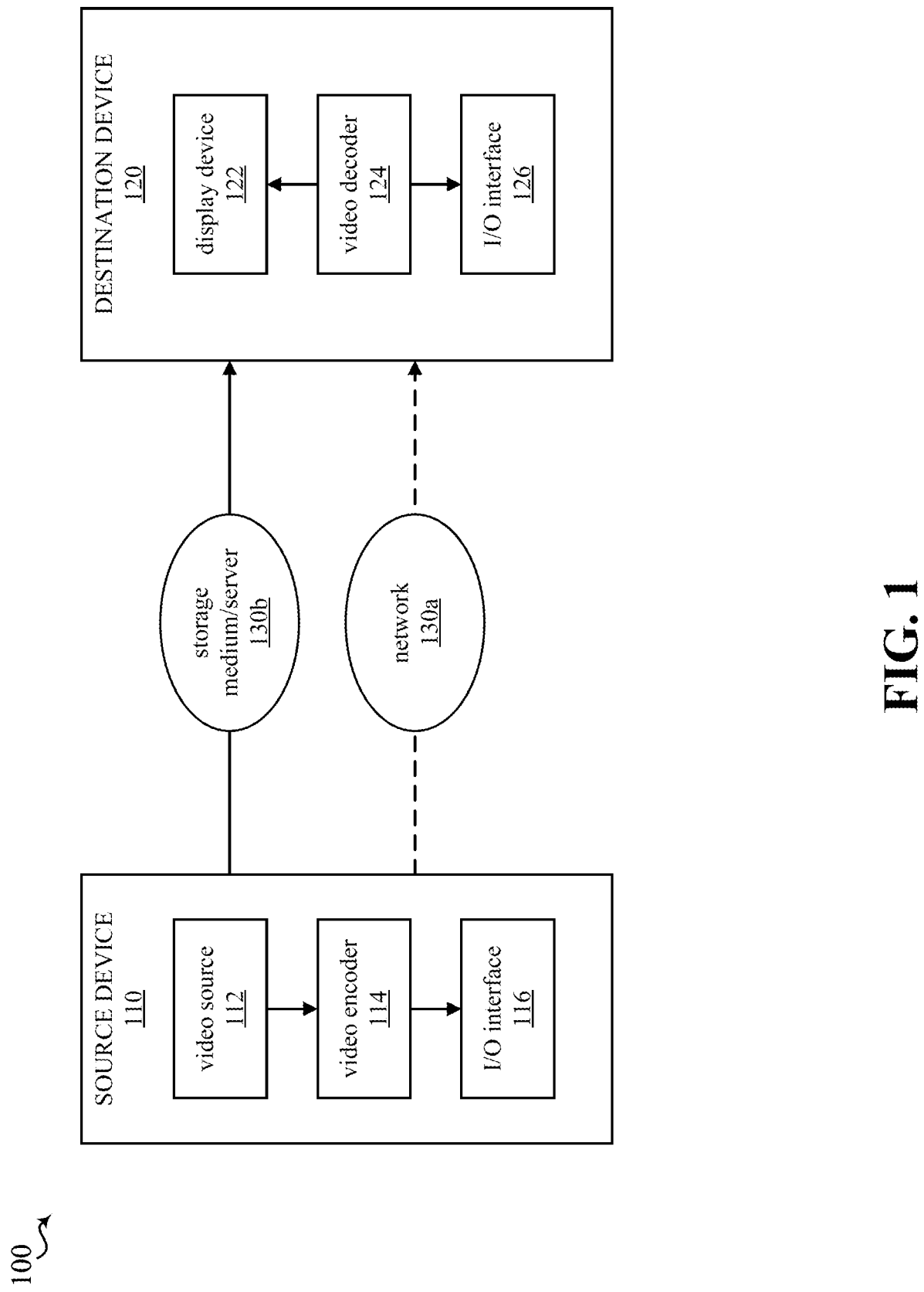
FIG. 1 is a block diagram that illustrates an example of a video coding system, in accordance with some aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to a person having ordinary skill in the art that these concepts may be practiced without these specific details. In some instances, structures and components are shown in block diagram form in order to avoid obscuring such concepts.

Several aspects of video coding and decoding will now be presented with reference to various apparatus and methods. These apparatus and methods will be described in the following detailed description and illustrated in the accompanying drawings by various blocks, components, circuits, processes, algorithms, among other examples (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, among other examples, whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

The present aspects generally relates to cross-component prediction (CCP). In conventional video encoding/decoding, two parameters, i.e., alpha and beta, are derived for a linear model of CCP. The derivation of beta is based on the minimum luma value and its associated chroma value from neighbor samples. An aspect of the present disclosure includes deriving beta using one or more methods discussed below. Another aspect of the present disclosure includes using other models, including non-linear models, to derive alpha and/or beta as discussed below. In some aspects of the present disclosure, methods for selecting neighbors used in models for CCP are discussed below. In an aspect of the present disclosure, methods for using CCP models in combination with non-CCP models may be implemented for CCP.

FIG. 1 is a block diagram that illustrates an example of a video coding system 100 that may utilize the techniques of this disclosure. As shown in FIG. 1, video coding system 100 may include a source device 110 and a destination device 120. The source device 110, which may be referred to as a video encoding device, may generate encoded video data. The destination device 120, which may be referred to as a video decoding device, may decode the encoded video data generated by the source device 110. The source device 110 may include a video source 112, a video encoder 114, and an input/output (I/O) interface 116.

The video source 112 may include a source such as a video capture device, an interface to receive video data from a video content provider, and/or a computer graphics system for generating video data, or a combination of such sources. The video data may comprise one or more pictures or images. The terms "picture," "image," or "frame" can be used interchangeably throughout to refer to a single image in a stream of images that produce a video. The video encoder 114 encodes the video data from the video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures.

The I/O interface 116 may include a modulator/demodulator (modem) and/or a transmitter, a bus, or substantially any mechanism that facilitates transfer of data between devices or within a computing device that may include both the source device 110 and destination device 120 (e.g., where the computing device stores the encoded video generated using functions of the source device 110 for display using functions of the destination device 120). In one example, the encoded video data may be transmitted directly to destination device 120 via the I/O interface 116 through the network 130a. The encoded video data may also be stored onto a storage medium/server 130b for access by destination device 120.

The destination device 120 may include an I/O interface 126, a video decoder 124, and a display device 122. The I/O interface 126 may include a receiver and/or a modem, a bus, or substantially any mechanism that facilitates transfer of data between devices or within a computing device. The I/O interface 126 may acquire encoded video data from the source device 110 or the storage medium/server 130b. The video decoder 124 may decode the encoded video data. The display device 122 may display the decoded video data to a user. The display device 122 may be integrated with the destination device 120, or may be external to the destination device 120 which be configured to interface with an external display device.

The video encoder 114 and the video decoder 124 may operate according to a video compression standard, such as the HEVC standard, VVC standard and other current and/or further standards.

Figure 2:
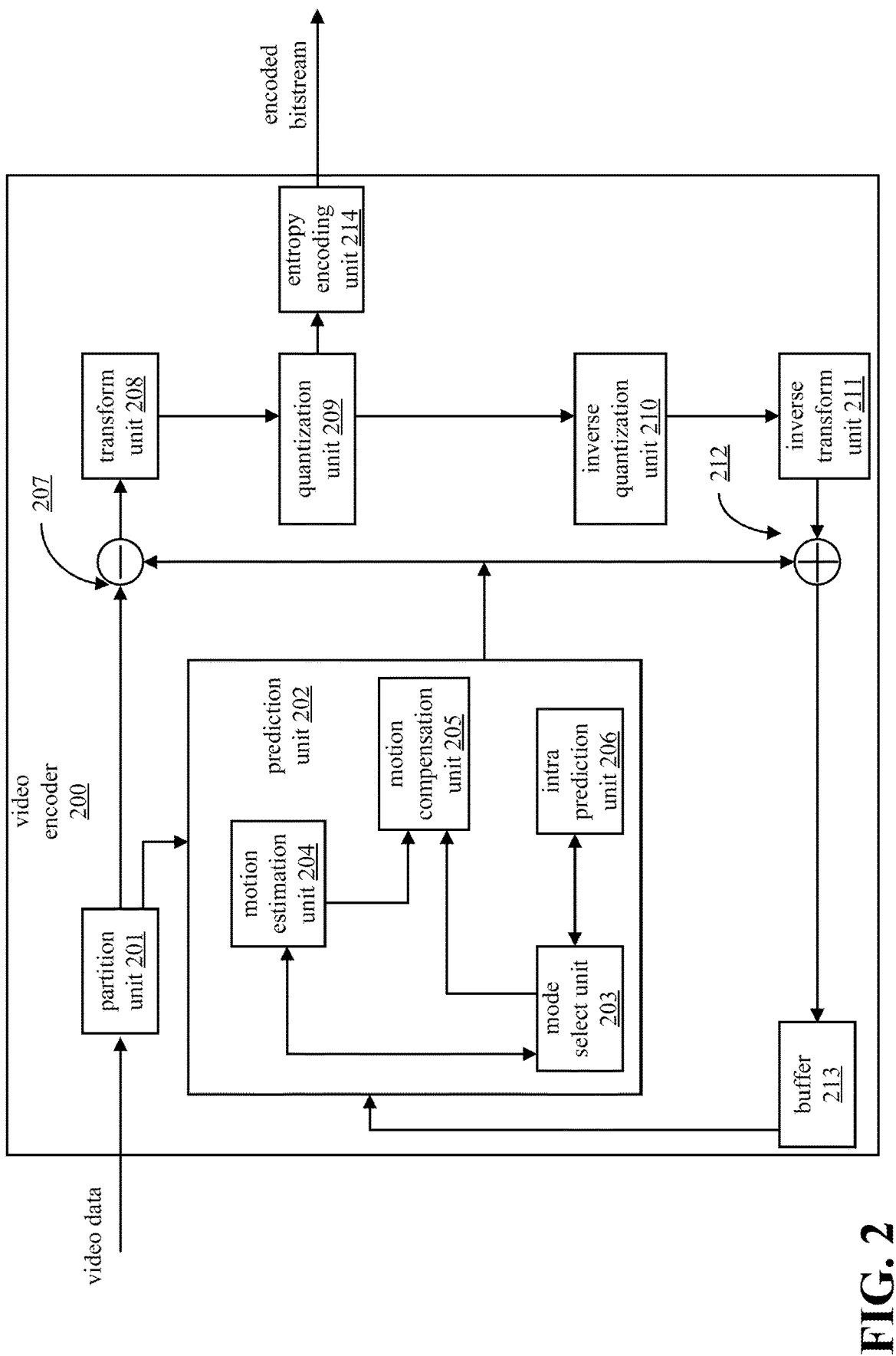
FIG. 2 is a block diagram that illustrates a first example of a video encoder, in accordance with some aspects of the present disclosure.

FIG. 2 is a block diagram illustrating an example of a video encoder 200, which may be an example of the video encoder 114 in the system 100 illustrated in FIG. 1, in accordance with some aspects of the present disclosure.

The video encoder 200 may be configured to perform any or all of the techniques of this disclosure. In the example of FIG. 2, the video encoder 200 includes a plurality of functional components. The techniques described in this disclosure may be shared among the various components of the video encoder 200. In some examples, a processor may be configured to perform any or all of the techniques described in this disclosure, including those of video encoder 200.

The functional components of video encoder 200 may include one or more of a partition unit 201, a prediction unit 202 which may include a mode select unit 203, a motion estimation unit 204, a motion compensation unit 205 and an intra-prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, the video encoder 200 may include more, fewer, or different functional components. In an example, the prediction unit 202 may include an intra block copy (IBC) unit. The IBC unit may perform prediction in an IBC mode in which at least one reference picture is a picture where the current video block is located.

Furthermore, some components, such as the motion estimation unit 204 and the motion compensation unit 205, may be highly integrated, but are separately represented in the example of FIG. 2 for purposes of explanation.

The partition unit 201 may partition a picture into one or more video blocks. The video encoder 200 and the video decoder 300 may support various video block sizes.

The mode select unit 203 may select one of the coding modes, intra or inter, e.g., based on error results, and provide the resulting intra- or inter-coded block to at least one of a residual generation unit 207 to generate residual block data and to a reconstruction unit 212 to reconstruct the encoded block for use as a reference picture. In some examples, the mode select unit 203 may select a combination of intra- and inter-prediction (CIIP) mode in which the prediction is based on an inter-prediction signal and an intra-prediction signal. The mode select unit 203 may also select a resolution for a motion vector (e.g., a sub-pixel or integer pixel precision) for the block in the case of inter-prediction.

To perform inter-prediction on a current video block, the motion estimation unit 204 may generate motion information for the current video block by comparing one or more reference frames from buffer 213 to the current video block. In an example, each reference frame can correspond to a picture of the video. The motion compensation unit 205 may determine a predicted video block for the current video block based on the motion information and decoded samples of pictures from the buffer 213 other than the picture associated with the current video block.

The motion estimation unit 204 and the motion compensation unit 205 may perform different operations for a current video block, for example, depending on whether the current video block is in an I-slice, a P-slice, or a B-slice. As used herein, in some aspects, an "I-slice" may refer to a portion of a picture composed of macroblocks, all of which are based upon macroblocks within the same picture. Further, as used herein, in some aspects, "P-slices" and "B-slices" may refer to portions of a picture composed of macroblocks that are not dependent on macroblocks in the same picture.

In some examples, the motion estimation unit 204 may perform uni-directional prediction for the current video block, and the motion estimation unit 204 may search reference pictures of list 0 or list 1 for a reference video block for the current video block. The motion estimation unit 204 may then generate a reference index that indicates the reference picture in list 0 or list 1 that contains the reference video block and a motion vector that indicates a spatial displacement between the current video block and the reference video block. The motion estimation unit 204 may output the reference index, a prediction direction indicator, and the motion vector as the motion information of the current video block. The motion compensation unit 205 may generate the predicted video block of the current block based on the reference video block indicated by the motion information of the current video block.

In other examples, the motion estimation unit 204 may perform bi-directional prediction for the current video block, where the motion estimation unit 204 may search the reference pictures in list 0 for a reference video block for the current video block and may also search the reference pictures in list 1 for another reference video block for the current video block. The motion estimation unit 204 may then generate reference indexes that indicate the reference pictures in list 0 and list 1 containing the reference video blocks and motion vectors that indicate spatial displacements between the reference video blocks and the current video block. The motion estimation unit 204 may output the reference indexes and the motion vectors of the current video block as the motion information of the current video block. The motion compensation unit 205 may generate the predicted video block of the current video block based on the reference video blocks indicated by the motion information of the current video block.

In some examples, the motion estimation unit 204 may output a full set of motion information for decoding processing of a decoder.

In some examples, the motion estimation unit 204 may not output a full set of motion information for the current video. Rather, the motion estimation unit 204 may signal the motion information of the current video block with reference to the motion information of another video block. For example, the motion estimation unit 204 may determine that the motion information of the current video block is sufficiently similar to the motion information of a neighboring video block.

In one example, the motion estimation unit 204 may indicate, in a syntax structure associated with the current video block, a value that indicates to the video decoder 300 that the current video block has the same motion information as the another video block.

In another example, the motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector prediction (AMVP) and merge mode signaling.

The intra-prediction unit 206 may perform intra-prediction on the current video block. When the intra-prediction unit 206 performs intra-prediction on the current video block, the intra-prediction unit 206 may generate prediction data for the current video block based on decoded samples of other video blocks in the same picture. The prediction data for the current video block may include at least one of a predicted video block or one or more syntax elements.

The residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and the residual generation unit 207 may not perform the subtracting operation.

The transform processing unit 208 may generate one or more transform coefficient video blocks for the current video block by applying one or more transforms to a residual video block associated with the current video block.

After the transform processing unit 208 generates a transform coefficient video block associated with the current video block, the quantization unit 209 may quantize the transform coefficient video block associated with the current video block based on one or more quantization parameter (QP) values associated with the current video block.

The inverse quantization unit 210 and the inverse transform unit 211 may apply inverse quantization and inverse transforms to the transform coefficient video block, respectively, to reconstruct a residual video block from the transform coefficient video block. The reconstruction unit 212 may add the reconstructed residual video block to corresponding samples from one or more predicted video blocks generated by the prediction unit 202 to produce a reconstructed video block associated with the current block for storage in the buffer 213.

After the reconstruction unit 212 reconstructs the video block, loop filtering operation may be performed to reduce video blocking artifacts in the video block.

The entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 3:
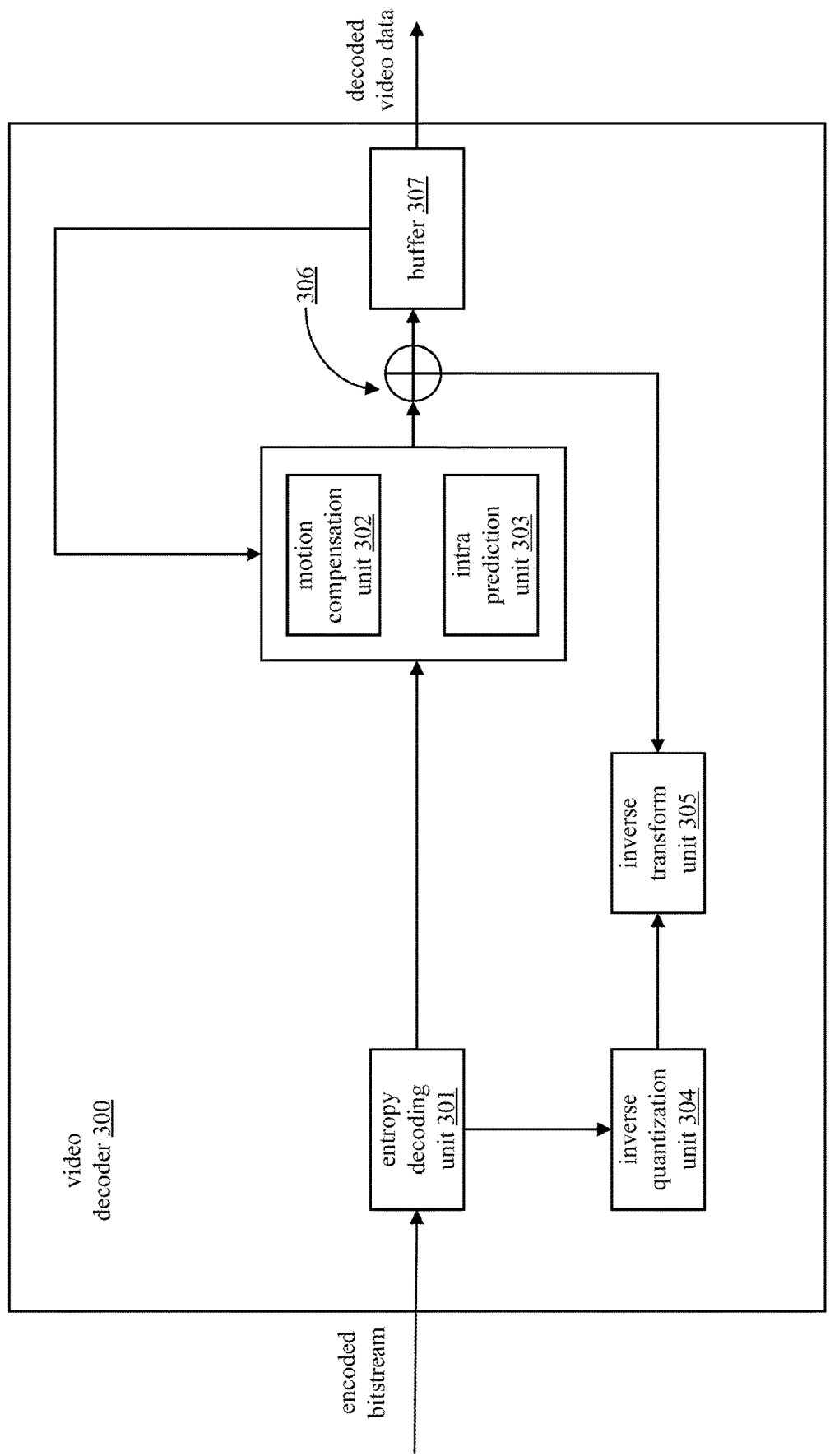
FIG. 3 is a block diagram that illustrates an example of a video decoder, in accordance with some aspects of the present disclosure.

FIG. 3 is a block diagram illustrating an example of video decoder 300, which may be an example of the video decoder 124 in the system 100 illustrated in FIG. 1, in accordance with some aspects of the present disclosure.

The video decoder 300 may be configured to perform any or all of the techniques of this disclosure. In the example of FIG. 3, the video decoder 300 includes a plurality of functional components. The techniques described in this disclosure may be shared among the various components of the video decoder 300. In some examples, a processor may be configured to perform any or all of the techniques described in this disclosure, including those of video decoder 300.

In the example of FIG. 3, the video decoder 300 includes one or more of an entropy decoding unit 301, a motion compensation unit 302, an intra-prediction unit 303, an inverse quantization unit 304, an inverse transformation unit 305, a reconstruction unit 306, and a buffer 307. The video decoder 300 may, in some examples, perform a decoding pass generally reciprocal to the encoding pass described with respect to video encoder 200 (FIG. 2).

The video decoder 300 may receive, via the entropy decoding unit 301 or otherwise, an encoded bitstream. The encoded bitstream may include entropy coded video data (e.g., encoded blocks of video data). In this example, the entropy decoding unit 301 may decode the entropy coded video data. Based on the decoded video data, whether entropy decoded or otherwise, the motion compensation unit 302 may determine motion information including motion vectors, motion vector precision, reference picture list indexes, and other motion information. The motion compensation unit 302 may, for example, determine such information by performing the AMVP and merge mode. AMVP may be used, including derivation of several most probable candidates based on data from adjacent PBs and the reference picture. Motion information typically includes the horizontal and vertical motion vector displacement values, one or two reference picture indices, and, in the case of prediction regions in B slices, an identification of which reference picture list is associated with each index. As used herein, in some aspects, a "merge mode" may refer to deriving the motion information from spatially or temporally neighboring blocks.

The motion compensation unit 302 may produce motion compensated blocks, possibly performing interpolation based on interpolation filters. Identifiers for interpolation filters to be used with sub-pixel precision may be included in syntax elements received with the encoded bitstream or in separate assistance information, e.g., as specified by a video encoder when encoding the video.

The motion compensation unit 302 may use interpolation filters as used by video encoder 200 during encoding of the video block to calculate interpolated values for sub-integer pixels of a reference block. The motion compensation unit 302 may determine the interpolation filters used by video encoder 200 according to received syntax information and use the interpolation filters to produce predictive blocks.

The motion compensation unit 302 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence. As used herein, in some aspects, a "slice" may refer to a data structure that can be decoded independently from other slices of the same picture, in terms of entropy coding, signal prediction, and residual signal reconstruction. A slice can either be an entire picture or a region of a picture.

The intra-prediction unit 303 may use intra-prediction modes for example received in the bitstream to form a prediction block from spatially adjacent blocks. Intra-prediction can be referred to herein as "intra," and/or intra-prediction modes can be referred to herein as "intra modes" The inverse quantization unit 304 inverse quantizes, i.e., de-quantizes, the quantized video block coefficients provided in the bitstream and decoded by entropy decoding unit 301. Inverse transform unit 305 applies an inverse transform.

The reconstruction unit 306 may sum the residual blocks with the corresponding prediction blocks generated by motion compensation unit 202 or intra-prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra-prediction and also produces decoded video for presentation on a display device.

Although the following description may be focused on High Efficiency Video Coding (HEVC), and/or the standard Versatile Video Coding (VVC), the concepts described herein may be applicable to other coding standards or video codec.

Figure 4:
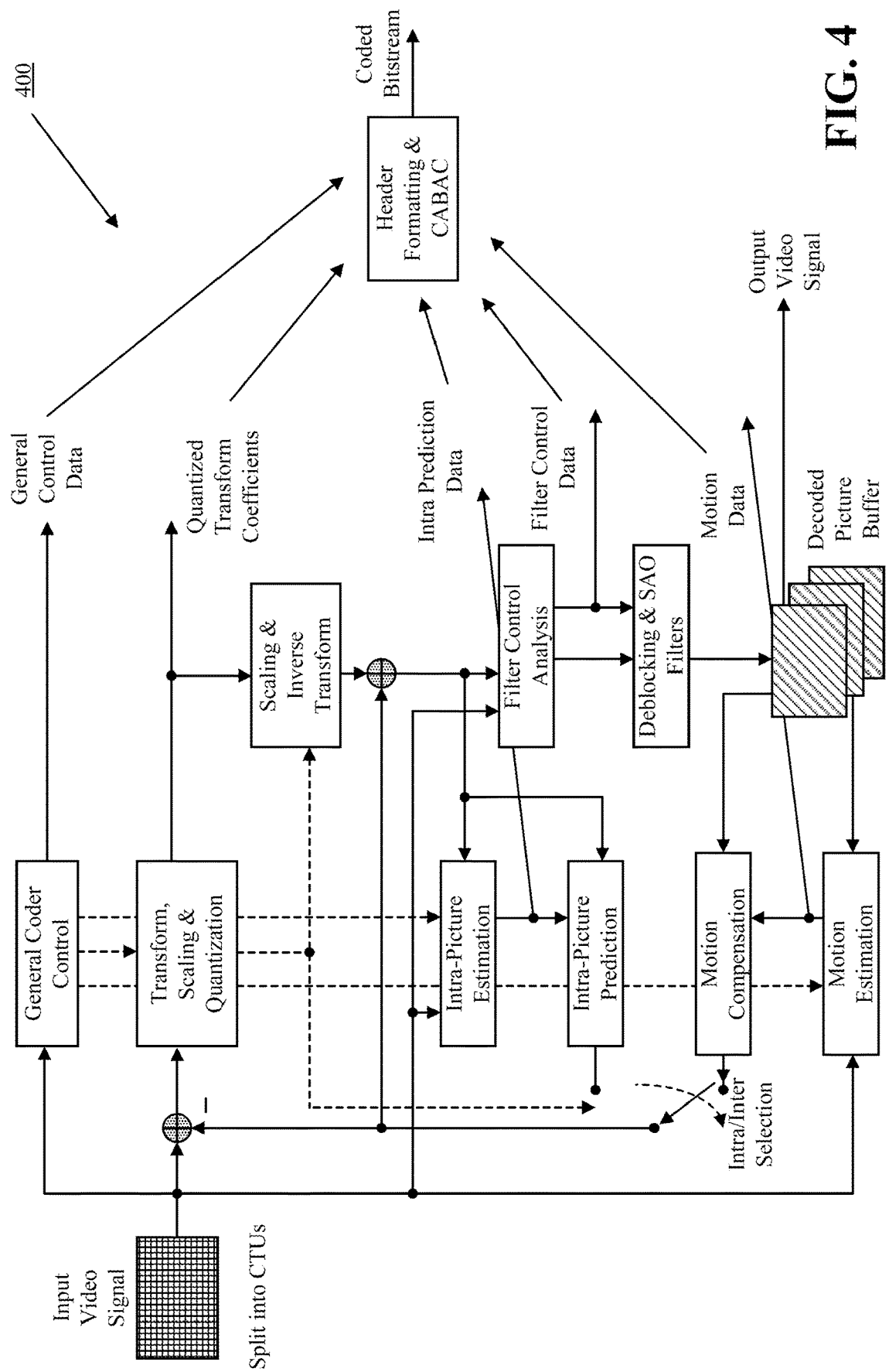
FIG. 4 is a block diagram that illustrates a second example of a video encoder, in accordance with some aspects of the present disclosure.

FIG. 4 shows an example of a block diagram of a HEVC video encoder and decoder 400, which may be the video encoder 114 and video decoder 124 in the system 100 illustrated in FIG. 1, video encoder 200 in FIG. 2 and video decoder 300 in FIG. 3, etc., in accordance with some aspects of the present disclosure. The encoding algorithm for generating HEVC-compliant bitstreams may proceed as follows. Each picture can be divided into block regions (e.g., coding tree units (CTUs)), and the precise block division may be transmitted to the decoder. A CTU consists of a luma coding tree block (CTB) and the corresponding chroma CTBs and syntax elements. The size L×L of a luma CTB can be chosen as L=16, 32, or 64 samples, where the larger sizes can enable higher compression. HEVC then supports a partitioning of the CTBs into smaller blocks using a tree structure and quadtree-like signaling. The quadtree syntax of the CTU specifies the size and positions of its luma and chroma CBs. The root of the quadtree is associated with the CTU. Hence, the size of the luma CTB is the largest supported size for a luma CB. The splitting of a CTU into luma and chroma CBs may be jointly signaled. One luma CB and ordinarily two chroma CBs, together with associated syntax, form a coding unit (CU). A CTB may contain only one CU or may be split to form multiple CUs, and each CU has an associated partitioning into prediction units (PUs) and a tree of transform units (TUs).

The first picture of the video sequence (and/or the first picture at each clean random access point that enters the video sequence) can use only intra-picture prediction, which uses region-to-region spatial data prediction within the same picture, but does not rely on other pictures to encode the first picture. For the remaining pictures between sequential or random access points, the inter-picture temporal prediction coding mode may be used for most blocks. The encoding process for inter-picture prediction includes selecting motion data including a selected reference picture and a motion vector (MV) to be applied to predict samples of each block.

The decision whether to code a picture area using inter-picture or intra-picture prediction can be made at the CU level. A PU partitioning structure has its root at the CU level. Depending on the basic prediction-type decision, the luma and chroma CBs can then be further split in size and predicted from luma and chroma prediction blocks (PBs). HEVC supports variable PB sizes from 64×64 down to 4×4 samples. The prediction residual is coded using block transforms. A TU tree structure has its root at the CU level. The luma CB residual may be identical to the luma transform block (TB) or may be further split into smaller luma TBs. The same applies to the chroma TBs.

The encoder and decoder may apply motion compensation (MC) by using MV and mode decision data to generate the same inter-picture prediction signal, which is transmitted as auxiliary information. The residual signal of intra-picture or inter-picture prediction can be transformed by linear spatial transformation, which is the difference between the original block and its prediction. Then the transform coefficients can be scaled, quantized, entropy encoded, and transmitted together with the prediction information.

The encoder can duplicate the decoder processing loop so that both can generate the same prediction for subsequent data. Therefore, the quantized transform coefficients can be constructed by inverse scaling, and then can be inversely transformed to replicate the decoding approximation of the residual signal. The residual can then be added to the prediction, and the result of this addition can then be fed into one or two loop filters to smooth the artifacts caused by block-by-block processing and quantization. The final picture representation (i.e., the copy output by the decoder) can be stored in the decoded picture buffer for prediction of subsequent pictures. In general, the order of encoding or decoding processing of pictures may be different from the order in which they arrive from the source. As such, in some examples, it may be necessary to distinguish between the decoding order of the decoder (that is, the bit stream order) and the output order (that is, the display order).

Video material encoded by HEVC can be input as a progressive image (e.g., because the source video originates from this format or is generated by de-interlacing before encoding). There is no explicit coding feature in the HEVC design to support the use of interlaced scanning, because interlaced scanning is no longer used for displays and becomes very uncommon for distribution. However, metadata syntax has been provided in HEVC to allow the encoder to indicate that it has been sent by encoding each area of the interlaced video (i.e., even or odd lines of each video frame) into a separate picture interlaced video, or by encoding each interlaced frame as a HEVC encoded picture to indicate that it has been sent. This can provide an effective method for encoding interlaced video without the need to support special decoding processes for it.

Figure 5:
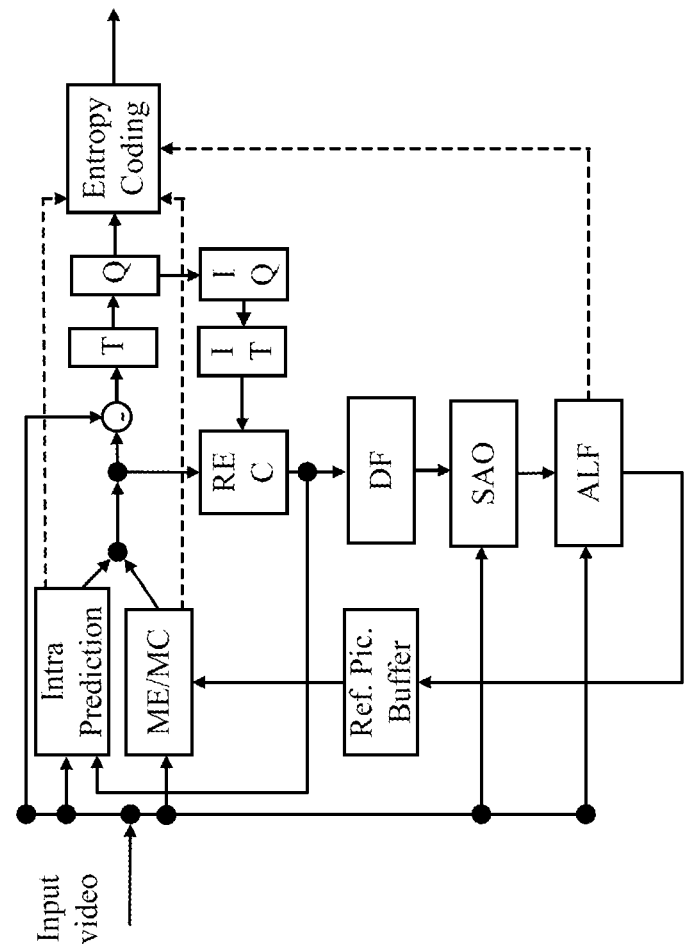
FIG. 5 is an example of an encoder block diagram of versatile video coding (VVC) in accordance with some aspects of the present disclosure.

FIG. 5 is an example of an encoder block diagram 500 of VVC, which can include multiple in-loop filtering blocks:

e.g., deblocking filter (DF), sample adaptive offset (SAO) adaptive loop filter (ALF), etc. Unlike DF, which uses predefined filters, SAO and ALF may utilize the original samples of the current picture to reduce the mean square errors between the original samples and the reconstructed samples by adding an offset and by applying a finite impulse response (FIR) filter, respectively, with coded side information signaling the offsets and filter coefficients. ALF may be located at the last processing stage of each picture and can be regarded as a tool to catch and fix artifacts created by the previous stages.

Figure 6:
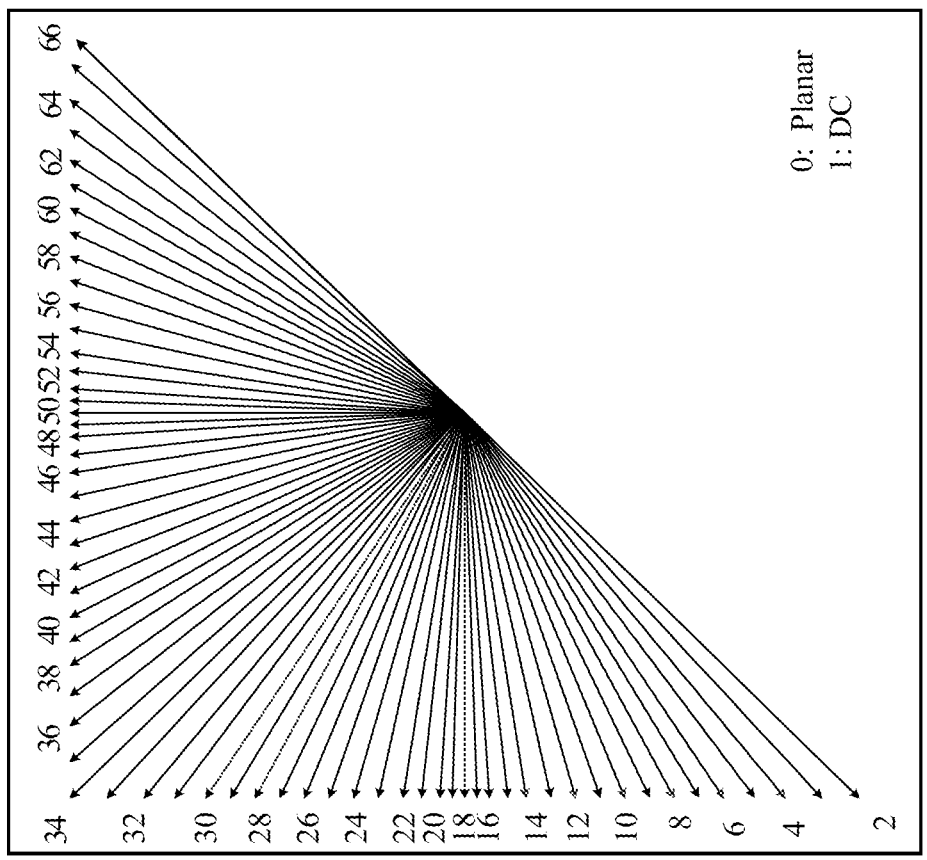
FIG. 6 is a schematic diagram of intra mode coding with 67 intra-prediction modes to capture the arbitrary edge directions presented in natural video in accordance with some aspects of the present disclosure.

FIG. 6 is a schematic diagram 600 of intra-prediction mode coding with 67 intra-prediction modes to capture the arbitrary edge directions presented in natural video. In some examples, the number of directional intra modes may be extended from 33, as used in HEVC, to 65 while the planar and the DC modes remain the same.

In some examples, the denser directional intra-prediction modes may apply for the block sizes and for both luma and chroma intra-predictions. In the HEVC, every intra-prediction mode coded block may include a square shape (e.g., a coded block of size N×N) and the length of each of its side may be a power of 2 (e.g., where N is a power of 2). Thus, no division operations are required to generate an intra-predictor using DC mode. In VVC, blocks can have a rectangular shape that may necessitate the use of a division operation per block in the general case. To avoid division operations for DC prediction, the longer side may be used to compute the average for non-square blocks.

Although 67 modes are defined in the VVC, the exact prediction direction for a given intra-prediction mode index may be further dependent on the block shape. Conventional angular intra-prediction directions are defined from 45 degrees to −135 degrees in clockwise direction. In VVC, several conventional angular intra-prediction modes may be adaptively replaced with wide-angle intra-prediction modes for non-square blocks. The replaced modes may be signaled using the original mode indexes, which are remapped to the indexes of wide angular modes after parsing. In some examples, the total number of intra-prediction modes may be unchanged, i.e., 67, and the intra mode coding method may also be unchanged.

Figure 7:
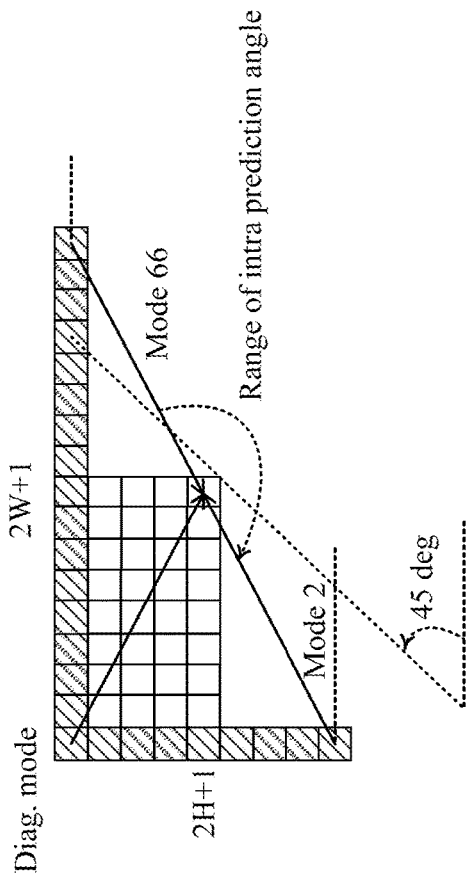
FIGS. 7 and 8 are reference example diagrams of wide-angular intra-prediction in accordance with some aspects of the present disclosure.
Figure 8:
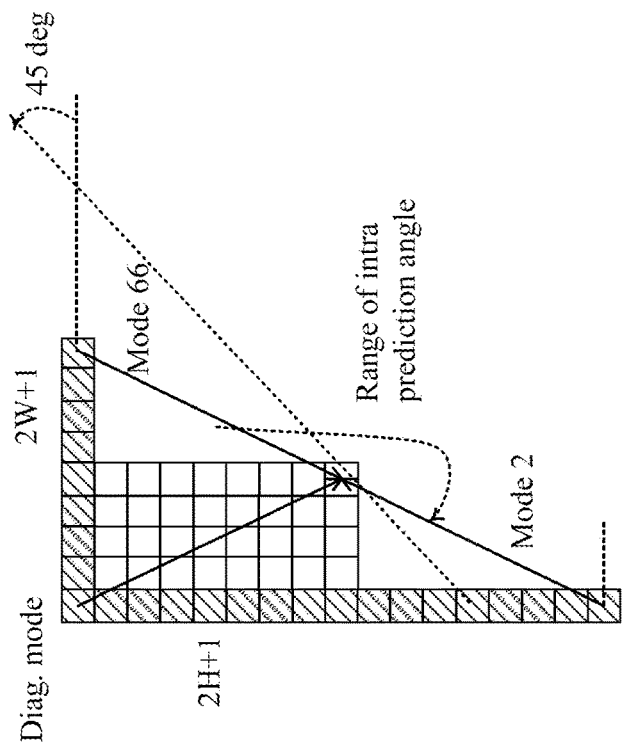

FIGS. 7 and 8 are reference example diagrams 700 and 800 of wide-angular intra-prediction. In some examples, the number of replaced modes in wide-angular direction mode may depend on the aspect ratio of a block. The replaced intra-prediction modes are illustrated in Table 1:

TABLE 1

Intra-prediction modes replaced by wide-angular modes

| Aspect ratio | Replaced intra-prediction modes |
| --- | --- |
| W/H == 16 | Modes 2, 3, 4, 5, 6, 7, 8, 9, 10, 11, 12, 13, 14, 15 |
| W/H == 8 | Modes 2, 3, 4, 5, 6, 7, 8, 9, 10, 11, 12, 13 |
| W/H == 4 | Modes 2, 3, 4, 5, 6, 7, 8, 9, 10, 11 |
| W/H == 2 | Modes 2, 3, 4, 5, 6, 7, 8, 9 |
| W/H == 1 | None |
| W/H == 1/2 | Modes 59, 60, 61, 62, 63, 64, 65, 66 |
| W/H == 1/4 | Mode 57, 58, 59, 60, 61, 62, 63, 64, 65, 66 |
| W/H == 1/8 | Modes 55, 56, 57, 58, 59, 60, 61, 62, 63, 64, 65, 66 |
| W/H == 1/16 | Modes 53, 54, 55, 56, 57, 58, 59, 60, 61, 62, 63, 64, 65, 66 |

Figure 9:
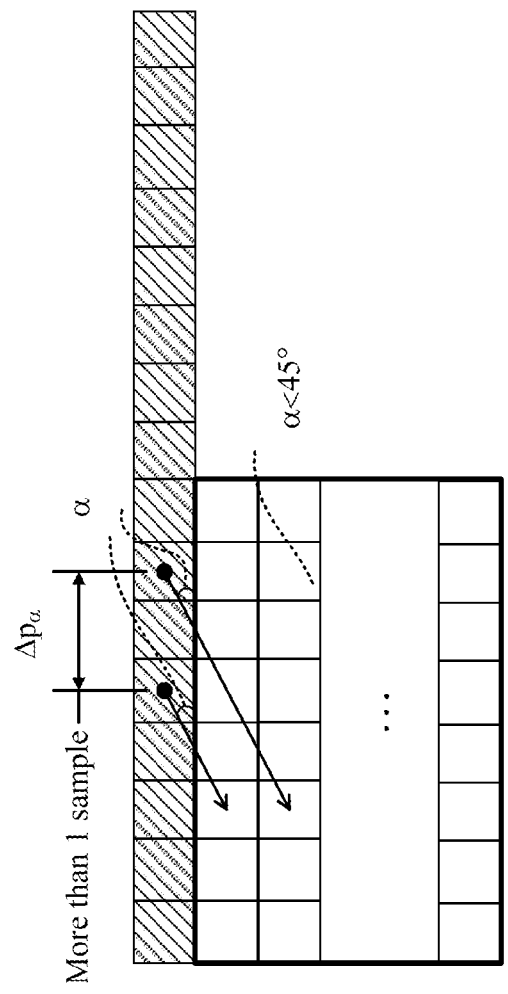
FIG. 9 is a diagram of discontinuity in case of directions that exceed 45° angle in accordance with some aspects of the present disclosure.

FIG. 9 is a diagram 900 of discontinuity in case of directions that exceed 45° angle. In such instance, two vertically adjacent predicted samples may use two non-adjacent reference samples in the case of wide-angle intra-prediction. Hence, low-pass reference samples filter and side smoothing may be applied to the wide-angle prediction to reduce the negative effect of the increased gap $\Delta p_\alpha$. If a wide-angle mode represents a non-fractional offset, there may be 8 modes in the wide-angle modes satisfy this condition, which are [−14, −12, −10, −6, 72, 76, 78, 80]. When a block is predicted by these modes, the samples in the reference buffer can be directly copied without applying any interpolation. With this modification, the number of samples to be smoothed may be reduced.

In VVC, 4:2:2 and 4:4:4 chroma formats are supported as well as 4:2:0. Chroma derived mode (DM) derivation table for 4:2:2 chroma format was initially ported from HEVC extending the number of entries from 35 to 67 to align with the extension of intra-prediction modes. As HEVC specification does not support prediction angle below −135 degree and above 45 degree, luma intra-prediction modes ranging from 2 to 5 may be mapped to 2. Therefore, chroma DM derivation table for 4:2:2: chroma format can be updated by replacing some values of the entries of the mapping table to convert prediction angle more precisely for chroma blocks.

In some aspects, for each inter-predicted CU, motion parameters consisting of motion vectors, reference picture indices and reference picture list usage index, and additional information used for the new coding feature of VVC may be used for inter-predicted sample generation. The motion parameter can be signaled in an explicit or implicit manner. When a CU is coded with skip mode, the CU may be associated with one PU and may have no significant residual coefficients, no coded motion vector delta or reference picture index. A merge mode may be specified where the motion parameters for the current CU can be obtained from neighboring CUs, including spatial and temporal candidates, and additional schedules introduced in VVC. The merge mode can be applied to any inter-predicted CU, not only for skip mode. The alternative to merge mode may be the explicit transmission of motion parameters, where motion vector, corresponding reference picture index for each reference picture list and reference picture list usage flag and other needed information are signaled explicitly per each CU.

Additionally or alternatively, intra block copy (IBC) may be a tool adopted in HEVC extensions on SCC, and thus may be used by a video encoder 114, 200, 400, as described herein in encoding video, and/or by a video decoder 124, 300, 400, as described herein in decoding video. Such a tool may improve the coding efficiency of screen content materials. As IBC mode may be implemented as a block level coding mode, block matching (BM) may be performed at the encoder to find the optimal block vector (or motion vector) for each CU. Here, a block vector is used to indicate the displacement from the current block to a reference block, which is already reconstructed inside the current picture. The luma block vector of an IBC-coded CU may be in integer precision. The chroma block vector can round to integer precision as well. When combined with AMVR, the IBC mode can switch between 1-pel and 4-pel motion vector precisions. An IBC-coded CU may be treated as the third prediction mode other than intra- or inter-prediction modes. The IBC mode may be applicable to the CUs with both width and height smaller than or equal to 64 luma samples.

At the encoder side, hash-based motion estimation may be performed for IBC. The encoder performs RD check for blocks with either width or height no larger than 16 luma samples. For non-merge mode, the block vector search may be performed using hash-based search first. If hash search does not return valid candidate, block matching based local search may be performed. In the hash-based search, hash key matching (32-bit cyclic redundancy check (CRC)) between the current block and a reference block may be extended to all allowed block sizes. The hash key calculation for every position in the current picture may be based on 4×4 sub-blocks. For the current block of a larger size, a hash key may be determined to match that of the reference block when all the hash keys of all 4×4 sub-blocks match the hash keys in the corresponding reference locations. If hash keys of multiple reference blocks are found to match that of the current block, the block vector costs of each matched reference may be calculated and the one with the minimum cost may be selected.

In some examples, in block matching search, the search range may be set to cover both the previous and current CTUs. At CU level, IBC mode may be signaled with a flag and it can be signaled as IBC AMVP mode or IBC skip/merge mode. In one example, such as IBC skip/merge mode, a merge candidate index may be used to indicate which of the block vectors in the list from neighboring candidate IBC coded blocks is used to predict the current block. The merge list may include spatial, HMVP, and pairwise candidates.

In another example, such as IBC AMVP mode, a block vector difference may be coded in the same way as a motion vector difference. The block vector prediction method uses two candidates as predictors, one from left neighbor and one from above neighbor (if IBC coded). When either neighbor is not available, a default block vector can be used as a predictor. A flag can be signaled to indicate the block vector predictor index.

To reduce the cross-component redundancy, a cross-component linear model (CCLM) prediction mode may be used in the VVC, for which the chroma samples are predicted based on the reconstructed luma samples of the same CU by using a linear model as follows:

$$\text{pred}_C(i,j) = \alpha \cdot \text{rec}_L'(i,j) + \beta \qquad \text{Equation 1}$$

In such instance, $\text{pred}_C(i, j)$ may represent the predicted chroma samples in a CU and $\text{rec}_L(i, j)$ may represent the down-sampled reconstructed luma samples of the same CU. The CCLM parameters ($\alpha$ and $\beta$) may be derived with at most four neighboring chroma samples and their corresponding down-sampled luma samples. For instance, suppose the current chroma block dimensions are W×H, then W' and H' are set as W'=W, H'=H when LM mode is applied; W'=W+H when LM-T mode is applied; and H'=H+W when LM-L mode is applied.

The above neighboring positions may be denoted as S[0, −1] ... S[W'−1, −1] and the left neighboring positions may be denoted as S[−1, 0] ... S[−1, H'−1]. Then the four samples are selected as S[W'/4, −1], S[3*W'/4, −1], S[−1, H'/4], S[−1, 3*H'/4] when LM mode is applied and both above and left neighboring samples are available; S[W'/8, −1], S[3*W'/8, −1], S[5*W'/8, −1], S[7*W'/8, −1] when LM-T mode is applied or only the above neighboring samples are available; and S[−1, H'/8], S[−1, 3*H'/8], S[−1, 5*H'/8], S[−1, 7*H'/8] when LM-L mode is applied or only the left neighboring samples are available.

In some aspects, the four neighboring luma samples at the selected positions may be down-sampled and compared four times to find two larger values: $x^0_A$ and $x^1_A$, and two smaller values: $x^0_B$ and $x^1_B$. Their corresponding chroma sample values may be denoted as $y^0_A$, $y^1_A$, $y^0_B$ and $y^1_B$. Then $x_A$, $x_B$, $y_A$ and $y_B$ may be derived as:

$$X_a = (x^0_A + x^1_A + 1) >> 1; X_b = (x^0_B + x^1_B + 1) >> 1; Y_a = (y^0_A + y^1_A + 1) >> 1; Y_b = (y^0_B + y^1_B + 1) >> 1 \qquad \text{Equation 2}$$

Finally, the linear model parameters $\alpha$ and $\beta$ may be obtained according to the following equations:

$$\alpha = \frac{Y_a - Y_b}{X_a - X_b} \qquad \text{Equation 3}$$

$$\beta = Y_b - \alpha \cdot X_b \qquad \text{Equation 4}$$

Figure 10:
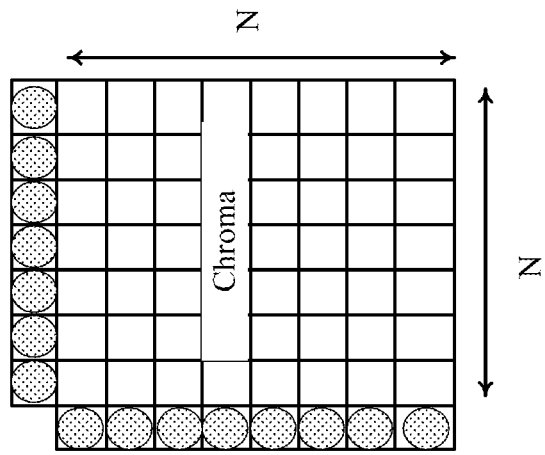
FIG. 10 is a schematic diagram of location of the samples used for the derivation of $\alpha$ and $\beta$ for the chroma in accordance with some aspects of the present disclosure.
Figure 11:
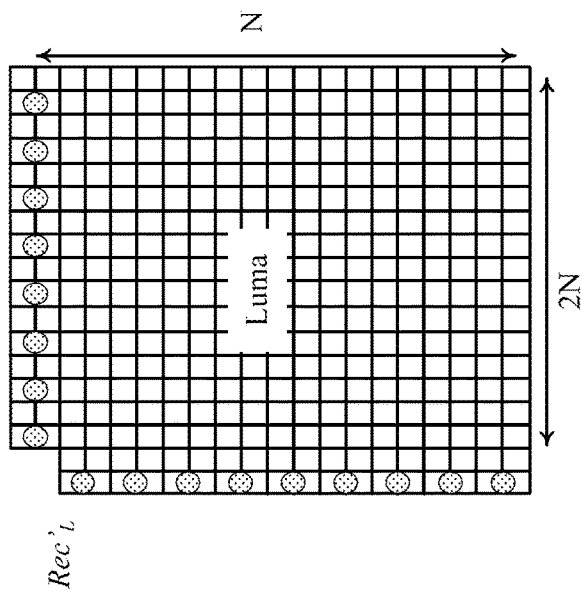
FIG. 11 is a schematic diagram of location of the samples used for the derivation of $\alpha$ and $\beta$ for the luma in accordance with some aspects of the present disclosure.
Figure 12:
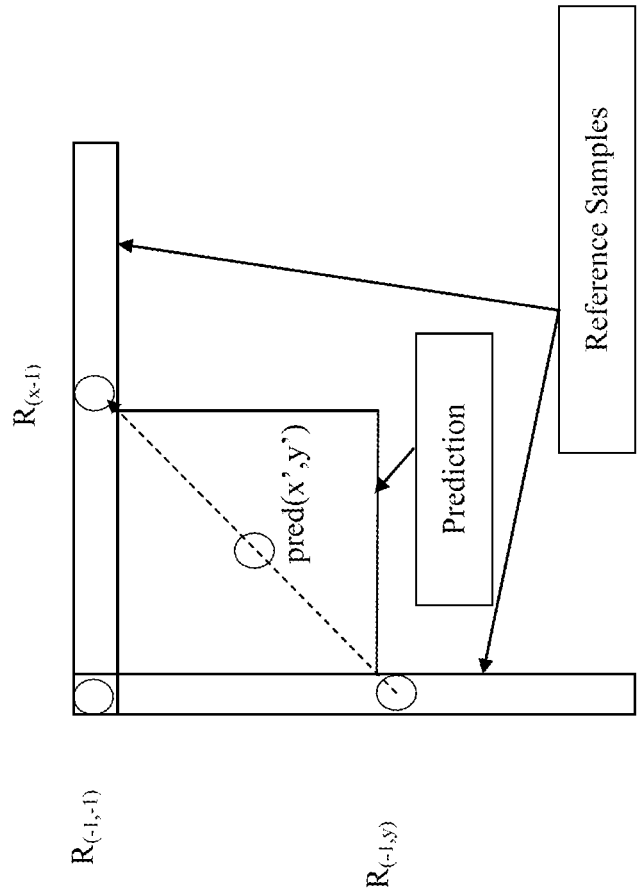
FIGS. 12-15 illustrate examples of reference samples (Rx,−1 and R−1,y) for PDPC applied over various prediction modes in accordance with some aspects of the present disclosure.
Figure 13:
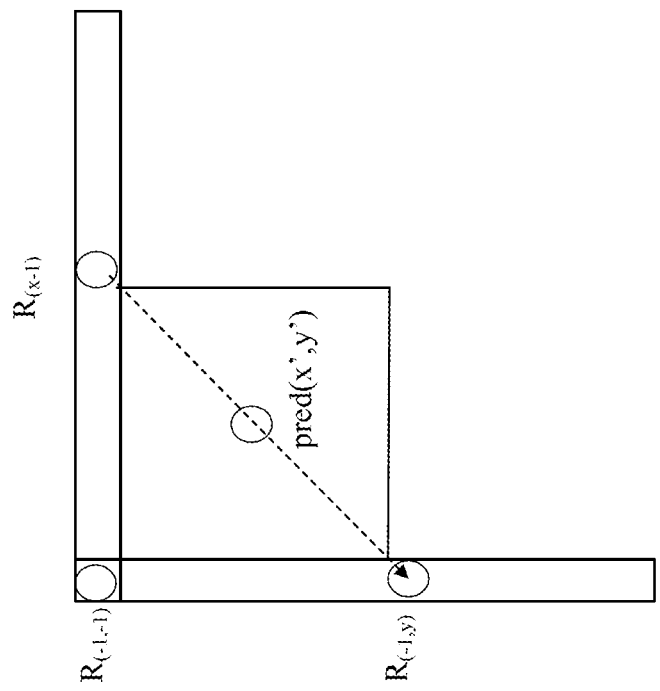
Figure 14:
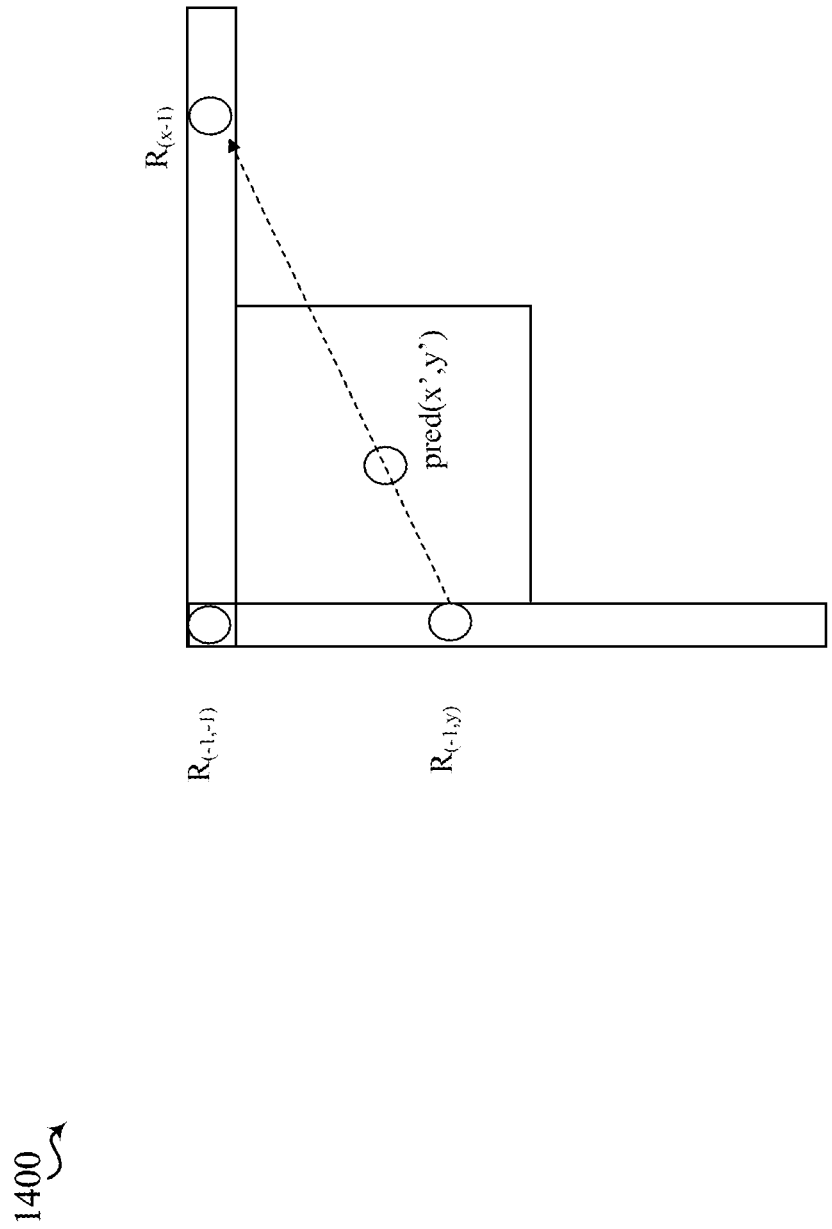
Figure 15:
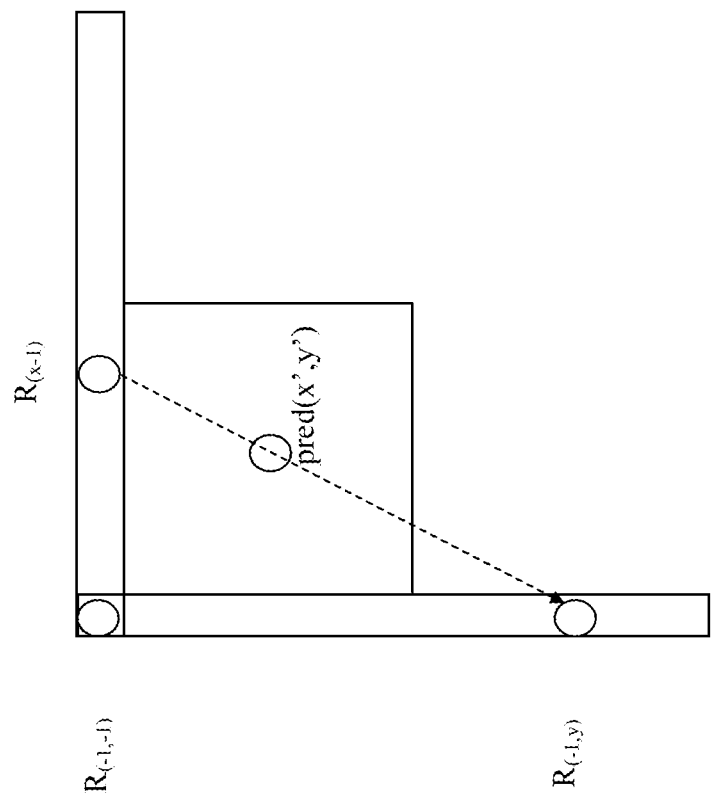

FIG. 10 is a schematic diagram 1000 of location of the samples used for the derivation of $\alpha$ and $\beta$ for the chroma. FIG. 11 is a schematic diagram 1100 of location of the samples used for the derivation of $\alpha$ and $\beta$ for the luma. For both FIGS. 10 and 11, the division operation to calculate parameter $\alpha$ may be implemented with a look-up table. To reduce the memory required for storing the table, the diff value (difference between maximum and minimum values) and the parameter $\alpha$ may be expressed by an exponential notation. For example, the diff value is approximated with a 4-bit significant part and an exponent. Consequently, the table for 1/diff is reduced into 16 elements for 16 values of the significand as follows:

DivTable [ ]={0, 7, 6, 5, 5, 4, 4, 3, 3, 2, 2, 1, 1, 1, 1, 0}

Table 2

In an example, the above template and left template can be used to calculate the linear model coefficients together. In another example, the above template and left template can be used alternatively in the other 2 LM modes, called LM_T, and LM_L modes. In LM_T mode, only the above template may be used to calculate the linear model coefficients. To get more samples, the above template is extended to (W+H) samples. In LM_L mode, only left template is used to calculate the linear model coefficients. To get more samples, the left template may be extended to (H+W) samples. In LM mode, left and above templates are used to calculate the linear model coefficients.

To match the chroma sample locations for 4:2:0 video sequences, two types of down-sampling filter are applied to luma samples to achieve 2 to 1 down-sampling ratio in both horizontal and vertical directions. The selection of down-sampling filter is specified by a SPS level flag. The two down-sampling filters are as follows, which are corresponding to "type-0" and "type-2" content, respectively.

$$Rec'_L(i, j) = \qquad \text{Equation 5}$$

$$\left[ \begin{array}{c} rec_L(2i-1, 2j-1) + 2 \cdot rec_L(2i-1, 2j-1) + rec_L(2i+1, 2j-1) + \\ rec_L(2i-1, 2j) + 2 \cdot rec_L(2i, 2j) + rec_L(2i+1, 2j) + 4 \end{array} \right] >> 3$$

$$rec'_L(i, j) = \qquad \text{Equation 6}$$

$$\left[ \begin{array}{c} rec_L(2i, 2j-1) + rec_L(2i-1, 2j) + 4 \cdot rec_L(2i, 2j) + \\ rec_L(2i+1, 2j) + rec_L(2i, 2j+1) + 4 \end{array} \right] >> 3$$

Note that only one luma line (general line buffer in intra-prediction) may be used to make the down-sampled luma samples when the upper reference line is at the CTU boundary. This parameter computation may be performed as part of the decoding process, and not just as an encoder search operation. As a result, no syntax may be used to convey the $\alpha$ and $\beta$ values to the decoder.

For chroma intra-prediction mode coding, a total of 8 intra-prediction modes are allowed for chroma intra mode coding. Those modes include five traditional intra-prediction modes and three cross-component linear model modes (LM, LM_T, and LM_L). Chroma mode signaling and derivation process are shown in Table 3 below. Chroma mode coding directly depends on the intra-prediction mode of the corresponding luma block. As separate block partitioning structure for luma and chroma components is enabled in I slices, one chroma block may correspond to multiple luma blocks. Therefore, for Chroma DM mode, the intra-prediction mode of the corresponding luma block covering the center position of the current chroma block can be directly inherited.

TABLE 3

Chroma mode signalling and derivation process

| Chroma prediction mode | Corresponding luma intra-prediction mode X (0 <= X <= 66) | | | | |
|---|---|---|---|---|---|
| 0 | 0  | 50 | 18 | 1  | 0  |
| 1 | 66 | 0  | 0  | 0  | 50 |
| 2 | 50 | 66 | 50 | 50 | 18 |
| 3 | 18 | 18 | 66 | 18 | 1  |
| 4 | 1  | 1  | 1  | 66 | X  |
| 5 | 0  | 50 | 18 | 1  | 81 |
| 6 | 81 | 81 | 81 | 81 | 82 |
| 7 | 82 | 82 | 82 | 82 | 83 |
|   | 83 | 83 | 83 | 83 |    |

TABLE 4

Unified binarization table for chroma prediction mode

| Value of intra_chroma_pred_mode | Bin string |
|---|---|
| 4 | 00 |
| 0 | 0100 |
| 1 | 0101 |
| 2 | 0110 |
| 3 | 0111 |
| 5 | 10 |
| 6 | 110 |
| 7 | 111 |

In Table 4, the first bin indicates whether it is regular (0) or LM modes (1). If it is LM mode, then the next bin indicates whether it is LM_CHROMA (0) or not (1). If it is not LM_CHROMA, next bin indicates whether it is LM_L (0) or LM_T (1). For this case, when sps_cclm_enabled flag is 0, the first bin of the binarization table for the corresponding intra_chroma_pred_mode can be discarded prior to the entropy coding. In other words, the first bin is inferred to be 0 and hence not coded. This single binarization table is used for both sps_cclm_enabled flag equal to 0 and 1 cases. The first two bins in Table 4 are context coded with its own context model, and the rest of the bins are bypass coded.

In addition, in order to reduce luma-chroma latency in dual tree, when the 64×64 luma coding tree node is partitioned with Not Split (and ISP is not used for the 64×64 CU) or QT, the chroma CUs in 32×32/32×16 chroma coding tree node is allowed to use CCLM in the following way: If the 32×32 chroma node is not split or partitioned QT split, all chroma CUs in the 32×32 node can use CCLM; Alternatively, if the 32×32 chroma node is partitioned with Horizontal BT, and the 32×16 child node does not split or uses Vertical BT split, all chroma CUs in the 32×16 chroma node can use CCLM. In all the other luma and chroma coding tree split conditions, CCLM is not allowed for chroma CU.

In VVC, the results of intra-prediction of DC, planar and several angular modes may further be modified by a position dependent prediction combination (PDPC) method. PDPC is a prediction method that invokes a combination of the boundary reference samples and HEVC style prediction with filtered boundary reference samples. PDPC can be applied to the following intra modes without signaling: planar, DC, intra angles less than or equal to horizontal, and intra angles greater than or equal to vertical and less than or equal to 80. If the current block is BDPCM mode or MRL index is larger than 0, PDPC is not applied.

The prediction sample pred(x',y') is predicted using an intra-prediction mode (DC, planar, angular) and a linear combination of reference samples according to the Equation 7 as follows:

$$\text{pred}(x',y') = \text{Clip}(0, (1 << \text{BitDepth}) - 1, (wL \times R_{-1,y'} + wT \times R_{x',-1} + (64 - wL - wT) \times \text{pred}(x',y') + 32) >> 6) \quad \text{Equation 7}$$

In the above equation, $R_{x,-1}$, $R_{-1,y}$ may represent the reference samples located at the top and left boundaries of current sample (x, y), respectively In some aspects, if PDPC is applied to DC, planar, horizontal, and vertical intra modes, additional boundary filters may not be needed, as currently required in the case of HEVC DC mode boundary filter or horizontal/vertical mode edge filters. PDPC process for DC and planar modes is identical. For angular modes, if the current angular mode is HOR_IDX or VER_IDX, left or top reference samples is not used, respectively. The PDPC weights and scale factors are dependent on prediction modes and the block sizes. PDPC is applied to the block with both width and height greater than or equal to 4.

FIGS. 12-15 illustrate examples of reference samples 1200, 1300, 1400, 1500 ($R_{x,-1}$ and $R_{-1,y}$) for PDPC applied over various prediction modes. The prediction sample pred (x', y') is located at (x', y') within the prediction block. As an example, the coordinate x of the reference sample $R_{x,-1}$ is given by: x=x'+y'+1, and the coordinate y of the reference sample $R_{-1,y}$ is similarly given by: y=x'+y'+1 for the diagonal modes. For the other angular mode, the reference samples $R_{x,-1}$ and $R_{-1,y}$ could be located in fractional sample position. In this case, the sample value of the nearest integer sample location is used.

Figure 16:
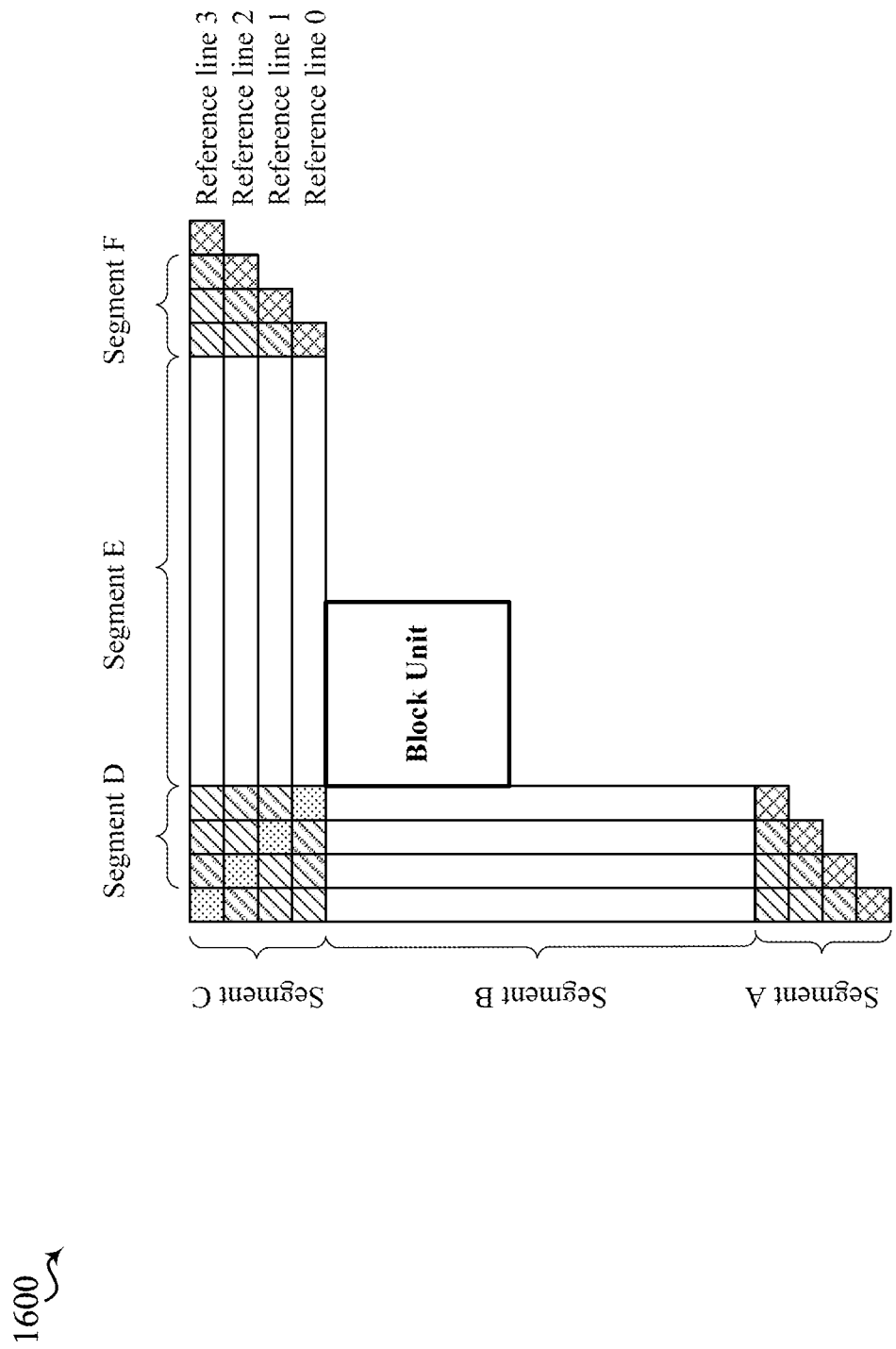
FIG. 16 is a diagram of multiple reference line (MRL) intra-prediction used in accordance with aspects of the present disclosure.

FIG. 16 is a diagram 1600 of multiple reference line (MRL) intra-prediction used in accordance with aspects of the present disclosure. In some examples, the samples of segments A and F are not fetched from reconstructed neighboring samples but padded with the closest samples from Segment B and E, respectively. HEVC intra-picture prediction uses the nearest reference line (i.e., reference line 0). In MRL, 2 additional lines (reference line 1 and reference line 3) are used.

In some examples of video coding, the index of selected reference line (mrl_idx) can be signalled and used to generate intra predictor. For reference line index, which is greater than 0, the most probable mode (MPM) list may only include additional reference line modes and the MPM index can be signalled without remaining modes. The reference line index can be signalled before intra-prediction modes, and planar mode can be excluded from intra-prediction modes in case a non-zero reference line index is signaled.

MRL can be disabled for the first line of blocks inside a CTU to prevent using extended reference samples outside the current CTU line. Also, PDPC can be disabled when an additional line is used. For MRL mode, the derivation of DC value in DC intra-prediction mode for non-zero reference line indices can be aligned with that of reference line index 0. MRL may store 3 neighboring luma reference lines with a CTU to generate predictions. The Cross-Component Linear Model (CCLM) tool may store 3 neighboring luma reference lines for its down-sampling filters. The definition of MRL to use the same 3 lines can be aligned as CCLM to reduce the storage requirements for decoders.

Figure 17:
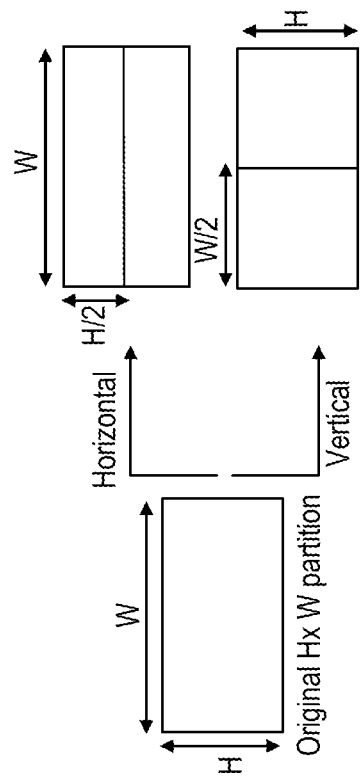
FIGS. 17 and 18 are example diagrams and of an intra sub-partitions (ISP) that divides luma intra-predicted blocks vertically or horizontally into sub-partitions depending on the block size in accordance with some aspects of the present disclosure.
Figure 18:
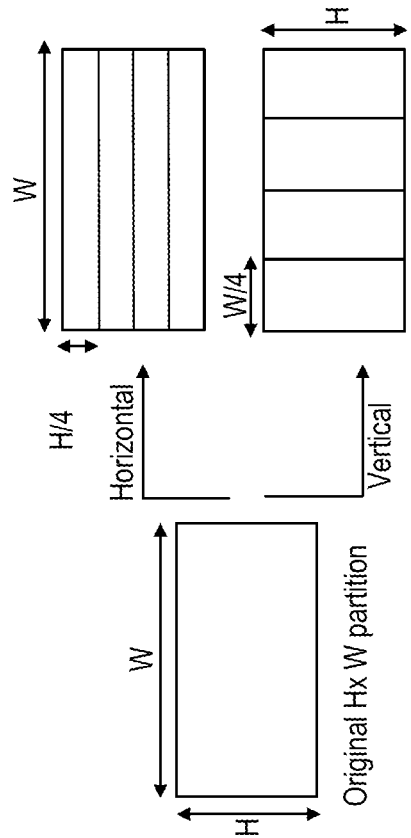

FIGS. 17 and 18 are examples of diagrams 1700 and 1800 of an intra sub-partitions (ISP) that divides luma intra-predicted blocks vertically or horizontally into sub-partitions depending on the block size. For example, minimum block size for ISP is 4×8 (or 8×4). If block size is greater than 4×8 (or 8×4) then the corresponding block can be divided by 4 sub-partitions. It has been noted that the M×128 (with M≤64) and 128×N (with N≤64) ISP blocks could generate a potential issue with the 64×64 VDPU. For example, an M×128 CU in the single tree case has an M×128 luma TB and two corresponding M/2×64 chroma TBs. If the CU uses ISP, then the luma TB can be divided into four M×32 TBs (only the horizontal split is possible), each of them smaller than a 64×64 block. However, in the current design of ISP chroma blocks are not divided. Therefore, both chroma components may have a size greater than a 32×32 block. Analogously, a similar situation could be created with a 128×N CU using ISP. Hence, these two cases may be an issue for the 64×64 decoder pipeline. For this reason, the CU sizes that can use ISP may be restricted to a maximum of 64×64. FIGS. 17 and 18 shows examples of the two possibilities. All sub-partitions fulfill the condition of having at least 16 samples.

In ISP, the dependence of 1×N/2×N subblock prediction on the reconstructed values of previously decoded 1×N/2×N subblocks of the coding block is not allowed so that the minimum width of prediction for subblocks becomes four samples. For example, an 8×N (N>4) coding block that is coded using ISP with vertical split is split into two prediction regions each of size 4×N and four transforms of size 2×N. Also, a 4×N coding block that is coded using ISP with vertical split is predicted using the full 4×N block; four transform each of 1×N is used. Although the transform sizes of 1×N and 2×N are allowed, it is asserted that the transform of these blocks in 4×N regions can be performed in parallel. For example, when a 4×N prediction region contains four 1×N transforms, there is no transform in the horizontal direction; the transform in the vertical direction can be performed as a single 4×N transform in the vertical direction. Similarly, when a 4×N prediction region contains two 2×N transform blocks, the transform operation of the two 2×N blocks in each direction (horizontal and vertical) can be conducted in parallel. In this example, there may be no delay, or reduced delay, added in processing these smaller blocks than processing 4×4 regular-coded intra blocks.

TABLE 5

| Block Size | Coefficient group Size |
| --- | --- |
| 1 × N, N ≥ 16 | 1 × 16 |
| N × 1, N ≥ 16 | 16 × 1 |
| 2 × N, N ≥ 8 | 2 × 8 |
| N × 2, N ≥ 8 | 8 × 2 |
| All other possible M × N cases | 4 × 4 |

For each sub-partition, reconstructed samples are obtained by adding the residual signal to the prediction signal. Here, a residual signal is generated by the processes such as entropy decoding, inverse quantization and inverse transform. Therefore, the reconstructed sample values of each sub-partition can be available to generate the prediction of the next sub-partition, and each sub-partition is repeatedly processed. In addition, the first sub-partition to be processed is the one containing the top-left sample of the CU and then continuing downwards (horizontal split) or rightwards (vertical split). As a result, reference samples used to generate the sub-partitions prediction signals may only be located at the left and above sides of the lines. All sub-partitions can share the same intra mode. The followings are summary of interaction of ISP with other coding tools.

In one example, MRL may be implemented if a block has an MRL index other than 0, then the ISP coding mode can be inferred to be 0 and therefore ISP mode information may not be sent to the decoder. In another example, entropy coding coefficient group size may be selected if the sizes of the entropy coding subblocks have been modified so that they have 16 samples in all possible cases, as shown in Table 5. Note that the new sizes may only affect blocks produced by ISP in which one of the dimensions is less than 4 samples. In all other cases coefficient groups may keep the 4×4 dimensions.

Additionally or alternatively, with respect to coded block flag (CBF) coding, it is assumed to have at least one of the sub-partitions has a non-zero CBF. Hence, if n is the number of sub-partitions and the first n−1 sub-partitions have produced a zero CBF, then the CBF of the n-th sub-partition can be inferred to be 1. Transform size restriction: all ISP transforms with a length larger than 16 points can use the discrete cosine transform (DCT)-II. Multiple transform selection (MTS) flag: if a CU uses the ISP coding mode, the MTS CU flag may be set to 0 and it may not be sent to the decoder. Therefore, the encoder may not perform rate distortion (RD) tests for the different available transforms for each resulting sub-partition. The transform choice for the ISP mode may instead be fixed and selected according the intra mode, the processing order and the block size utilized. Hence, no signaling may be required, in this example.

For example, let $t_H$ and $t_V$ be the horizontal and the vertical transforms selected respectively for the w×h sub-partition, where w is the width and h is the height. Then the transform can be selected according to the following rules: If w=1 or h=1, then there may be no horizontal or vertical transform respectively. If w≥4 and w≤16, $t_H$=discrete sine transform (DST)-VII, otherwise, $t_H$=DCT-II. If h≥4 and h≤16, $t_V$=DST-VII, otherwise, $t_V$=DCT-II.

In ISP mode, all 67 intra-prediction modes are allowed. PDPC can also be applied if corresponding width and height is at least 4 samples long. In addition, the reference sample filtering process (reference smoothing) and the condition for intra interpolation filter selection may not exist anymore, and Cubic (DCT-IF) filter can be applied for fractional position interpolation in ISP mode.

Figure 19:
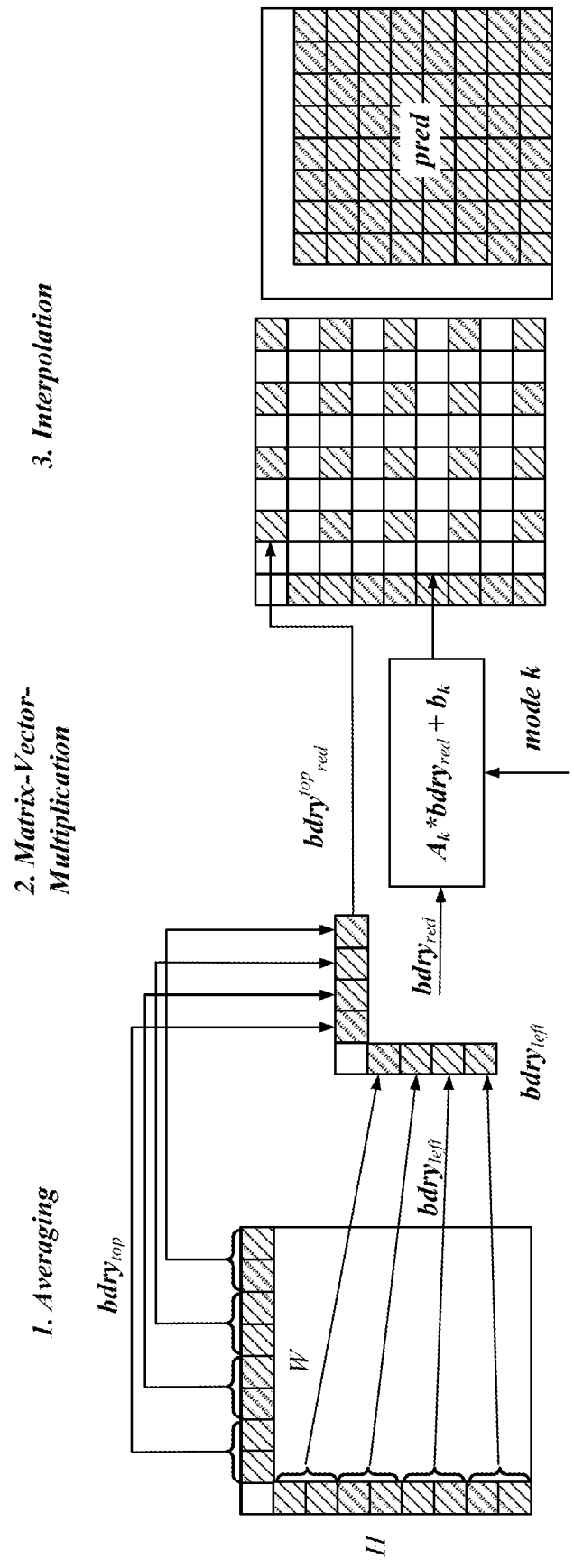
FIG. 19 is a diagram of a matrix weighted intra-prediction process (MIP) method for VVC in accordance with some aspects of the present disclosure.

FIG. 19 is an example of a diagram 1900 of matrix weighted intra-prediction process (MIP) for VVC. For predicting the samples of a rectangular block of width W and height H, -MIP takes one line of H reconstructed neighboring boundary samples left of the block and one line of W reconstructed neighboring boundary samples above the block as input. If the reconstructed samples are unavailable, they can be generated as in the conventional intra-prediction.

Among the boundary samples, four samples or eight samples can be selected by averaging based on block size and shape. Specifically, the input boundaries $bdry^{top}$ and $bdry^{left}$ are reduced to smaller boundaries $bdry_{red}^{top}$ and $bdry_{red}^{left}$ by averaging neighboring boundary samples according to predefined rule depends on block size. Then, the two reduced boundaries $bdry_{red}^{top}$ and $bdry_{red}^{left}$ can be concatenated to a reduced boundary vector $bdry_{red}$ which is thus of size four for blocks of shape 4×4 and of size eight for blocks of all other shapes. If mode refers to the MIP-mode, this concatenation is defined as follows:

$$bdry_{red} = \begin{cases} [bdry_{red}^{top}, bdry_{red}^{left}] & \text{for } W = H = 4 \text{ and mode} < 18 \\ [bdry_{red}^{left}, bdry_{red}^{top}] & \text{for } W = H = 4 \text{ and mode} \geq 18 \\ [bdry_{red}^{top}, bdry_{red}^{left}] & \text{for } \max(W, H) = 8 \text{ and mode} < 10 \\ [bdry_{red}^{left}, bdry_{red}^{top}] & \text{for } \max(W, H) = 8 \text{ and mode} \geq 10 \\ [bdry_{red}^{top}, bdry_{red}^{left}] & \text{for } \max(W, H) > 8 \text{ and mode} < 6 \\ [bdry_{red}^{left}, bdry_{red}^{top}] & \text{for } \max(W, H) > 8 \text{ and mode} \geq 6 \end{cases}$$

Equation 8

A matrix vector multiplication, followed by addition of an offset, is carried out with the averaged samples as an input. The result is a reduced prediction signal on a subsampled set of samples in the original block. Out of the reduced input vector $bdry_{red}$ a reduced prediction signal $pred_{red}$, which is a signal on the down-sampled block of width $W_{red}$ and height $H_{red}$ is generated. Here, $W_{red}$ and $H_{red}$ are defined as:

$$W_{red} = \begin{cases} 4 & \text{for } \max(W, H) \leq 8 \\ \min(W, 8) & \text{for } \max(W, H) > 8 \end{cases}$$

$$H_{red} = \begin{cases} 4 & \text{for } \max(W, H) \leq 8 \\ \min(H, 8) & \text{for } \max(W, H) > 8 \end{cases}$$

Equation 9

The reduced prediction signal $pred_{red}$ may be computed by calculating a matrix vector product and adding an offset:

$$pred_{red} = A \cdot bdry_{red} + b$$

Equation 10

Here, A is a matrix that has $W_{red} \cdot H_{red}$ rows and 4 columns if W=H=4 and 8 columns in all other cases. b is a vector of size $W_{red} \cdot H_{red}$. The matrix A and the offset vector b are taken from one of the sets $S_0$, $S_1$, $S_2$. One defines an index idx=idx(W, H) as follows:

$$idx(W, H) = \begin{cases} 0 & \text{for } W = H = 4 \\ 1 & \text{for } \max(W, H) = 8 \\ 2 & \text{for } \max(W, H) > 8 \end{cases}$$

Equation 11

Here, each coefficient of the matrix A is represented with 8 bit precision. The set $S_0$ consists of 16 matrices $A_0^i$, $i \in \{0, \ldots, 15\}$ each of which has 16 rows and 4 columns and 16 offset vectors $b_0^i$, $i \in \{0, \ldots, 16\}$ each of size 16. Matrices and offset vectors of that set are used for blocks of size 4×4. The set $S_1$ consists of 8 matrices $A_1^i$, $i \in \{0, \ldots, 7\}$, each of which has 16 rows and 8 columns and 8 offset vectors $b_i^1$, $i \in \{0, \ldots, 7\}$ each of size 16. The set $S_2$ consists of 6 matrices $A_2^i$, $i \in \{0, \ldots, 5\}$, each of which has 64 rows and 8 columns and of 6 offset vectors $b_2^i$, $i \in \{0, \ldots, 5\}$ of size 64.

In some examples, the prediction signal at the remaining positions may be generated from the prediction signal on the subsampled set by linear interpolation which is a single step linear interpolation in each direction. The interpolation can be firstly performed in the horizontal direction and then in the vertical direction regardless of block shape or block size.

For each CU in intra mode, a flag indicating whether an MIP mode may be to be applied or not is sent. If an MIP mode is to be applied, MIP mode (predModeIntra) may be signaled. For an MIP mode, a transposed flag (isTransposed), which determines whether the mode is transposed, and MIP mode ID (modeId), which determines which matrix is to be used for the given MIP mode, can be derived as follows isTransposed=predModeIntra&1 modeId=predModeIntra>>1

Equation 12

MW coding mode may be harmonized with other coding tools by considering following aspects: (1) low-frequency non-separable transform (LFNST) is enabled for MIP on large blocks. Here, the LFNST transforms of planar mode are used; (2) the reference sample derivation for MIP is performed exactly or at least similarly as for the conventional intra-prediction modes; (3) for the up-sampling step used in the MIP-prediction, original reference samples are used instead of down-sampled ones; (4) clipping is performed before up-sampling and not after up-sampling; (5) MIP may be allowed up to 64×64 regardless of the maximum transform size. In some aspects, the number of MIP modes may be 32 for sizeId=0, 16 for sizeId=1 and 12 for sizeId=2.

In joint exploration model (JEM)-2.0 intra modes are extended to 67 from 35 modes in HEVC, and they are derived at encoder and explicitly signaled to decoder. A significant amount of overhead is spent on intra mode coding in JEM-2.0. For example, the intra mode signaling overhead may be up to 5-10% of overall bitrate in all intra coding configuration. This contribution proposes the decoder-side intra mode derivation approach to reduce the intra mode coding overhead while keeping prediction accuracy. To reduce the overhead of intra mode signaling, a decoder-side intra mode derivation (DIMD) approach, which may be used by video decoders 124, 300, 400 in decoding video. In accordance with aspects of the present disclosure, instead of signaling intra mode explicitly, the information can be derived at both encoder and decoder from the neighboring reconstructed samples of current block. The intra mode derived by DIMD may be used in two ways, for example: 1) For 2N×2N CUs, the DIMD mode is used as the intra mode for intra-prediction when the corresponding CU-level DIMD flag is turned on; 2) For N×N CUs, the DIMD mode is used to replace one candidate of the existing MPM list to improve the efficiency of intra mode coding.

Figure 20:
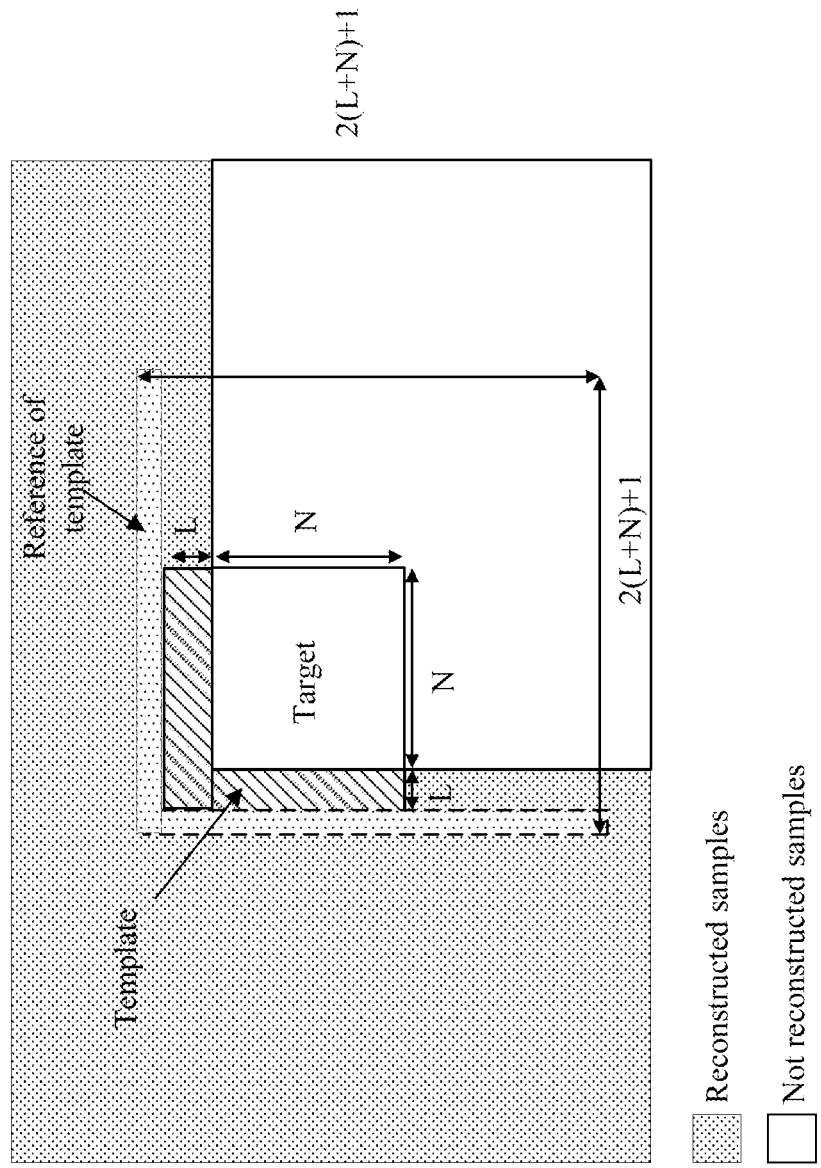
FIG. 20 is a diagram of a template based intra mode derivation where the target denotes the current block (of block size N) for which intra-prediction mode is to be estimated in accordance with some aspects of the present disclosure.

FIG. 20 is an example of a diagram 2000 of a template based intra mode derivation where the target denotes the current block (of block size N) for which intra-prediction mode is to be estimated. The template (indicated by the patterned region in FIG. 20) specifies a set of already reconstructed samples, which are used to derive the intra mode. The template size is denoted as the number of samples within the template that extends to the above and the left of the target block, i.e., L. In some implementations, a template size of 2 (i.e., L=2) can be used for 4×4 and 8×8 blocks and a template size of 4 (i.e., L=4) can be used for 16×16 and larger blocks. The reference of template (indicated by the dotted region in FIG. 20) can refer to a set of neighboring samples from above and left of the template, as defined by JEM-2.0. Unlike the template samples which are always from reconstructed region, the reference samples of template may not be reconstructed yet when encoding/decoding the target block. In this case, the existing reference samples substitution algorithm of JEM-2.0 is utilized to substitute the unavailable reference samples with the available reference samples.

For each intra-prediction mode, the DIMD calculates the absolute difference (SAD) between the reconstructed template samples and its prediction samples obtained from the reference samples of the template. The intra-prediction mode that yields the minimum SAD may be selected as the final intra-prediction mode of the target block.

For intra 2N×2N CUs, the DIMD can be used as one additional intra mode, which can be adaptively selected by comparing the DIMD intra mode with the optimal normal intra mode (i.e., being explicitly signaled). One flag is signaled for each intra 2N×2N CU to indicate the usage of the DIMD. If the flag is one, then the CU can be predicted using the intra mode derived by DIMD; otherwise, the DIMD is not applied and the CU is predicted using the intra mode explicitly signaled in the bit-stream. When the DIMD is enabled, chroma components can reuse the same intra mode as that derived for luma component, i.e., DM mode.

Additionally, for each DIMD-coded CU, the blocks in the CU can adaptively select to derive their intra modes at either PU-level or TU-level. Specifically, when the DIMD flag is one, another CU-level DIMD control flag can be signaled to indicate the level at which the DIMD is performed. If this flag is zero, this can indicate that the DIMD is performed at the PU level and all the TUs in the PU use the same derived intra mode for their intra-prediction; otherwise if the DIMD control flag is one, this can indicate that the DIMD is performed at the TU level and each TU in the PU derives its own intra mode.

Further, when the DIMD is enabled, the number of angular directions increases to 129, and the DC and planar modes still remain the same. To accommodate the increased granularity of angular intra modes, the precision of intra interpolation filtering for DIMD-coded CUs increases from 1/32-pel to 1/64-pel. Additionally, in order to use the derived intra mode of a DIMD coded CU as MPM candidate for neighboring intra blocks, those 129 directions of the DIMD-coded CUs can be converted to "normal" intra modes (i.e., 65 angular intra directions) before they are used as MPM.

In some aspects, intra modes of intra N×N CUs are signaled. However, to improve the efficiency of intra mode coding, the intra modes derived from DIMD are used as MPM candidates for predicting the intra modes of four PUs in the CU. In order to not increase the overhead of MPM index signaling, the DIMD candidate can be placed at the first place in the MPM list and the last existing MPM candidate can be removed. Also, a pruning operation can be performed such that the DIMD candidate may not be added to the MPM list if it is redundant.

In order to reduce encoding/decoding complexity, one straightforward fast intra mode search algorithm is used for DIMD. Firstly, one initial estimation process can be performed to provide a good starting point for intra mode search. Specifically, an initial candidate list can be created by selecting N fixed modes from the allowed intra modes. Then, the SAD can be calculated for all the candidate intra modes and the one that minimizes the SAD can be selected as the starting intra mode. To achieve a good complexity/performance trade-off, the initial candidate list can include 11 intra modes, including DC, planar and every 4-th mode of the 33 angular intra directions as defined in HEVC, i.e., intra modes 0, 1, 2, 6, 10 . . . 30, 34.

If the starting intra mode is either DC or planar, it can be used as the DIMD mode. Otherwise, based on the starting intra mode, one refinement process can then be applied where the optimal intra mode is identified through one iterative search. In the iterative search, at each iteration, the SAD values for three intra modes separated by a given search interval can be compared and the intra mode that minimizes the SAD can be maintained. The search interval can then be reduced to half, and the selected intra mode from the last iteration can serve as the center intra mode for the current iteration. For the current DIMD implementation with 129 angular intra directions, up to 4 iterations can be used in the refinement process to find the optimal DIMD intra mode.

In some examples, transmitting of the luma intra-prediction mode in the bitstream can be avoided. This is done by deriving the luma intra mode using previously encoded/decoded pixels, in an identical fashion at the encoder and at the decoder. This process defines a new coding mode called DIMD, whose selection signaled in the bitstream for intra coded blocks using a flag. DIMD can compete with other coding modes at the encoder, including the classic Intra coding mode (where the intra-prediction mode is coded). Note that in one example, DIMD may only apply to luma. For chroma, classical intra coding mode may apply. As done for other coding modes (classical intra, inter, merge, etc.), a rate-distortion cost can be computed for the DIMD mode, and can then be compared to the coding costs of other modes to decide whether to select it as final coding mode for a current block.

At the decoder side, the DIMD flag can be first parsed, if present. If the DIMD flag is true, the intra-prediction mode can be derived in the reconstruction process using the same previously encoded neighboring pixels. If not, the intra-prediction mode can be parsed from the bitstream as in classical intra coding mode.

Figure 21:
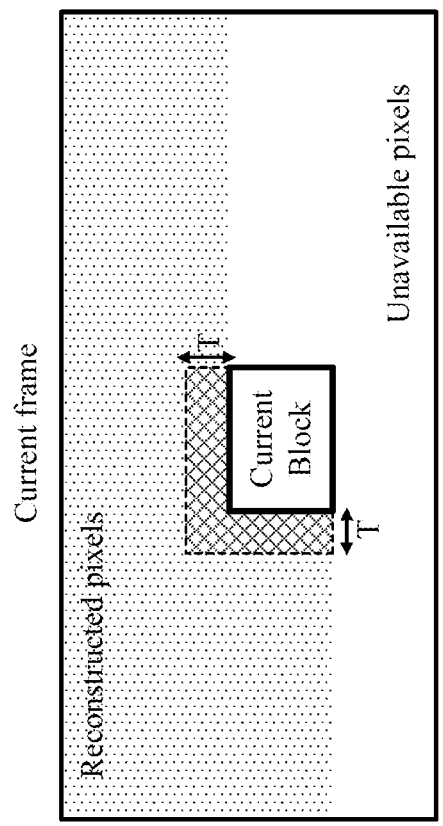
FIG. 21 is a diagram of a template of a set of chosen pixels on which a gradient analysis may be performed based on intra-prediction mode derivation in accordance with some aspects of the present disclosure.

To derive the intra-prediction mode for a block, a set of neighboring pixels may be first selected on which a gradient analysis is performed. For normativity purposes, these pixels can be in the decoded/reconstructed pool of pixels. FIG. 21 is an example of a diagram 2100 of a template of a set of chosen pixels on which a gradient analysis may be performed based on intra-prediction mode derivation. As shown in FIG. 21, a template surrounding the current block is chosen by T pixels to the left, and T pixels above. For example, T may have a value of 2.

Next, a gradient analysis is performed on the pixels of the template. This can facilitate determining a main angular direction for the template, which can be assumed to have a high chance to be identical to the one of the current block. Thus, a simple 3×3 Sobel gradient filter can be used, defined by the following matrices that may be convoluted with the template:

$$M_x = \begin{bmatrix} -1 & 0 & 1 \\ -2 & 0 & 2 \\ -1 & 0 & 1 \end{bmatrix} \text{ and } M_y = \begin{bmatrix} -1 & -2 & -1 \\ 0 & 0 & 0 \\ 1 & 2 & 1 \end{bmatrix}$$

For each pixel of the template, each of these two matrices with the 3×3 window centered around the current pixel can be point-by-point multiplied and composed of its 8 direct neighbors, and the result can be is summed. Thus, two values $G_x$ (from the multiplication with $M_x$), and $G_y$ (from the multiplication with $M_y$) corresponding to the gradient at the current pixel can be obtained, in the horizontal and vertical direction respectively.

Figure 22:
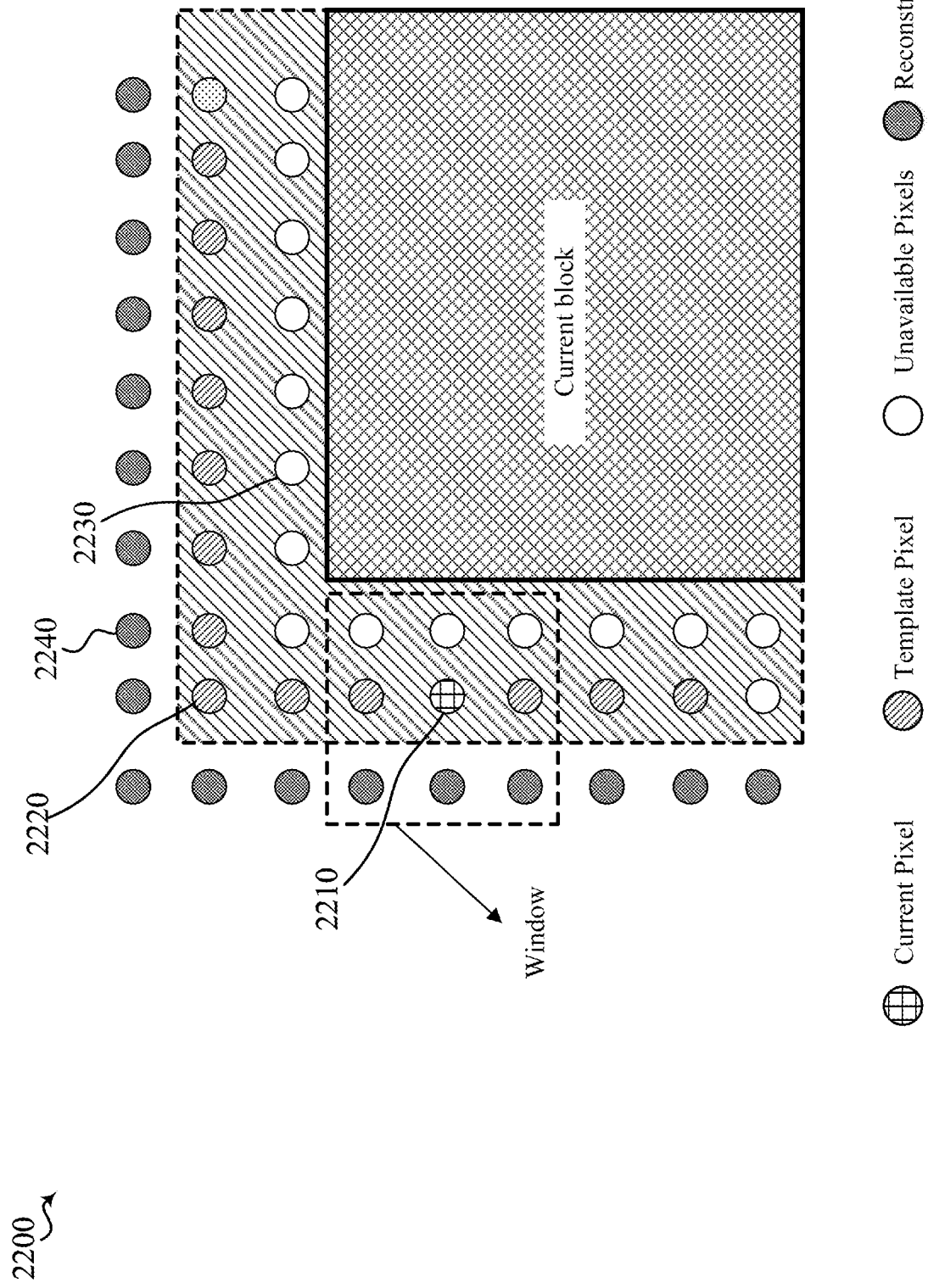
FIG. 22 is a diagram of a convolution of a 3×3 sobel gradient filter with the template in accordance with aspects of the present disclosure.

FIG. 22 is an example of a diagram 2200 of a convolution of a 3×3 Sobel gradient filter with the template in accordance with aspects of the present disclosure. In some examples, the pixel 2210 is the current pixel. Template pixels 2220 (including the current pixel 2210) are pixels on which the gradient analysis is possible. Unavailable pixels 2230 are pixels on which the gradient analysis is not possible due to lack of some neighbors. Reconstructed pixels 2240 are available pixels outside of the considered template, used in the gradient analysis of the template pixels 2220. In case a reconstructed pixel 2240 is not available (due to blocks being too close to the border of the picture for instance), the gradient analysis of all template pixels 2220 that use the unavailable reconstructed pixel 2240 is not performed.

For each template pixel 2220, the intensity (G) and the orientation (O) of the gradient using $G_x$ and $G_y$ are calculated as such:

$$G = |G_x| + |G_y| \text{ and } O = a\tan\left(\frac{G_y}{G_x}\right)$$

Note that a fast implementation of the a tan function is proposed. The orientation of the gradient can then be converted into an intra angular prediction mode, used to index a histogram (first initialized to zero). The histogram value at that intra angular mode is increased by G. Once all the template pixels 2220 in the template have been processed, the histogram can include cumulative values of gradient intensities, for each intra angular mode. The mode that shows the highest peak in the histogram can be selected as intra-prediction mode for the current block. If the maximum value in the histogram is 0 (meaning no gradient analysis was able to be made, or the area composing the template is flat), then the DC mode can be selected as intra-prediction mode for the current block.

For blocks that are located at the top of CTUs, the gradient analysis of the pixels located in the top part of the template is not performed. The DIMD flag is coded using three possible contexts, depending on the left and above neighboring blocks, similarly to the Skip flag coding. Context 0 corresponds to the case where none of the left and above neighboring blocks are coded with DIMD mode, context 1 corresponds to the case where only one neighboring block is coded with DIMD, and context 2 corresponds to the case where both neighbors are DIMD-coded. Initial symbol probabilities for each context are set to 0.5.

One advantage that DIMD offers over classical intra mode coding is that the derived intra mode can have a higher precision, allowing more precise predictions at no additional cost as it is not transmitted in the bitstream. The derived intra mode spans 129 angular modes, hence a total of 130 modes including DC (e.g., the derived intra mode may not be planar in aspects described herein). The classical intra coding mode is unchanged, i.e., the prediction and mode coding still use 67 modes.

The required changes to Wide Angle Intra-prediction and simplified PDPC were performed to accommodate for prediction using 129 modes. Note that only the prediction process uses the extended intra modes, meaning that for any other purpose (deciding whether to filter the reference samples for instance), the mode can be converted back to 67-mode precision.

In the DIMD mode, the luma intra mode is derived during the reconstruction process, just prior to the block reconstruction. This is done to avoid a dependency on reconstructed pixels during parsing. However, by doing so, the luma intra mode of the block may be undefined for the chroma component of the block, and for the luma component of neighboring blocks. This can cause an issue because for chroma, a fixed mode candidate list is defined. Usually, if the luma mode equals one of the chroma candidates, that candidate may be replaced with the vertical diagonal (VDIA_IDX) intra mode. As in DIMD, the luma mode is unavailable, the initial chroma mode candidate list is not modified.

In classical intra mode, where the luma intra-prediction mode is to be parsed from the bitstream, an MPM list is constructed using the luma intra modes of neighboring blocks, which can be unavailable if those blocks were coded using DIMD. In this case, for example, DIMD-coded blocks can be treated as inter blocks during MPM list construction, meaning they are effectively considered unavailable.

Entropy coding may be a form of lossless compression used at the last stage of video encoding (and the first stage of video decoding), after the video has been reduced to a series of syntax elements. Syntax elements describe how the video sequence can be reconstructed at the decoder. This includes the method of prediction (e.g., spatial or temporal prediction, intra-prediction mode, and motion vectors) and prediction error, also referred to as residual. Arithmetic coding is a type of entropy coding that can achieve compression close to the entropy of a sequence by effectively mapping the symbols (i.e., syntax elements) to codewords with a non-integer number of bits. Context-adaptive binary arithmetic coding (CABAC) involves three main functions: binarization, context modeling, and arithmetic coding. Binarization maps the syntax elements to binary symbols (bins). Context modeling estimates the probability of the bins. Finally, arithmetic coding compresses the bins to bits based on the estimated probability.

Several different binarization processes are used in VVC, such as the truncated Rice (TR) binarization process, the truncated binary binarization process, the k-th order Exp-Golomb (EGk) binarization process and the fixed-length (FL) binarization process.

Context modeling provides an accurate probability estimate required to achieve high coding efficiency. Accordingly, it is highly adaptive and different context models can be used for different bins and the probability of that context model is updated based on the values of the previously coded bins. Bins with similar distributions often share the same context model. The context model for each bin can be selected based on the type of syntax element, bin position in syntax element (binIdx), luma/chroma, neighboring information, etc. A context switch can occur after each bin.

Arithmetic coding may be based on recursive interval division. A range, with an initial value of 0 to 1, is divided into two subintervals based on the probability of the bin. The encoded bits provide an offset that, when converted to a binary fraction, selects one of the two subintervals, which indicates the value of the decoded bin. After every decoded bin, the range is updated to equal the selected subinterval, and the interval division process repeats itself. The range and offset have limited bit precision, so renormalization may be used whenever the range falls below a certain value to prevent underflow. Renormalization can occur after each bin is decoded. Arithmetic coding can be done using an estimated probability (context coded), or assuming equal probability of 0.5 (bypass coded). For bypass coded bins, the division of the range into subintervals can be done by a shift, whereas a look up table may be used for the context coded bins.

Figure 23:
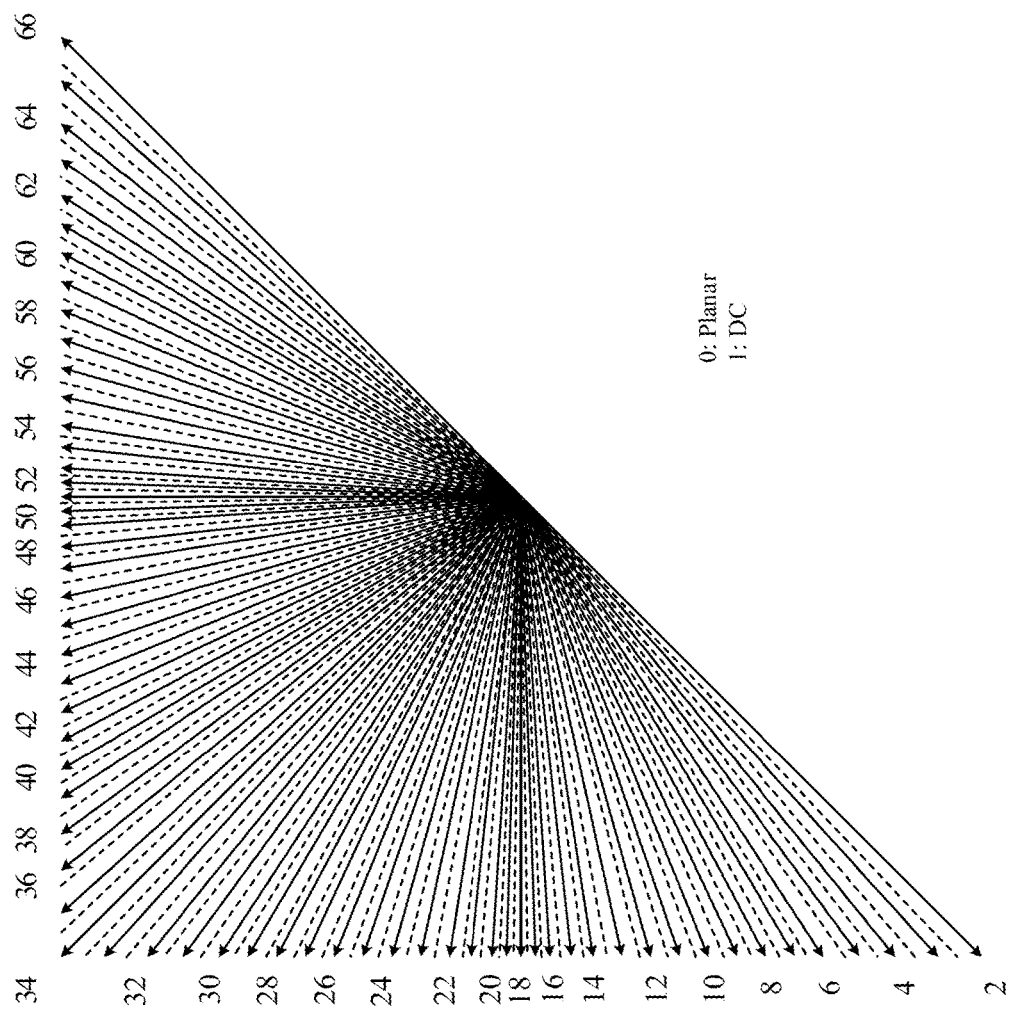
FIG. 23 is a diagram of an example of intra mode coding in accordance with some aspects of the present disclosure.

FIG. 23 is a schematic diagram 2300 of intra mode coding with greater than 67 intra-prediction modes to capture the arbitrary edge directions presented in natural video. In some examples, the number of directional intra modes may be extended from 67, as used in VVC, to 129 while the planar and the DC modes remain the same.

In one example, the pre-defined IPMs may be the IPMs have denser directions than conventional IPMs (e.g., IPMs denoted by the dashed lines in FIG. 23). In one example, the N1 IPMs may be partial or full of the MPMs for the current block. In one example, some pre-defined intra-prediction modes which are not in MPMs may also be contained in the given IPM candidate set.

In one example, one or more IPMs from DC/Planar/horizontal/vertical/diagonal top-right/diagonal bottom-left/diagonal top-left modes may be contained in the given IPM set.

In one example, one or more IPMs denoted by the dashed lines in FIG. 23 may be contained in the given IPM set.

In one example, N1 may be equal to or larger than N2 when one or more IPMs denoted by the dashed red lines are contained in the given IPM set.

In one example, N1 may be equal to or larger than N2.

FIGS. 24-31 illustrate examples of templates that may be formed from one or more sub-templates. As discussed in further detail below, the template for a block may be selected for the specific block. For instance, the template may be selected based on decoded information about the specific block or based on availability of the sub-templates for the specific block. Although several examples are illustrated, other templates may be selected based on different combinations of the sub-templates.

FIG. 24 is a diagram of an example of a template 2400 including a left-above sub-template 2420 (Template-LA). The template 2400 may be selected for a block 2410, which may have dimensions of M samples horizontally and N samples vertically. The left-above sub-template 2420 may include left-above neighboring samples that are located both to the left of the block 2410 and above the block 2410. The left-above sub-template 2420 may have dimensions of L1 samples horizontally and L2 samples vertically. L1 and L2 may be defined for the block 2410, a slice including the block 2410, or a picture including the block 2410.

FIG. 25 is a diagram of an example of a template 2500 including a left sub-template 2440 (Template-L) and an above sub-template 2430 (Template-A). The template 2500 may be selected for a block 2410, which may have dimensions of M samples horizontally and N samples vertically. The left sub-template 2440 may include samples located to the left of the block 2410. The left sub-template 2440 may be adjacent the top edge of the block 2410. The left sub-template 2440 may have dimensions of L1 samples horizontally and N samples vertically. The above sub-template 2430 may include samples located above the block 2410. The above sub-template 2430 may be adjacent the top edge of the block 2410. The above sub-template 2430 may have dimensions of M samples horizontally and L2 samples vertically.

Figure 26:
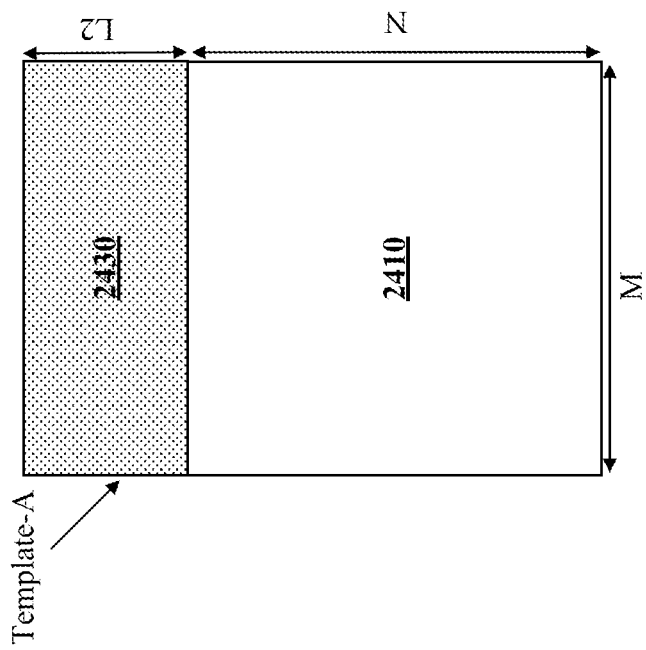
FIG. 26 is a diagram of an example template including an above sub-template in accordance with some aspects of the present disclosure.

FIG. 26 is a diagram of an example of a template 2600 including the above sub-template 2430 (Template-A). The template 2600 may be selected for a block 2410, which may have dimensions of M samples horizontally and N samples vertically. The above sub-template 2430 may include samples located above the block 2410. The above sub-template 2430 may have dimensions of M samples horizontally and L2 samples vertically.

Figure 27:
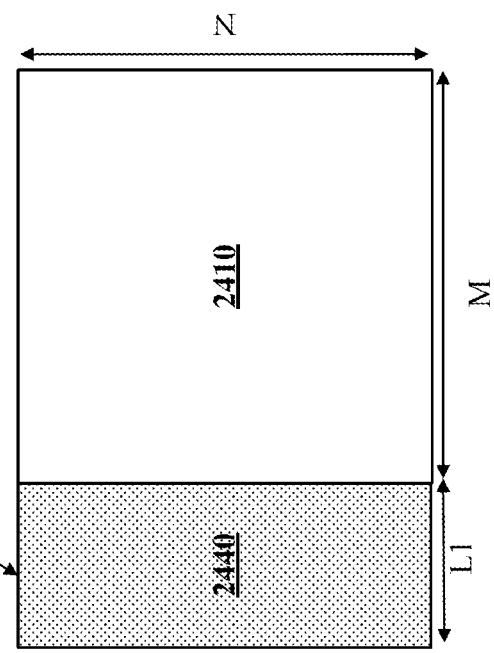
FIG. 27 is a diagram of an example template including a left sub-template in accordance with some aspects of the present disclosure.

FIG. 27 is a diagram of an example of a template 2700 including a left sub-template (Template-L). The template 2700 may be selected for a block 2410, which may have dimensions of M samples horizontally and N samples vertically. The left sub-template 2440 may include samples located to the left of the block 2410. The left sub-template 2440 may have dimensions of L1 samples horizontally and N samples vertically.

Figures 28, 29:
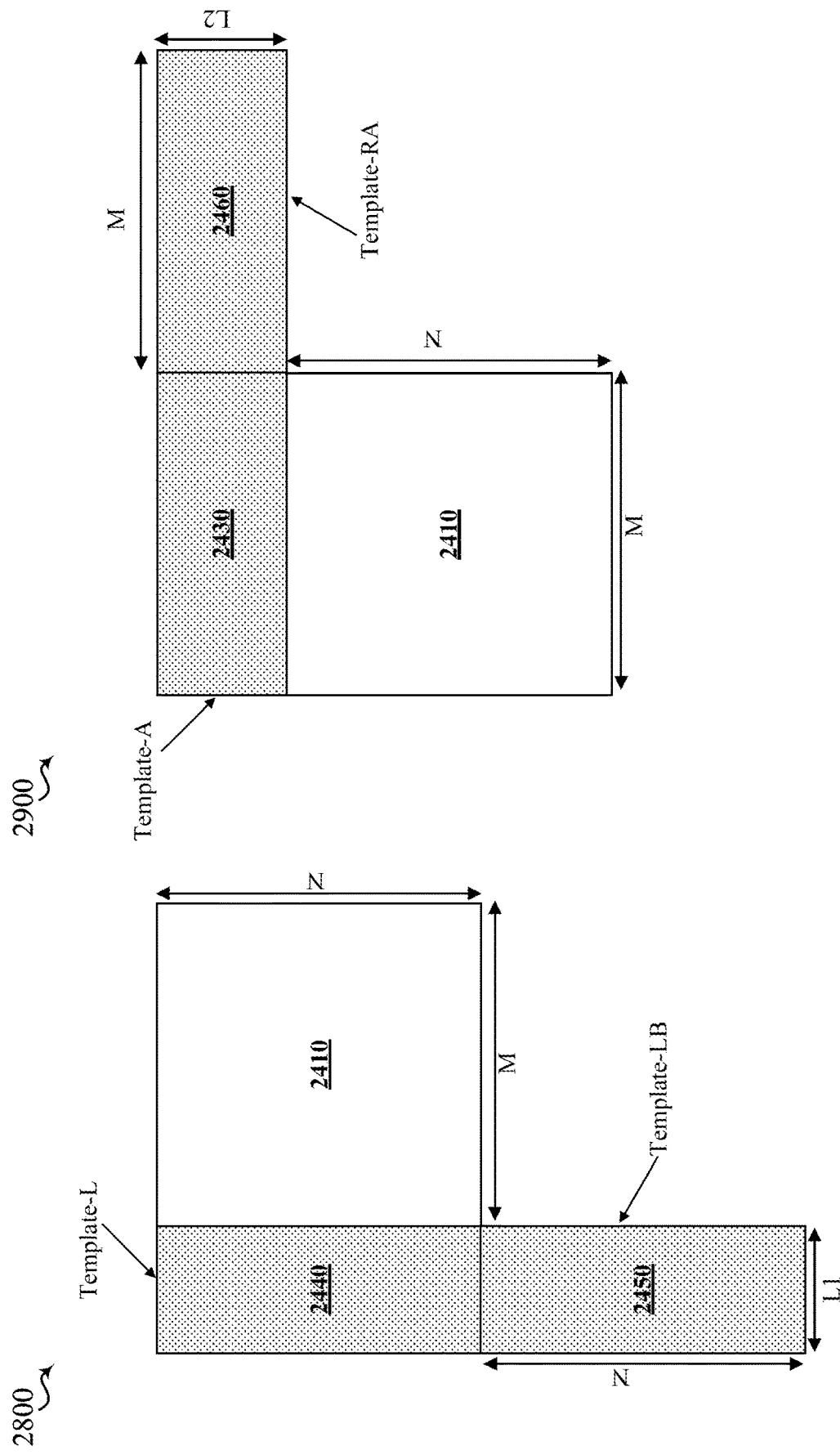
FIG. 28 is a diagram of an example template including a left sub-template and a left-below sub-template in accordance with some aspects of the present disclosure.
FIG. 29 is a diagram of an example template including an above sub-template and a right-above sub-template in accordance with some aspects of the present disclosure.

FIG. 28 is a diagram of an example of a template 2800 including the left sub-template 2440 (Template-L) and a left-below sub-template 2450 (Template-LB). The template 2800 may be selected for a block 2410, which may have dimensions of M samples horizontally and N samples vertically. The left sub-template 2440 may include samples located to the left of the block 2410. The left sub-template 2440 may have dimensions of L1 samples horizontally and N samples vertically. The left-below sub-template 2450 may include samples that are located both to the left of the block 2410 and below the block 2410. The left-below sub-template 2450 may have dimensions of L1 samples horizontally and N samples vertically.

FIG. 29 is a diagram of an example of a template 2900 including the above sub-template 2430 (Template-A) and a right-above sub-template 2460 (Template-RA). The template 2900 may be selected for a block 2410, which may have dimensions of M samples horizontally and N samples vertically. The above sub-template 2430 may include samples located above the block 2410. The above sub-template 2430 may have dimensions of M samples horizontally and L2 samples vertically. The right-above sub-template 2460 may include samples located both above the block 2410 and to the right of the block 2410. The right-above sub-template 2460 may have dimensions of M samples horizontally and L2 samples vertically.

Figure 30:
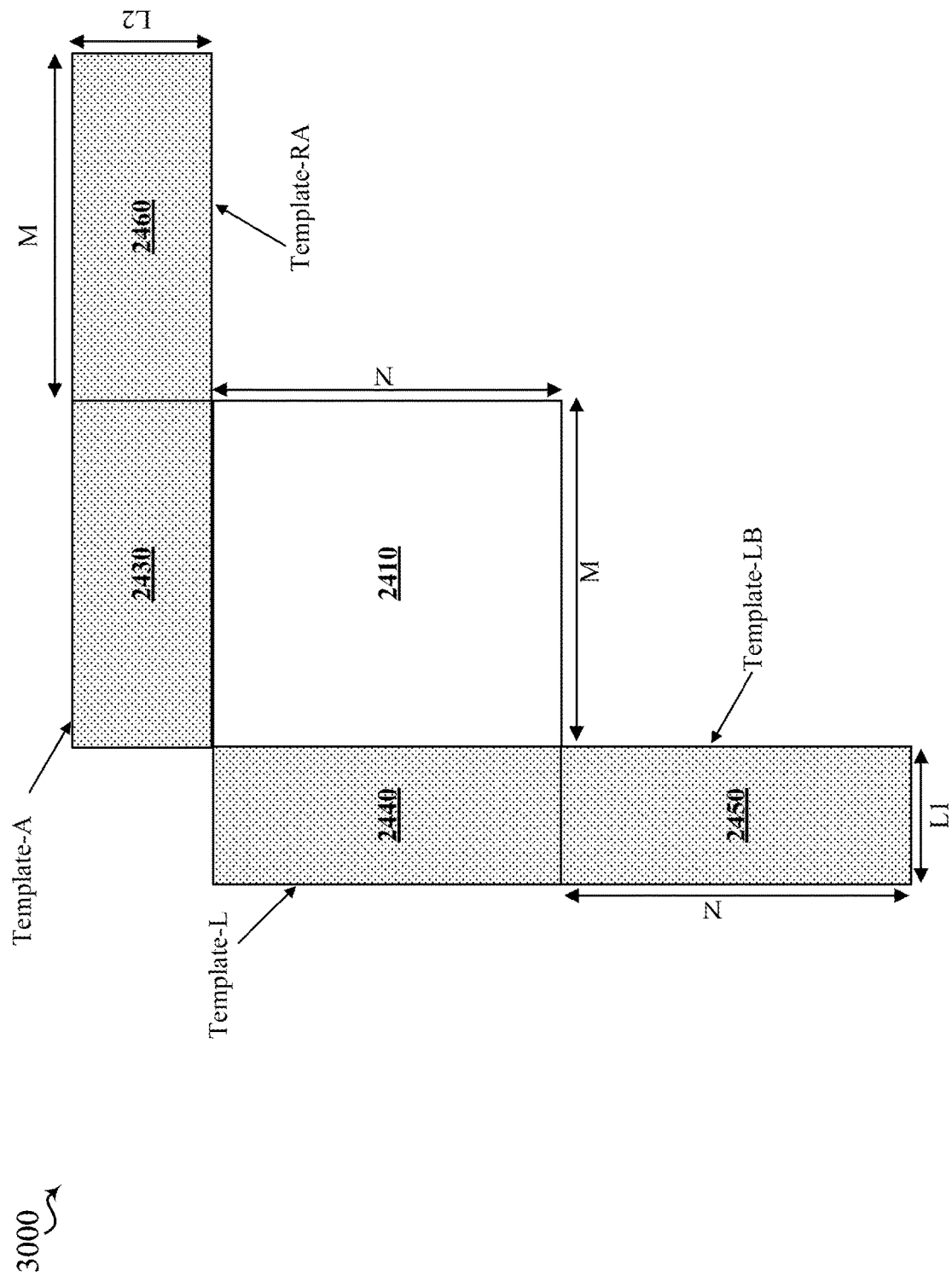
FIG. 30 is a diagram of an example template including a left sub-template, a left-below sub-template, an above sub-template, and a right-above sub-template in accordance with some aspects of the present disclosure.

FIG. 30 is a diagram of an example of a template 3000 including the left sub-template 2440, the left-below sub-template 2450, the above sub-template 2430, and the right-above sub-template 2460. The template 3000 may be selected for a block 2410, which may have dimensions of M samples horizontally and N samples vertically. The above sub-template 2430 may include samples located above the block 2410. The above sub-template 2430 may have dimensions of M samples horizontally and L2 samples vertically. The right-above sub-template 2460 may include samples located above and to the right of the block 2410. The right-above sub-template 2460 may have dimensions of M samples horizontally and L2 samples vertically. The left sub-template 2440 may include samples located to the left of the block 2410. The left sub-template 2440 may have dimensions of L1 samples horizontally and N samples vertically. The left-below sub-template 2450 may include samples located to the left of the block 2410 and below the block 2410. The left-below sub-template 2450 may have dimensions of L1 samples horizontally and N samples vertically.

Figure 31:
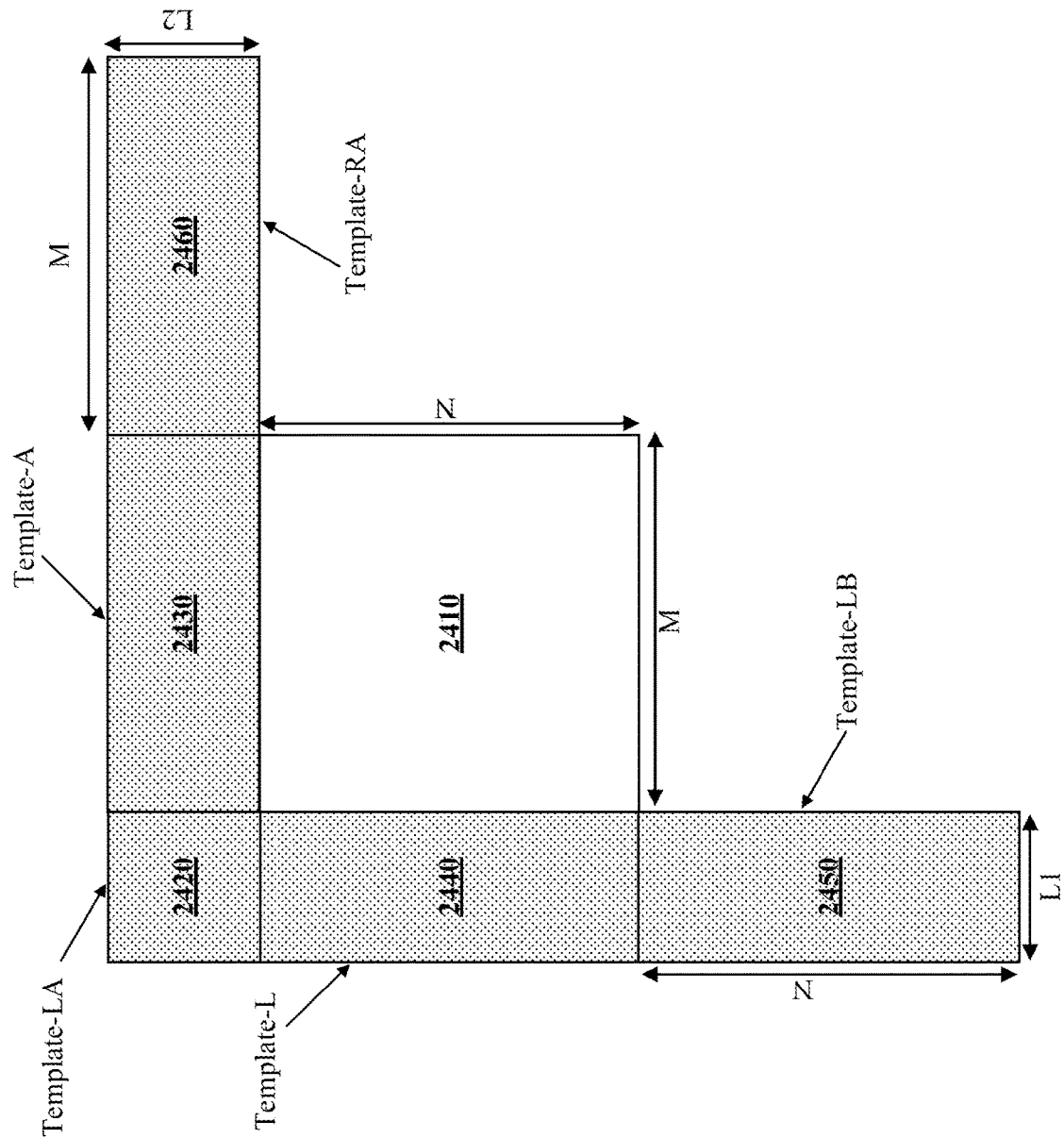
FIG. 31 is a diagram of an example template including a left-above sub-template, a left sub-template, a left-below sub-template, an above sub-template, and a right-above sub-template in accordance with some aspects of the present disclosure.

FIG. 31 is a diagram of an example of a template 3100 including the left-above sub-template 2420, the left sub-template 2440, the left-below sub-template 2450, the above sub-template 2430, and the right-above sub-template 2460. The template 3100 may be selected for a block 2410, which may have dimensions of M samples horizontally and N samples vertically. The left-above sub-template 2420 may include samples located to the left and above the block 2410. The left-above sub-template 2420 may have dimensions of L1 samples horizontally and L2 samples vertically. The above sub-template 2430 may include samples located above the block 2410. The above sub-template 2430 may have dimensions of M samples horizontally and L2 samples vertically. The right-above sub-template 2460 may include samples located above and to the right of the block 2410. The right-above sub-template 2460 may have dimensions of M samples horizontally and L2 samples vertically. The left sub-template 2440 may include samples located to the left of the block 2410. The left sub-template 2440 may have dimensions of L1 samples horizontally and N samples vertically. The left-below sub-template 2450 may include samples located to the left of and below the block 2410. The left-below sub-template 2450 may have dimensions of L1 samples horizontally and N samples vertically.

Figure 32:
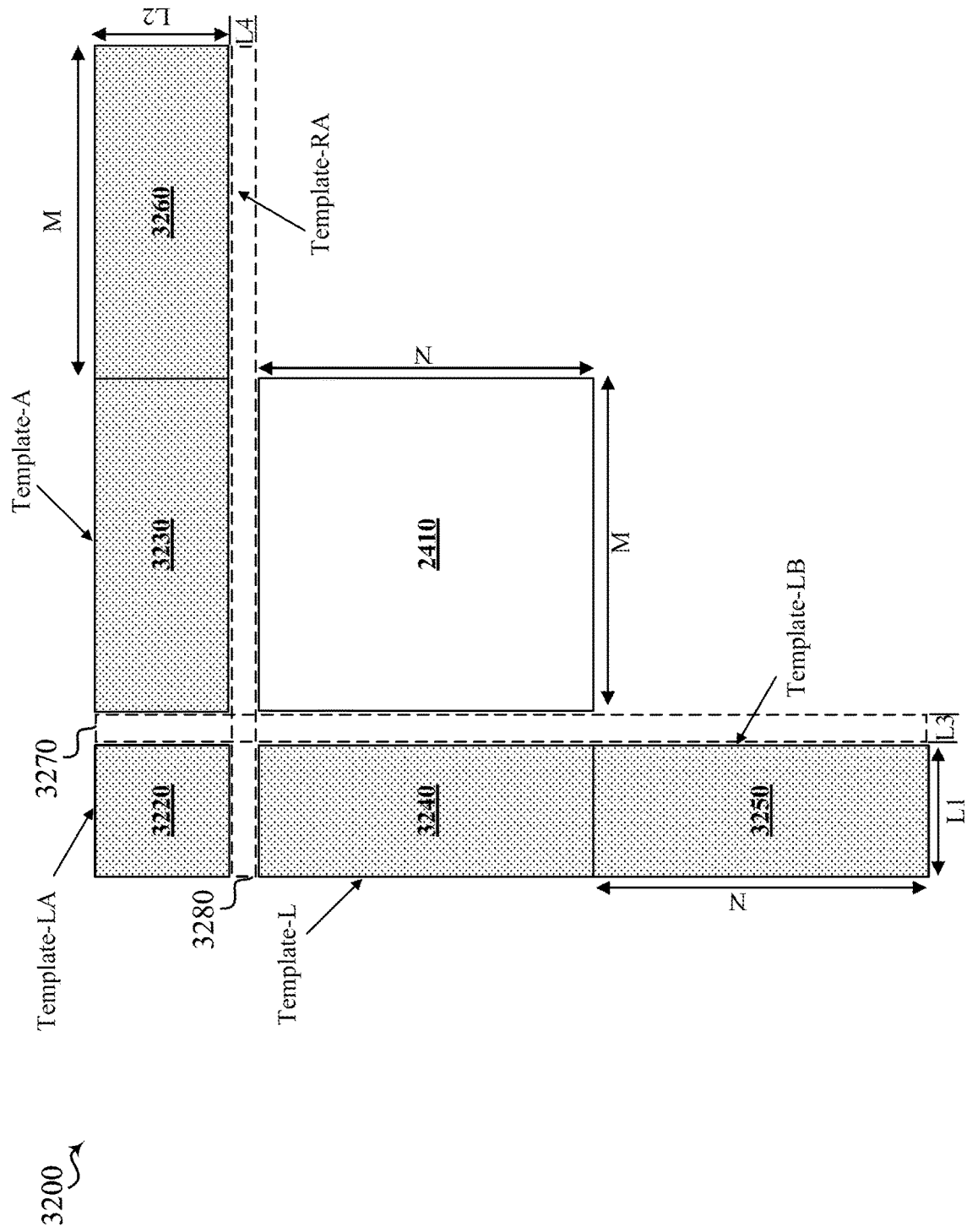
FIG. 32 is a diagram of an example template including sub-templates that are spaced apart from a target block in accordance with some aspects of the present disclosure.

FIG. 32 is a diagram of an example of a template 3200 including a left-above sub-template 3220, a left sub-template 3240, a left-below sub-template 3250, an above sub-template 3230, and a right-above sub-template 3260 that are spaced apart from a block. The example template 3200 may be selected for a block 2410, which may have dimensions of M samples horizontally and N samples vertically. In contrast to the sub-templates in FIGS. 24-31, the sub-templates in FIG. 32 may be spaced apart from the block 2410. For example, the left-above sub-template 3220, the left sub-template 3240, and the left-below sub-template 3260 may be spaced horizontally apart from the block 2410 by a gap 3270. The gap 3270 may have a horizontal dimension of L3 samples. The left-above sub-template 2420, the above sub-template 2430, and the right-above sub-template 2460 may be spaced vertically apart from the block 2410 by a gap 3280. The gap 3280 may have a vertical dimension of L4 samples. In an aspect, each of the sub-templates 3220, 3230, 3240, 3250, 3260 may have dimensions that are the same as a corresponding sub-template 2420, 2430, 2440, 2450, 2460 in FIGS. 24-31. Accordingly, in FIG. 32, the locations of the sub-templates 3220, 3230, 3240, 3250, 3260 are different, but the size of the sub-templates 3220, 3230, 3240, 3250, 3260 may be the same as in FIGS. 24-31.

Figure 33:
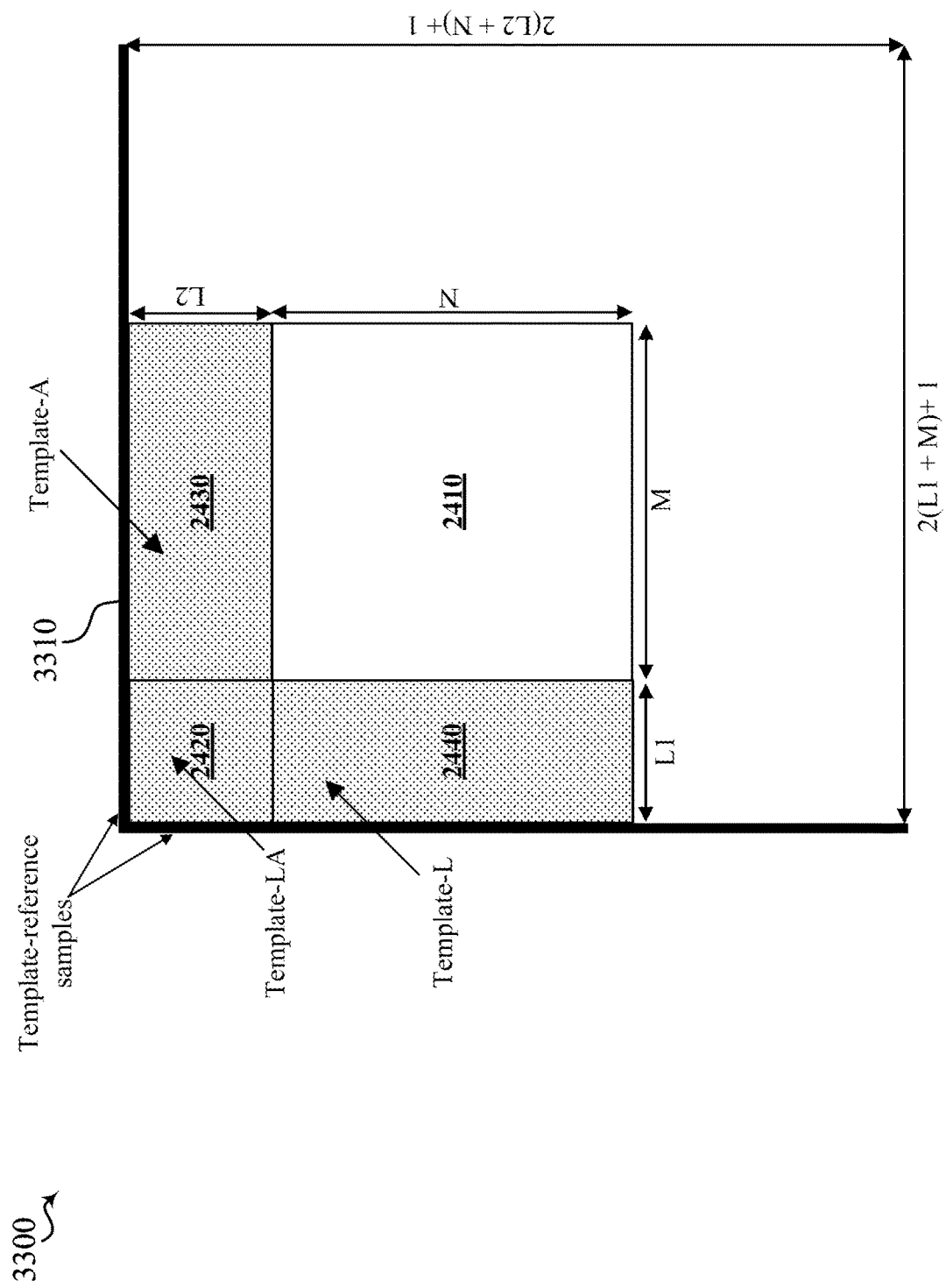
FIG. 33 is a diagram of example template-reference samples for a template including a left-above sub-template, a left sub-template, and an above sub-template in accordance with some aspects of the present disclosure.

FIG. 33 is a diagram of examples of template-reference samples 3310 for a template 3300 including a left-above sub-template 2420, a left sub-template 2440, and an above sub-template 2430. The example template 3300 may be selected for a block 2410, which may have dimensions of M samples horizontally and N samples vertically. The left-above sub-template 2420 may include samples located to the left and above the block 2410. The left-above sub-template 2420 may have dimensions of L1 samples horizontally and L2 samples vertically. The above sub-template 2430 may include samples located above the block 2410. The above sub-template 2430 may have dimensions of M samples horizontally and L2 samples vertically. The left sub-template 2440 may include samples located to the left of the block 2410. The left sub-template 2440 may have dimensions of L1 samples horizontally and N samples vertically. The template-reference samples 3310 may be a single row of samples located above the template 3300 and a single column of samples located to the left of the template 3300. The row of samples may have a length of 2(L1+M)+1. The column of samples may have a height of 2(L2+N)+1.

Figure 34:
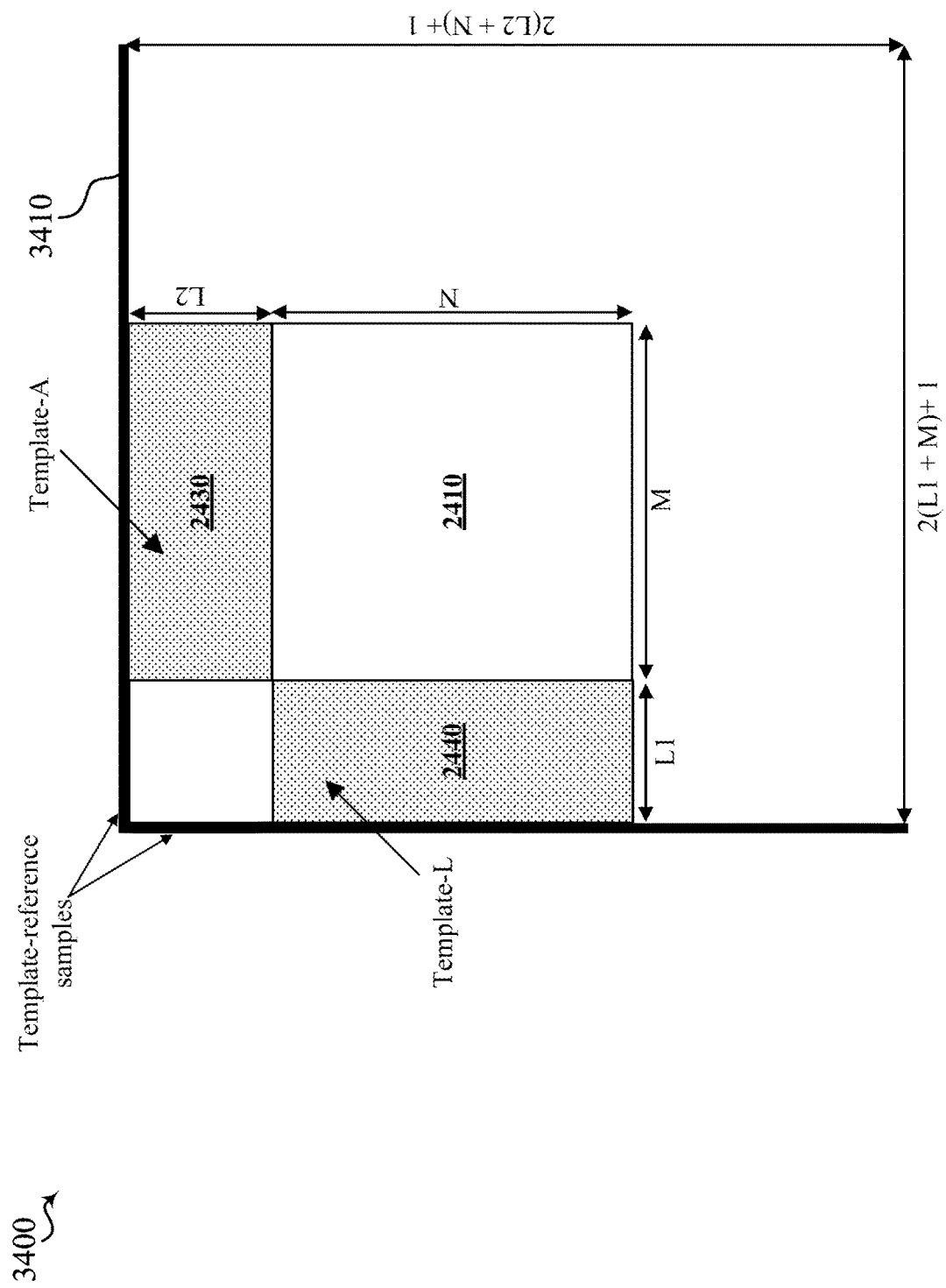
FIG. 34 is a diagram of example template-reference samples for a template including a left sub-template and an above sub-template in accordance with some aspects of the present disclosure.

FIG. 34 is a diagram 3400 of example template-reference samples 3410 for the template 2500 including the left sub-template 2440 and the above sub-template 2430. The example template 2500 may be selected for a block 2410, which may have dimensions of M samples horizontally and N samples vertically. The above sub-template 2430 may include samples located above the block 2410. The above sub-template 2430 may have dimensions of M samples horizontally and L2 samples vertically. The left sub-template 2440 may include samples located to the left of the block 2410. The left sub-template 2440 may have dimensions of L1 samples horizontally and N samples vertically. The template-reference samples may include one or more lines (e.g., rows or columns) of samples. For example, the template-reference samples 3410 may include a single row of samples located above the template 2500 and a single column of samples located to the left of the template 2500. The row of samples may have a length of 2(L1+M)+1. The column of samples may have a height of 2(L2+N)+1.

Figures 35, 36:
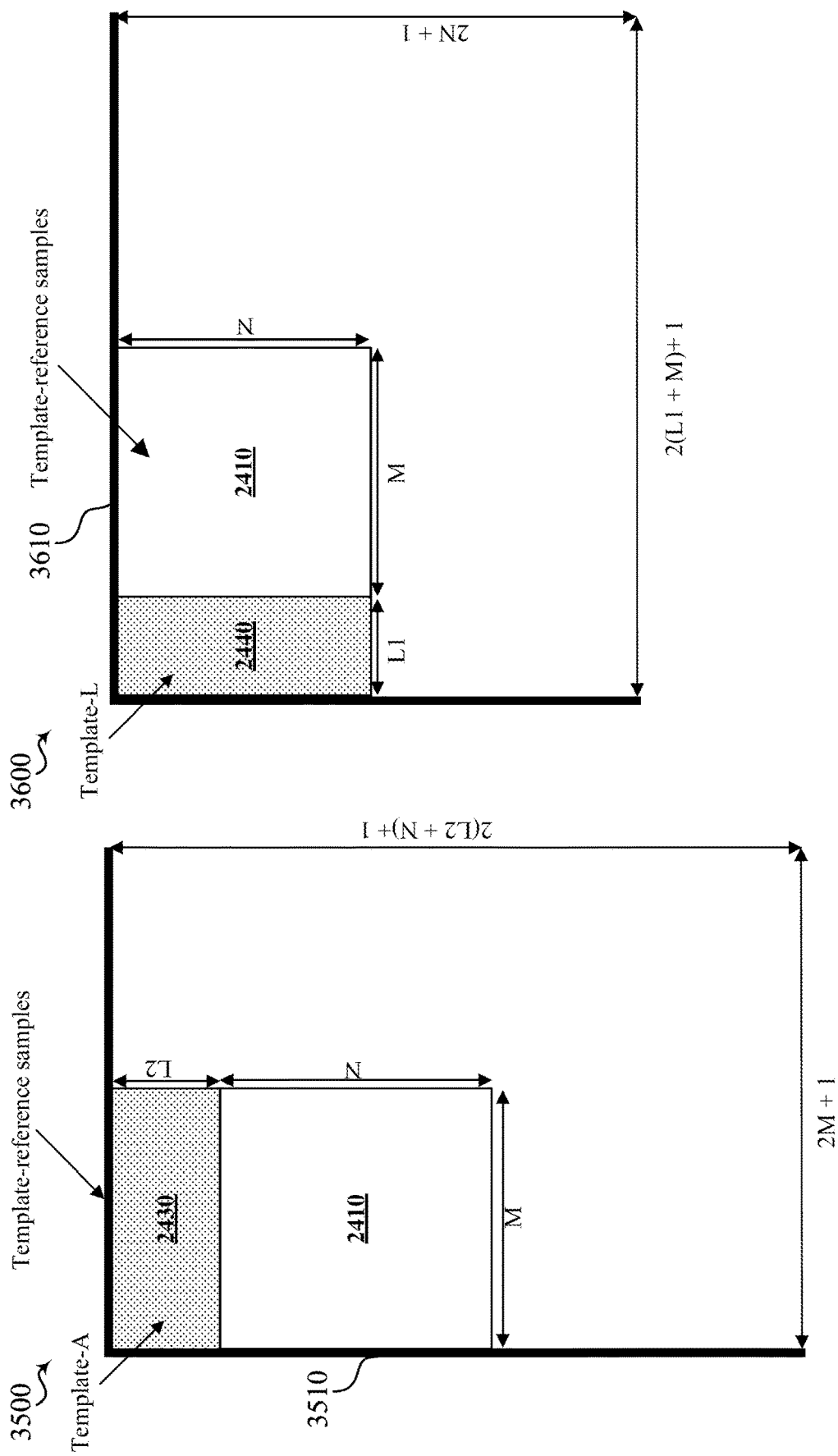
FIG. 35 is a diagram of example template-reference samples for a template including an above sub-template in accordance with some aspects of the present disclosure.
FIG. 36 is a diagram of example template-reference samples for a template including a left sub-template in accordance with some aspects of the present disclosure.
Figure 41:
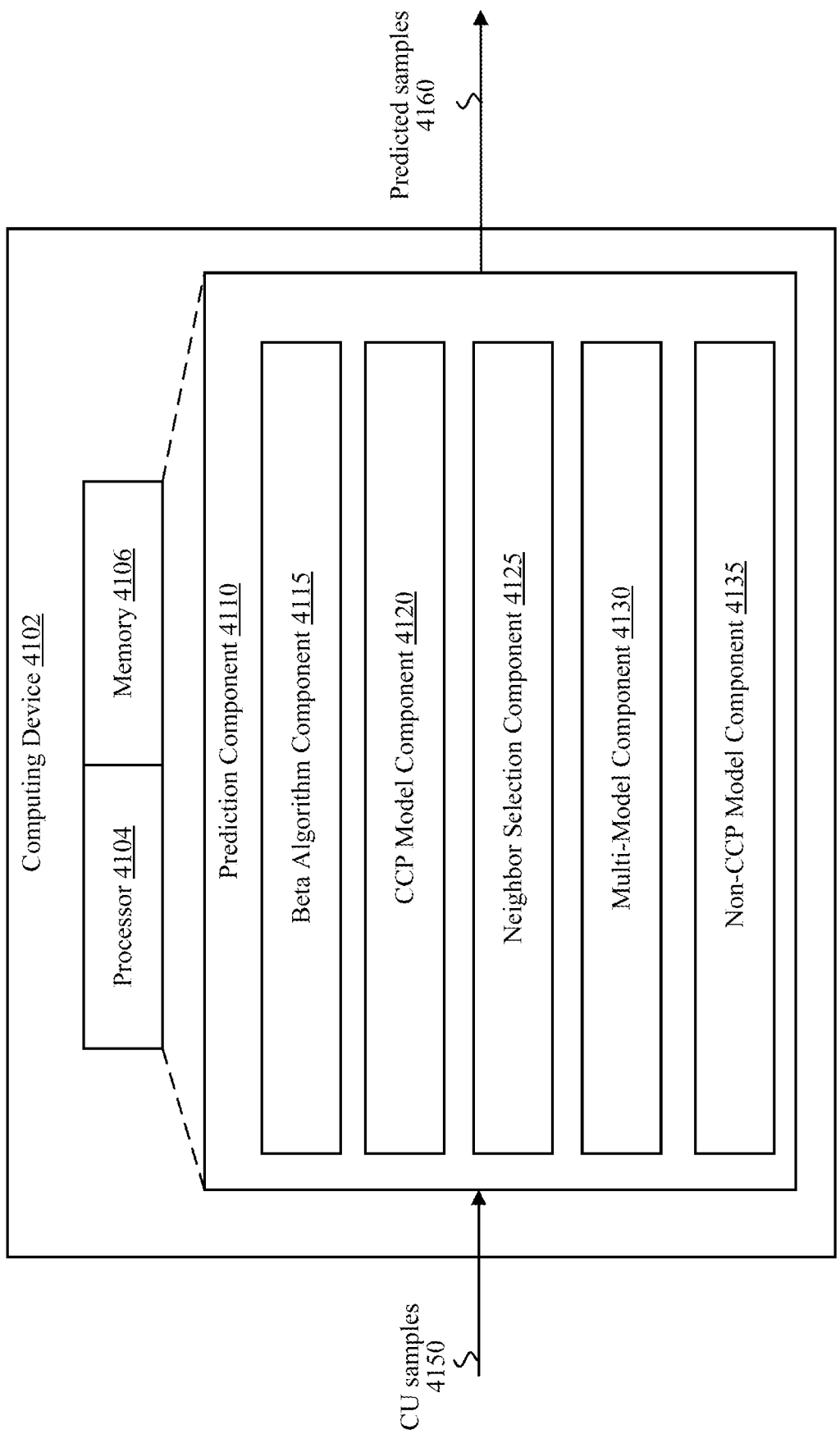
FIG. 41 is a diagram of an example cross-component predictor in accordance with some aspects of the present disclosure.

FIG. 35 is a diagram 3500 of example template-reference samples 3510 for the template 2600 including the above sub-template 2430. The template-reference samples 3510 may be a single row of samples located above the template 2600 and a single column of samples located to the left of the template 2600. The row of samples may have a length of 2M+1. The column of samples may have a height of 2(L2+N)+1.

FIG. 36 is a diagram 3600 of example template-reference samples 3610 for the template 2700 including the left sub-template 2440. The template-reference samples 3610 may be a single row of samples located above the template 2700 and a single column of samples located to the left of the template 2700. The row of samples may have a length of 2(L1+M)+1. The column of samples may have a height of 2N+1.

FIG. 37 is a diagram 3700 of example template-reference samples 3710 for the template 2600 including the above sub-template 2430. The template-reference samples 3710 may be a single row of samples located above the template 2600 and a single column of samples located to the left of the template 2600. The row of samples may have a length of 2(L1+M)+1. The column of samples may have a height of 2(L2+N)+1. Because the template 2600 does not include the left-above sub-template 2420 or the left sub-template 2440, the column of samples may be spaced from the template 2600 by a horizontal gap 3720 with a width of L1.

FIG. 38 is a diagram 3800 of example template-reference samples 3810 for the template 2700 including the left sub-template 2440. The template-reference samples 3810 may be a single row of samples located above the template 2700 and a single column of samples located to the left of the template 2700. The row of samples may have a length of 2(L1+M)+1. The column of samples may have a height of 2(L2+N)+1. Because the template 2700 does not include the left-above sub-template 2420 or the above sub-template 2430, the row of samples may be spaced from the template 2700 by a vertical gap 3820 with a height of L2.

FIG. 39 is a diagram 3900 of example template-reference samples 3910 for the template 2500 including the above sub-template 2430 and the left sub-template 2440. The template-reference samples 3910 may include a single column of samples located to the left of the template 2500. The column of samples may have a height of 2(L2+N)+1. Instead of a single row of template-reference samples, a portion 3920 of the row may be moved to a second row 3930 that is adjacent the left sub-template 2440. The portion 3920 may include L1 samples. The remaining portion in the first row may have a length of 2M+L1+1. In an aspect, selecting template-reference samples that are adjacent a sub-template included within the template may improve the prediction of the template.

FIG. 40 is a diagram 4000 of example template-reference samples 4010 for the template 2500 including the above sub-template 2430 and the left sub-template 2440. The template-reference samples 4010 may include a single row of samples located above the template 2500. The row of samples may have a length of 2(L1+M)+1. Instead of a single column of template-reference samples, a portion 4020 of the column may be moved to a second row 4030 that is adjacent the above sub-template 2430. The portion 4020 may include L2 samples. The remaining portion in the first column may have a height of 2N+L2+1. In an aspect, selecting template-reference samples that are adjacent a sub-template included within the template may improve the prediction of the template. In another aspect, both of the portion 3920 and the portion 4020 may be moved to the second row 3930 and the second row 4030, respectively.

Referring to FIGS. 41-50, during operation, a computing device 4102 may perform methods of CCP, via execution of a prediction component 4110 and/or one or more subcomponents of the prediction component 4110, by processor 4104 and/or memory 4106. In an aspect, the prediction component 4110 may include a beta algorithm component 4115. The prediction component 4110 may include a CCP model component 4120. The prediction component 4110 may include a neighbor selection component 4125. The prediction component 4110 may include a multi-model component 4130. The prediction component 4110 may include a non-CCP model component 4135. The prediction component 4110 and/or the one or more subcomponents may be implemented as hardware, software, or a combination thereof. The computing device 4102 may accept CU samples 4150 as inputs and provide predicted samples 4160 as outputs. In some instances, the blockWidth (BW) parameter and the blockHeight (BH) parameter represent the width and height of the current block, respectively. CCLM may refer to any kinds of CCLM modes, such as CCLM left mode (CCLM-L), CCLM top mode (CCLM-T), CCLM left-top mode (CCLM-LT), or multi-model CCLM.

Referring to FIG. 42, a method 4200 of deriving beta may be performed by the prediction component 4110, the beta algorithm component 4115, the processor 4104, and/or the memory 4106. In some implementations, at block 4204, the method 4200 may determine, for a conversion between a current video block of a video that is a chroma block coded with a cross-component prediction mode and a bitstream of the video, an offset parameter of a cross-component prediction model that is based on a derived sample value from two or more neighbor samples of the current video block. At block 4205, the method 4200 may perform the conversion based on the determining.

In one example, the parameter beta may be calculated based on a function such as average/mid/median/mean luma/chroma values from a portion or all neighbor samples.

Referring to FIG. 43, a method 4300 of deriving beta may be performed by the prediction component 4110, the beta algorithm component 4115, the processor 4104, and/or the memory 4106. In some implementations, at block 4304, the method 4300 may determine, for a conversion between a current video block of a video that is a chroma block coded with a multiple-model cross-component prediction mode and a bitstream of the video, a scaling parameter associated with a model or a group is dependent on neighbor samples of the current video block associated with the model or the group. At block 4305, the method 4300 may perform the conversion based on the determining.

In one example, beta derivation may be dependent on derived chroma value(s) and/or derived luma value(s). A chroma or luma derived value represent a value derived from reconstructed chroma or luma samples.

In one example, the calculation of beta may be dependent on a derived chroma value.

In one example, the calculation of beta may be dependent on a derived chroma value and a parameter dependent on a derived luma value.

For example, a derived value (e.g., derived luma value or derived chroma value) may be calculated as (min+max+offset)>>shift, where the shift may be a constant, e.g., 2, 4, etc. Here, the notation ">>" is denoted as a right shift operation. The notation "<<" is denoted as a left shift operation. In an implementation, the offset may be a constant, e.g., 0, 1, 2, etc. In one example, offset may be dependent on the value of shift, e.g., offset is equal to (1<<shift)>>1. In one example, the minimum may be the smallest value among all neighbor samples or a subset of neighbor samples. In an example, the maximum may be the greatest value among all neighbor samples or a subset of neighbor samples. In one example, the minimum may be the average of N smallest neighbor samples among all neighbor samples or a subset of neighbor samples., where N is a constant, such as N=2. In another example, the maximum may be the average of M greatest neighbor samples among all neighbor samples or a subset of neighbor samples., where M is a constant, such as M=2.

In an example, the derived sample value may be calculated as (S+offset)>>shift, where the shift may be dependent on the number of samples that used for the above calculation. For example, shift may be a constant, e.g., 2, 4, etc. For example, offset may be a constant, e.g., 0, 1, 2, etc. In an example, the offset may be dependent on the value of shift, e.g., offset is equal to (1<<shift)>>1. For example, S may be calculated as the sum of the values of L neighbor samples, wherein L=a*blockWidth, or b*blockHeight, or c*(blockWidth+blockHeight), with a, b, and c being integers.

In certain implementations, the disclosed methods may be appropriate single or multiple model calculations. For example, if multiple models are used, the disclosed methods may be applied to either one (or some, or all) of the model derivation. In another example, the disclosed methods may be applied to any kinds of CCLM mode, such as CCLM-LT, CCLM-T or CCLM-L. Beta may be calculated by the derived values as: beta=derivedChroma−((alpha*derivedLuma)>>shiftX), where alpha denotes the scaling factor applying to luma reconstructed value, shiftX denotes a constant value, and derivedChroma and derivedLuma may be calculated based on the aspects of the present disclosure. In above examples, the neighboring samples are those adjacent from current chroma block and/or corresponding luma block of the current chroma block. Alternatively, the neighboring samples are those non-adjacent from current chroma block and/or corresponding luma block of the current chroma block. In one example, indication of the non-adjacent samples may be signaled or derived on-the-fly (real time or near real time). For example, the indication may be derived during the encoding and/or decoding process of video images.

Referring to FIG. 44, a method 4400 of cross-component prediction may be performed by the prediction component 4110, the CCP model component 4120, the processor 4104, and/or the memory 4106. In some implementations, at block 4404, the method 4400 may determine, for a conversion between a current video block of a video that is a chroma block coded with a cross-component prediction mode and a bitstream of the video, model parameters for a cross-component prediction model for the current video block. At block 4405, the method 4400 may performing the conversion based on the determining, wherein during the determining, resampling more than one row of neighbor samples of the current video block or more than one column of neighbor samples of the current video block is applied.

In one example, when multiple-model cross-component prediction is used, the derivation of $X_2$ and/or $Y_2$ for a particular model/group, may be dependent on (e.g. equal to) a function (e.g., the average/mid/median/mean) of N smallest neighbor samples belong to this group (or corresponding to this model). Similarly, when multiple-model cross-component prediction is used, the derivation of $X_1$ and/or $Y_1$ for a particular model/group, may be dependent on (e.g. equal to) a function (e.g., the average/mid/median/mean) of N greatest neighbor samples belong to this group (or corresponding to this model). For example, N may be a constant, such as N=2. For example, N may be dependent on coded information, e.g., the block width, and/or block height. In one example, N may be dependent on how many neighbor samples belong to this group, e.g., N=1 if there are less than T counted neighbor samples belong to this group, and N=2 if the number of counted neighbor samples belong to this group is greater than or equal to T, where by T is a constant, such as T=4. For example, the above mentioned counted neighbor sample may be neighbor sample which satisfy a pre-determined condition, e.g., conditioned on the location, the sample value, etc.

Referring to FIG. 45, a method 4500 of cross-component prediction may be performed by the prediction component 4110, the CCP model component 4120, the processor 4104, and/or the memory 4106. In some implementations, at block 4504, the method 4500 may determining, for a conversion between a current video block of a video that is a chroma block coded with a cross-component prediction mode and a bitstream of the video, model parameters for a cross-component prediction model for the current video block. At block 4505, the method 4500 may performing the conversion based on the determining, wherein the model parameters are based on neighboring samples of the current video block, wherein at least one of a number or positions of the neighboring samples are dependent on at least one of a block width or a block height of the current video block. In one example, more than one rows/columns of luma neighbors which may be resampled may be taken into account for model derivation. Similarly, more than one rows/columns of chroma neighbors may be taken into account for model derivation. In one example, the number and positions of neighboring samples used for model calculation may be dependent on the block width and/or height.

Referring to FIG. 46, a method 4600 of cross-component prediction may be performed by the prediction component 4110, the CCP model component 4120, the processor 4104, and/or the memory 4106. In some implementations, at block 4604, the method 4600 may determine, for a conversion between a current video block of a video that is a chroma block coded with a cross-component prediction mode and a bitstream of the video, model parameters for a cross-component prediction model for the current video block. At block 4605, the method 4600 may performing the conversion based on the determining, wherein, during the determining, performing a bit-depth shift operation is applied. In one example, internal high bit-depth division operation may be used for model derivation. For example, the numbers may be left shifted by K bits before the division operation and right-shifted by K bits after the division operation.

Figure 47:
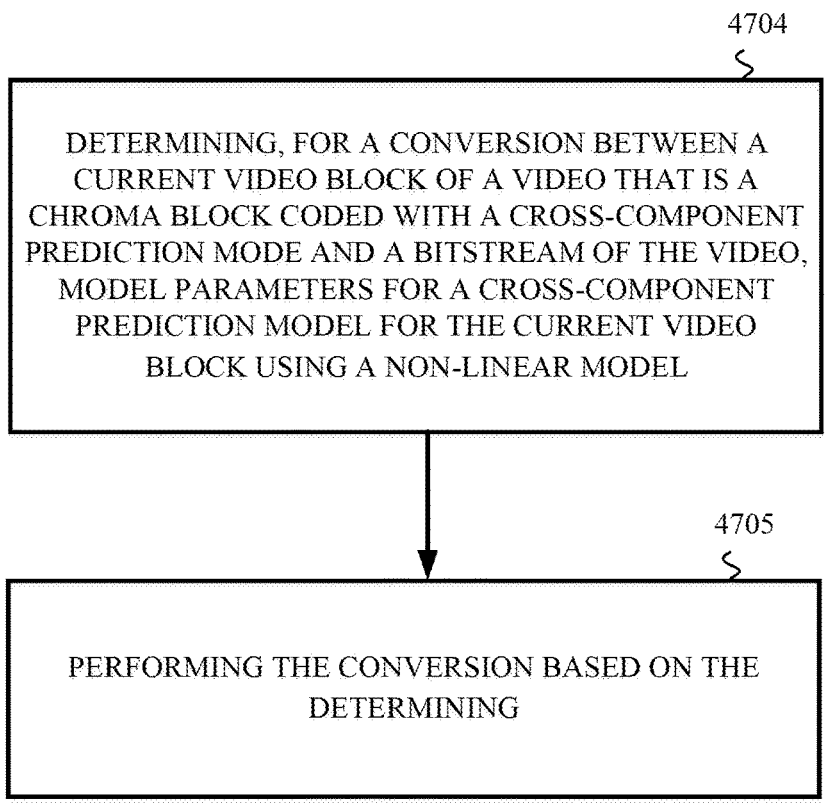
FIG. 47 is a flowchart of a fourth example method of cross-component prediction in accordance with some aspects of the present disclosure.

Referring to FIG. 47, a method 4700 of cross-component prediction may be performed by the prediction component 4110, the CCP model component 4120, the processor 4104, and/or the memory 4106. In some implementations, at block 4704, the method 4700 may determine, for a conversion between a current video block of a video that is a chroma block coded with a cross-component prediction mode and a bitstream of the video, model parameters for a cross-component prediction model for the current video block using a non-linear model. At block 4705, the method 4700 may performing the conversion based on the determining. In one example, a non-linear model may be used for cross-component predictions. For example, a chroma sample C may be predicted by a function f on a luma reconstructed sample (may be down-sampled) Y as C=f(Y), where f is a non-linear function, such as $f(Y)=aY^2+bY+c$ or $f(Y)=clip3(minC, maxC, aY+b)$.

Referring to FIG. 48, a method 4800 of cross-component prediction may be performed by the prediction component 4110, the CCP model component 4120, the processor 4104, and/or the memory 4106. In some implementations, at block 4804, the method 4800 may determine, for a conversion between a current video block of a video that is a chroma block coded with a cross-component prediction mode and a bitstream of the video, model parameters for a cross-component prediction model for the current video block. At block 4805, the method 4800 may perform the conversion based on the determining, wherein, during the determining, selecting neighbor samples for a cross-component prediction is applied. In one example, selected neighbor samples may be used for cross-component predictions. For example, a group of selected neighbor samples may be derived based on the reference line index of the multiple reference line (MRL) coding tool. In an example, the reference sample located in the same lines/rows indicated by the reference line index of the multiple reference line (MRL) coding tool, may be used for cross-component model calculation. In another example, for the reference line index of the multiple reference line (MRL) coding tool denoted as mrlIdx, the reference sample located in the k-th neighbor lines/rows where k=mrlIdx>>factor may be used for cross-component model calculation, where the factor is a constant, such as equaling to 1.

Referring to FIG. 49, a method 4900 of neighbor selection may be performed by the prediction component 4110, the neighbor selection component 4125, the processor 4104, and/or the memory 4106. In some implementations, at block 4904, the method 4900 may determine, for a conversion between a current video block of a video that is a chroma block coded with a cross-component prediction mode and a bitstream of the video, model parameters for a cross-component prediction model for the current video block. At block 4905, the method 4900 may perform the conversion based on the determining, wherein, during the determining, filtering neighbor samples for a cross-component prediction is applied. In one example, filtered neighbor samples may be used for cross-component predictions. For example, neighbor samples may be filtered according to a rule, and then used for the model derivation for cross-component prediction. For example, a portion of neighbor samples may be filtered and used for the model derivation for cross-component prediction. In one instance, the filter may be a low pass filter. In some implementations, the filter may be a 1-D filter or a 2-D filter. Different filters may be applied on luma and chroma neighbor samples.

In one example, the above-mentioned method may be applied to either neighbor rows or neighbor columns, or both.

For example, the above-mentioned method could be applied to either single tree block partition, or dual tree block partition. Furthermore, if the above-mentioned method is applied to dual tree block partition coding, the collocated luma block (which was used to derive mrlIdx for current chroma coding) may be fetched based on the top-left (or center) position associated with the current chroma block.

In an example, if multiple models are used, the above-mentioned method may be applied to either one (or some, or all) of the models.

Referring to FIG. 50, a method 5000 of neighbor selection may be performed by the prediction component 4110, the neighbor selection component 4125, the processor 4104, and/or the memory 4106. In some implementations, at block 5004, the method 500 may determine, for a conversion between a current video block of a video that is a chroma block and a bitstream of the video, utilizing one or more models for a cross-component prediction associated with a cross-component prediction mode. At block 5005, the method 5000 may perform the conversion based on the determining. In one example, for a current block, the computing device 4102 may be allowed to choose from a cross-component prediction mode classifying neighbors into one group or a cross-component prediction mode classifying neighbors into N groups. Alternatively, for a current block, the computing device 4102 may be allowed to choose from a cross-component prediction mode classifying neighbors into M group or a cross-component prediction mode classifying neighbors into N groups, wherein M>1 and N>1.

In one example, whether to use single-model or multiple-model (more than one model) or how many models may be explicit signalled by one or multiple syntax element(s) (e.g., a flag, or an index). Alternatively, whether to use M-model or N-model cross-component prediction may be explicitly signalled by a syntax element.

In one example, whether to use single-model or multiple-model (more than one model) or how many models may be on-the-fly (adaptively) determined according to a rule (e.g., without signalling a syntax element). Alternatively, whether to use M-model or N-model cross-component prediction may be on-the-fly determined.

In one example, whether to use a X-model cross-component prediction method or Y-model cross-component prediction method (Y!=X) may be dependent on a rule based on neighboring samples. In one example, X>=1. In an example, Y>=1. For example, the rule may be dependent on a cost (e.g., sum of absolute differences (SAD), sum of absolute transformed differences (SATD), mean squared error (MSE)) value. For example, a cost value may be calculated for each model on-the-fly. For example, the cost value may be calculated dependent the distortion between the original neighbor reconstructed values and the model fitted/predicted neighbor values. The distortion may be derived as a SAD, or a sum of squared difference (SSD). For example, the cross-component prediction method which results in a smaller cost may be finally chosen.

In one example, how many groups/models is used for a cross-component prediction mode may be dependent on a predefined number. For example, M groups/models may be used for cross-component prediction mode A1, and N groups/models may be used for cross-component prediction mode A2, wherein A1 and A2 are two different cross-component prediction modes allowed in the codec. In one instance, M and N may be constants. Alternatively, M=2 and N=3. In another examples, M=1 and N=2. In some examples, A1/A2 may be any LM mode from {LM_A, LM_L, CCLM, . . . }. For example, single-model LM_A (denoted by mode A1), and two-model LM_A (denoted by mode A2) may be allowed in a codec. And a coding block could be coded with either single-mode LM_A or two-model LM_A (but not both). For example, two-model LM_A (denoted by mode A1), and three-model LM_L (denoted by mode A2) may be allowed in a codec. And a coding block could be coded with either two-mode LM_A or three-model LM_L (but not both).

In alternative implementations, for a specified cross-component prediction mode, the number of groups/models used to code the current coding block may be determined on-the-fly (other than predefined/fixed). For example, a cross-component prediction mode allows both single-model and two-model approaches. Therefore, in such case, a coding block using this mode may be coded with either single-model or two-model methods, depending on a certain criteria/rule (such as determined by whether single-model or two-model fits the neighbors better).

In one example, the number of groups/models used for a cross-component prediction mode may be adaptively determined by the distributions/activities/diversities of neighbors. For example, whether to trigger multiple-model or whether to use M-model or N-model cross-component prediction may be dependent on how flat the neighbors are. In one example, M>=1 and/or N>=1. For example, a function is applied on neighboring samples to determine the how flat the neighboring samples are. The flatness of the neighboring samples may be determined based on the variance of the samples. For example, the function may calculate the variance of the neighboring samples. As variance decreases, the neighboring samples may be considered to be more flat. If the distribution of neighbor samples/pixels is flat enough (e.g., variance is less than a threshold), then the multiple-model cross-component prediction may be disallowed.

In one example, whether to trigger multiple-model (i.e., more than one model) cross-component prediction may be dependent on how many neighbors are counted. For example, if the number of counted neighbors is greater than (or, not less than) a threshold, then the multiple-model cross-component prediction may be used. For example, if the number of counted neighbors is less than (or, not greater than) a threshold, then the multiple-model cross-component prediction may be disallowed. For example, the above mentioned counted neighbors may be the neighbor pixels/samples that are used for the cross-component prediction mode. The threshold may depend on the dimensions of the current block.

In one example, different models may take different neighbor samples for model calculation. For example, which neighbors are used for the model calculation may be dependent on neighbor samples classification, e.g., neighbor samples may be classified into different groups based on the sample values, or any functions on sample values, such as the mean values, or variances, or the distributions, or the activities, or the diversities. In an example, one of the models may use neighbor samples from both left and above for model calculation. Another model may use neighbor samples from left (or, above) only for model calculation. In one example, one of the models may use M neighbor samples for model calculation. Another model may use N neighbor samples for model calculation. In some implementations, M may be dependent on block width, and/or block height and/or N may be dependent on block width, and/or block height.

In one example, more than one cross-component prediction modes may be applied to a coding block. In one example, different cross-component prediction mode may classify neighbors into different number of groups. For example, a first mode considers the neighbors as an entire group and derives a single model for the entire block. While a second mode splits the neighbors into T groups and derive T models for the entire block, i.e., one model for one group, wherein T is greater than one. In one example, multiple modes may be competed based on the neighbors samples (e.g., based on costs calculation as disclosed in bullet 4). In this case, no explicit syntax element is signalled to specify which mode among multiple modes is finally chosen for the current block coding.

Alternatively, a syntax element (e.g., an index, or a flag) may be signalled in the bitstream to specify which mode (with X models wherein X>=1) is finally chosen for the current block coding. For example, the syntax element may be coded with unary (or truncated unary, or truncated rice, or truncated binary, or fix-length) binarization process. For example, one or more bins of the syntax element may be context coded. In another example, for those cross-component prediction modes which classify neighbors into more than one group, its mode index may be greater than (or less than) the mode index of the cross-component prediction mode which treat neighbors as an entire group.

Whether to/how to signal the syntax element may depend on dimensions of the current block. For example, the syntax element may be only signalled in case of the current block being greater than a pre-defined size. In one example, the syntax element may be only signalled in case of the sum of width and height of the current block being greater than a pre-defined threshold. In another example, the syntax element may be only signalled in case the width is greater than a pre-defined threshold and/or height of the current block is greater than a pre-defined threshold. The comparison of greater than may be replaced by less than, not greater than, or not less than.

Referring to FIG. 51, a method 5100 of multi-model cross-component prediction may be performed by the prediction component 4110, the multi-model component 4130, the processor 4104, and/or the memory 4106. In some implementations, at block 5104, the method 5100 may determine, for a conversion between a current video block of a video that is a chroma block and a bitstream of the video, a first prediction for the current video block based on a first model for a cross-component prediction associated with a cross-component prediction mode and a second prediction for the current video block based on a second model for a non-cross-component prediction associated with a non-cross-component prediction mode. At block 5105, the method 5100 may performing the conversion based on the determining. For example, the non-cross-component prediction may be a prediction block derived by intra DM mode. For example, the non-cross-component prediction may be a prediction block derived by any intra prediction mode other than cross-component prediction mode. In one example, how to generate the cross-component prediction (which used for blending/mixing) may be dependent on a predefined cross-component prediction mode. In one example, how to generate the cross-component prediction (which used for blending/mixing) may be dependent on an adaptive selected cross-component prediction mode (e.g., a cross-component prediction mode determined by the cost calculated from neighbors).

In one example, a syntax element (e.g., a flag) may be signalled in the bitstream to specify whether the combined method (e.g., combining cross-component prediction with a particular prediction mode) is finally chosen for the current block coding. Alternatively, furthermore, the syntax element may be conditionally signalled. For example, the syntax element may be only signalled in case of a particular prediction mode (e.g., intra DM mode) is used for the current block. In an example, the syntax element may be only signalled in case of some particular prediction modes (e.g., any intra mode excluding cross-component intra prediction mode) is used for the current block. Whether to/how to signal the syntax element may depend on dimensions of the current block. For example, the syntax element may be only signalled in case of the current block is greater than a pre-defined size. For example, the syntax element may be only signalled in case of the sum of width and height of the current block is greater than a pre-defined threshold. For example, the syntax element may be only signalled in case the width is greater than a pre-defined threshold and/or height of the current block is greater than a pre-defined threshold. The comparison of greater than may be replaced by less than, not greater than, or not less than.

In the above aspects, a third prediction of the current block is generated by mixture or combining of a first prediction and a second prediction and the third prediction is then used to determine the reconstruction with residues at the decoder. Mixture or combining of the first prediction and the second prediction and the third prediction may refer to the following aspects. A third prediction is generated as a weighted sum of the first prediction and the second prediction. The weighting values may be fixed such as (½, ½). The weighting values may vary for different positions in a block. A third prediction is generated as spatial mixture of the first prediction and the second prediction. For some positions, the third prediction is set equal to the first prediction. For some other positions, the third prediction is set equal to the second prediction.

Referring to FIG. 52, a method 5200 of integrating models for cross-component prediction with non-cross-component prediction models may be performed by the prediction component 4110, the non-CCP model component 4135, the processor 4104, and/or the memory 4106. In some implementations, at block 5205, the method 5200 may generate a first prediction block based on a first model for a cross-component prediction associated with a cross-component prediction mode. At block 5210, the method 5200 may generate a second prediction block based on a second model for a non-cross-component prediction associated with a non-cross-component prediction mode.

Aspects of the present disclosure include a method for determining, for a conversion between a current video block of a video that is a chroma block coded with a cross-component prediction mode and a bitstream of the video, an offset parameter of a cross-component prediction model that is based on a derived sample value from two or more neighbor samples of the current video block and performing the conversion based on the determining.

Any of the methods above, wherein the cross-component prediction mode is a cross-component linear model mode.

Any of the methods above, wherein the two or more neighbor samples include all neighbor samples of the current video block.

Any of the methods above, wherein the two or more neighbor samples refer to neighbor luma samples and/or neighbor chroma samples located at top rows and/or left columns outside the current video block.

Any of the methods above, wherein the two or more neighbor samples are from a group of neighbor samples, wherein the group includes a portion of all neighbor samples of the current video block.

Any of the methods above, wherein all neighbor samples are classified into different groups based on at least one of sample values, or any functions on sample values, or variances, or distributions, or activities, or diversities.

Any of the methods above, wherein the derived sample value is based on at least one of an average chroma value, a midrange chroma value, a median chroma value, an average luma value, a midrange luma value, or a median luma value of the two or more neighbor samples.

Any of the methods above, wherein the derived sample value is derived from neighbor reconstructed samples of the current video block.

Any of the methods above, wherein the derived sample value is a derived chroma value or a derived luma value.

Any of the methods above, wherein determining the offset parameter comprises determining the offset parameter based on the derived chroma value.

Any of the methods above, wherein determining the offset parameter comprises determining the offset parameter based on the derived chroma value and a parameter dependent on the derived luma value.

Any of the methods above, wherein the derived sample value is a sum of a minimum value, a maximum value, and an offset factor, wherein the sum is right-shifted by a shift factor.

Any of the methods above, wherein the shift factor is equal to 2 or 4.

Any of the methods above, wherein the offset factor is a constant value.

Any of the methods above, wherein the offset factor is equal to 0, 1 or 2.

Any of the methods above, wherein the offset factor is dependent on the shift.

Any of the methods above, wherein the minimum value is a minimum value associated with the two or more neighbor samples of the current video block.

Any of the methods above, wherein the maximum value is a maximum value associated with the two or more neighbor samples of the current video block.

Any of the methods above, wherein the minimum value is an average of N smallest neighbors samples of two or more neighbor samples of the current video block, wherein N is a constant.

Any of the methods above, wherein the maximum value is an average of N largest neighbors samples of two or more neighbor samples of the current video block, wherein N is a constant.

Any of the methods above, wherein N=2.

Any of the methods above, wherein the derived sample value is a sum of a parameter S and an offset factor, wherein the sum is right-shifted by a shift factor.

Any of the methods above, wherein the shift factor is dependent on a number of the neighbor reconstructed samples.

Any of the methods above, wherein the shift factor is a constant value.

Any of the methods above, wherein the shift factor is equal to 2 or 4.

Any of the methods above, wherein the offset factor is equal to 0, 1 or 2.

Any of the methods above, wherein the offset factor is dependent on the shift factor.

Any of the methods above, wherein the parameter S is a parameter sum of L neighbor samples of the current video block, wherein L equals to a×blockWidth, b×blockHeight, or c×(blockWidth+blockHeight), wherein a, b, and c are integers.

Any of the methods above, wherein determining the offset parameter further comprises determining the offset parameter based on one or more models.

Any of the methods above, wherein determining the offset parameter further comprises determining the offset parameter during a cross-component linear model left-top (CCLM-LT) mode, a cross-component linear model left (CCLM-L) mode, or a cross-component linear model top (CCLM-T) mode.

Any of the methods above, wherein the offset parameter is a difference between a derived chroma and a product of α and a derived luma value, wherein α is scaling parameter applying to a luma reconstructed value and the difference is right-shifted by a shift factor.

Any of the methods above, wherein the two or more neighbor samples are adjacent to the current video block, wherein the current video block includes at least one of a chroma block or a luma block.

Any of the methods above, wherein the two or more neighbor samples are non-adjacent to the current video block, wherein the current video block includes at least one of a chroma block or a luma block.

Any of the methods above, wherein an indication that the two or more neighbor samples are non-adjacent is included in the bitstream or derived on-the-fly.

Aspects of the present disclosure include a method for determining, for a conversion between a current video block of a video that is a chroma block coded with a multiple-model cross-component prediction mode and a bitstream of the video, a scaling parameter associated with a model or a group is dependent on neighbor samples of the current video block associated with the model or the group and performing the conversion based on the determining.

Any of the methods above, wherein the scaling parameter is dependent on a smallest neighbor sample associated with the model or the group and/or a largest neighbor samples associated with the model or the group.

Any of the methods above, wherein the scaling parameter is dependent on more than one smallest neighbor sample associated with the model or the group and/or more than one largest neighbor samples associated with the model or the group.

Any of the methods above, wherein all neighbor samples of current video block are classified into different groups based on at least one of sample values, or any functions on sample values, or variances, or distributions, or activities, or diversities.

Any of the methods above, wherein the scaling parameter is dependent on an average value, a midrange value, a median value, or a mean value of N smallest neighbor samples or N largest neighbor samples.

Any of the methods above, wherein N is a constant.

Any of the methods above, wherein N=2.

Any of the methods above, wherein N is dependent on coded information.

Any of the methods above, wherein the coded information includes at least one of a block width or a block height.

Any of the methods above, wherein N is dependent on a number of the neighbor samples in the group.

Any of the methods above, wherein N is dependent on a number of counted neighbor samples of the current video block, wherein the counted neighbor samples satisfy a condition.

Aspects of the present disclosure include a method for determining, for a conversion between a current video block of a video that is a chroma block coded with a cross-component prediction mode and a bitstream of the video, model parameters for a cross-component prediction model for the current video block, and performing the conversion based on the determining, wherein during the determining, resampling more than one row of neighbor samples of the current video block or more than one column of neighbor samples of the current video block is applied.

Any of the methods above, wherein the cross-component prediction mode is a cross-component linear model mode or a multiple-model cross-component prediction mode.

Any of the methods above, wherein the more than one row of neighbors include more than one row of chroma neighbors or more than one row of luma neighbors and the more than one column of neighbors include more than one column of chroma neighbors or more than one column of luma neighbors.

Aspects of the present disclosure include a method for determining, for a conversion between a current video block of a video that is a chroma block coded with a cross-component prediction mode and a bitstream of the video, model parameters for a cross-component prediction model for the current video block and performing the conversion based on the determining, wherein the model parameters are based on neighboring samples of the current video block, wherein at least one of a number or positions of the neighboring samples are dependent on at least one of a block width or a block height of the current video block.

Any of the methods above, wherein the cross-component prediction mode is a cross-component linear model mode or a multiple-model cross-component prediction mode.

Aspects of the present disclosure include a method for determining, for a conversion between a current video block of a video that is a chroma block coded with a cross-component prediction mode and a bitstream of the video, model parameters for a cross-component prediction model for the current video block and performing the conversion based on the determining, wherein, during the determining, performing a bit-depth shift operation is applied.

Any of the methods above, wherein the cross-component prediction mode is a cross-component linear model mode or a multiple-model cross-component prediction mode.

Any of the methods above, further comprises left shifting at least one of the model parameters by K bits before performing the bit-depth shift division operation and right shifting the at least one of the model parameters by K bits after performing the bit-depth shift division operation.

Aspects of the present disclosure include a method for determining, for a conversion between a current video block of a video that is a chroma block coded with a cross-component prediction mode and a bitstream of the video, model parameters for a cross-component prediction model for the current video block using a non-linear model and performing the conversion based on the determining.

Any of the methods above, wherein the cross-component prediction mode is a cross-component linear model mode or a multiple-model cross-component prediction mode.

Any of the methods above, wherein calculating the model parameters comprises predicting a chroma sample C based on a luma reconstructed sample Y using a first function $f(Y)=a\ Y^2+b\ Y+c$ or a second function $f(Y)=clip3(minC, maxC, a\ Y+b)$ where a, b, and c are real numbers.

Aspects of the present disclosure include a method for determining, for a conversion between a current video block of a video that is a chroma block coded with a cross-component prediction mode and a bitstream of the video, model parameters for a cross-component prediction model for the current video block and performing the conversion based on the determining, wherein, during the determining, selecting neighbor samples for a cross-component prediction is applied.

Any of the methods above, further comprising determining a group of the selected neighbor samples based on a reference line index of a multiple reference line (MRL) coding tool.

Any of the methods above, wherein a reference sample located in same lines or same rows indicated by the reference line index of MRL coding tool is used for the cross-component prediction.

Any of the methods above, wherein the reference line index is smaller than, or smaller than or equal to, a factor.

Any of the methods above, wherein the selecting neighbor samples is applied to at least one of neighbor rows or neighbor columns.

Any of the methods above, wherein the selecting neighbor samples is applied to at least one of a single tree block partition or a dual tree block partition.

Any of the methods above, further comprising identifying a collocated luma block at a top-left position or center position of the current video block for dual tree block partition.

Any of the methods above, wherein selecting the neighbor samples comprises selecting the neighbor samples for at least one model of multiple models used for the cross-component prediction.

Aspects of the present disclosure include a method for determining, for a conversion between a current video block of a video that is a chroma block coded with a cross-component prediction mode and a bitstream of the video, model parameters for a cross-component prediction model for the current video block, performing the conversion based on the determining, wherein, during the determining, filtering neighbor samples for a cross-component prediction is applied.

Any of the methods above, wherein filtering the neighbor samples comprises filtering the neighbor samples with one or more rules Any of the methods above, wherein filtering the neighbor samples comprises filtering with a low pass filter.

Any of the methods above, wherein filtering the neighbor samples comprises filtering with a 1-D filter or a 2-D filter.

Any of the methods above, wherein filtering the neighbor samples comprises filtering luma neighbor samples with a first filter and chroma neighbor samples with a second filter.

Any of the methods above, wherein filtering the neighbor samples is applied to at least one of neighbor rows or neighbor columns.

Any of the methods above, wherein the filtering the neighbor samples is applied to at least one of a single tree block partition or a dual tree block partition.

Any of the methods above, further comprising identifying a collocated luma block at a top-left position or center position of the current video block for dual tree block partition.

Any of the methods above, wherein filtering the neighbor samples comprises filtering the neighbor samples for at least one model of multiple models used for the cross-component prediction.

Aspects of the present disclosure include a method for determining, for a conversion between a current video block of a video that is a chroma block and a bitstream of the video, utilizing one or more models for a cross-component prediction associated with a cross-component prediction mode and performing the conversion based on the determining.

Any of the methods above, wherein the cross-component prediction mode is a first cross-component prediction mode that classifies neighbors of the current video block into one group.

Any of the methods above, wherein the cross-component prediction mode is a second cross-component prediction mode that classifies the neighbors into N groups.

Any of the methods above, wherein the cross-component prediction mode is selected from at least two cross-component prediction mode, wherein the at least two cross-component prediction mode include a first cross-component prediction mode that classifies neighbors of the current video block into M groups and a second cross-component prediction mode that classifies the neighbors into N groups.

Any of the methods above, wherein M=1, and N is larger than 1.

Any of the methods above, wherein M is larger than 1, and N is larger than 1.

Any of the methods above, wherein an indicator indicating utilizing the one or more models for the cross-component prediction is included in the bitstream.

Any of the methods above, wherein a first syntax element indicating a number of models for the cross-component prediction is included in the bitstream.

Any of the methods above, wherein a second syntax element indicating utilizing a M-mode cross-component prediction or a N-mode cross-component prediction is included in the bitstream.

Any of the methods above, further comprising determining, on-the-fly, to utilize the one or more models for the cross-component prediction.

Any of the methods above, further comprising determining, on-the-fly, a number of models for the cross-component prediction.

Any of the methods above, further comprising determining, on-the-fly, to utilize a M-mode cross-component prediction or a N-mode cross-component prediction.

Any of the methods above, wherein M and N are constants.

Any of the methods above, wherein M=2 and N=3.

Any of the methods above, wherein M=1 and N=2.

Any of the methods above, further comprising determining to utilize a X-model cross-component prediction method or a Y-model cross-component prediction method based on a rule associated with neighbor samples.

Any of the methods above, wherein X is greater than or equal to 1.

Any of the methods above, wherein Y is greater than or equal to 1.

Any of the methods above, wherein the rule is dependent on a cost value or a cost function.

Any of the methods above, wherein the cost value or the cost function is associated with at least one of a sum of absolute differences (SAD), a sum of absolute transformed differences (SATD), a mean squared error (MSE), a sum of squared differences (SSD), or a peak signal-to-noise ratio (PSNR).

Any of the methods above, further comprising calculating the cost values, on-the-fly, associated with the SAD, the SATD, the MSE, the SSD, or the PSNR.

Any of the methods above, wherein calculating the cost value further comprises calculating the cost value based on a distortion between original neighbor reconstructed values and model predicted neighbor values.

Any of the methods above, further comprising selecting a lowest cost value of the calculated cost values.

Any of the methods above, further comprising determining a first number of groups or a second number of models utilized for the cross-component prediction.

Any of the methods above, wherein the first number and the second number are constants.

Any of the methods above, wherein the cross-component prediction mode is one of a linear mode above, a linear mode left, or a cross-component linear mode.

Any of the methods above, wherein determining the first number or the second number comprises determining the first number or the second number on-the-fly.

Any of the methods above, further comprising determining, adaptively, a first number of groups or a second number of models utilized for the cross-component prediction based on at least one of distributions of neighbors, activities of the neighbors, or diversities of the neighbors.

Any of the methods above, wherein the first number is greater than or equal to 1.

Any of the methods above, wherein the second number is greater than or equal to 1.

Any of the methods above, wherein determining comprises determining a variance of the neighbors.

Any of the methods above, wherein when the variance of the neighbors is smaller than (smaller than or equal to) a threshold, the multiple-model cross-component prediction is disallowed.

Any of the methods above, further comprising determining a number of models utilized for the cross-component prediction based on a number of counted neighbors.

Any of the methods above, wherein determining comprises comparing the number of counted neighbors to a threshold and determining the number of models to be greater than one in response to the number of counted neighbors being larger than the threshold Any of the methods above, further comprising refraining from utilizing multiple model cross-component prediction in response to the number of counted neighbors being lower than the threshold.

Any of the methods above, wherein the number of counted neighbors equals to a first number of neighbor pixels or a second number of neighbor samples used for the cross-component prediction.

Any of the methods above, wherein the threshold is dependent on dimensions of the current video block.

Any of the methods above, wherein utilizing the one or more models comprises utilizing a first model for first neighbor samples and a second model for second neighbor samples for the cross-component prediction.

Any of the methods above, further comprising determining to utilize the one or more models based on neighbor samples classifications of at least one of sample values, mean values of the sample values, variances of the sample values, distributions of sample values, activities, or diversities.

Any of the methods above, wherein the first model uses a first number of neighbor samples for calculation and the second model uses a second number of neighbor samples for calculation.

Any of the methods above, wherein at least one of the first number or the second number is dependent on a block width of the current video block or a block height of the current video block.

Any of the methods above, further comprising applying more than one cross-component prediction modes to the current video block.

Any of the methods above, wherein a first cross-component prediction mode of the more than one cross-component prediction modes classifies neighbors into a first number of groups and a second cross-component prediction mode of the more than one cross-component prediction modes classifies the neighbors into a second number of groups.

Any of the methods above, wherein the first cross-component prediction mode utilizes a first model for the current video block and the second cross-component prediction mode utilizes a plurality of models for the current video block.

Any of the methods above, wherein a syntax element indicating one or more selected modes of the more than one cross-component prediction modes for the current video block is included in the bitstream.

Any of the methods above, wherein the syntax element is coded with a unary, a truncated unary, a truncated rice, a truncated binary, or a fixed length binarization process.

Any of the methods above, wherein one or more bins of the syntax element are context coded.

Any of the methods above wherein a first cross-component prediction mode of the more than one cross-component prediction modes has a first mode index and a second cross-component prediction mode of the more than one cross-component prediction modes has a second mode index, the first cross-component prediction mode classifies neighbors into a plurality of groups, the second cross-component prediction mode classifies neighbors into a group, and the first mode index is greater than the second mode index.

Any of the methods above, wherein the syntax element is included in the bitstream based on dimensions of the current video block.

Any of the methods above, wherein the syntax element is included in the bitstream in response to a size of the current video block is larger than, or larger than or equal to, a threshold size.

Any of the methods above, wherein the syntax element is included in the bitstream in response to a sum of a width of the current video block and a height of the current video block is larger than, or larger than or equal to, a threshold.

Any of the methods above, wherein the syntax element is included in the bitstream in response to a width of the current video block is larger than, or larger than or equal to, a threshold width or a height of the current video block is larger than, or larger than or equal to, a threshold height.

Aspects of the present disclosure include a method for determining, for a conversion between a current video block of a video that is a chroma block and a bitstream of the video, a first prediction for the current video block based on a first model for a cross-component prediction associated with a cross-component prediction mode and a second prediction for the current video block based on a second model for a non-cross-component prediction associated with a non-cross-component prediction mode and performing the conversion based on the determining.

Any of the methods above, further comprising combining the first prediction and the second prediction.

Any of the methods above, wherein the combining the first prediction and the second prediction comprises blending or mixing the first prediction and the second prediction.

Any of the methods above, wherein the non-cross-component prediction mode is an intra derived mode.

Any of the methods above, wherein the non-cross-component prediction mode is an intra prediction mode.

Any of the methods above, wherein determining the first prediction comprises determining the first prediction based on an adaptively selected cross-component prediction mode.

Any of the methods above, wherein determining the first prediction comprises determining the first prediction based on a predefined cross-component prediction mode.

Any of the methods above, further comprising a syntax element for indicating a selection of the cross-component prediction mode and the non-cross-component prediction mode is included in the bitstream.

Any of the methods above, wherein the syntax element is conditionally included in the bitstream.

Any of the methods above, wherein the syntax element is included in the bitstream based at least on the non-cross-component prediction mode or the cross-component prediction mode.

Any of the methods above, wherein the syntax element is included in the bitstream based on dimensions of the current video block.

Any of the methods above, wherein the syntax element is included in the bitstream in response to a size of the current video block is larger than (larger than or equal to) a threshold size.

Any of the methods above, wherein the syntax element is included in the bitstream in response to a sum of a width of the current video block and a height of the current video block is larger than, or larger than or equal to, a threshold.

Any of the methods above, wherein the syntax element is included in the bitstream in response to a width of the current video block is larger than, or larger than or equal to, a threshold width or a height of the current video block is larger than, or larger than or equal to, a threshold height.

Any of the methods above, further comprising determining a third prediction based on the first prediction and the second prediction.

Any of the methods above, wherein determining the third prediction comprises applying a first weight to the first prediction and applying a second weight to the second prediction.

Any of the methods above, wherein the first weight is 0.5 and the second weight is 0.5.

Any of the methods above, wherein the first weight and the second weight are different for different positions in the current video block.

Any of the methods above, wherein the third prediction is a spatial mixture of the first prediction and the second prediction.

Any of the methods above, wherein a first portion of the third prediction is identical to a first portion of the first prediction and a second portion of the third prediction is identical to a second portion of the second prediction.

Any of the methods above, wherein the conversion includes encoding the current video block into the bitstream.

Any of the methods above, wherein the conversion includes decoding the current video block from the bitstream.

Any of the methods above, wherein the conversion includes generating the bitstream from the current video block; and the method further comprises storing the bitstream in a non-transitory computer-readable recording medium.

Aspects of the present disclosure include an apparatus for processing video data comprising a processor and a non-transitory memory with instructions thereon, wherein the instructions upon execution by the processor, cause the processor to determine, for a conversion between a current video block of a video that is a chroma block coded with a cross-component prediction mode and a bitstream of the video, an offset parameter of a cross-component prediction model that is based on a derived sample value from two or more neighbor samples of the current video block and perform the conversion based on the determining.

Aspects of the present disclosure include an non-transitory computer-readable recording medium storing a bitstream of a video which is generated by a method performed by a video processing apparatus, wherein the method comprises determining, for a conversion between a current video block of a video that is a chroma block coded with a cross-component prediction mode and a bitstream of the video, an offset parameter of a cross-component prediction model that is based on a derived sample value from two or more neighbor samples of the current video block and generating the bitstream from the current video block based on the determining.

Aspects of the present disclosure include a determine, for a conversion between a current video block of a video that is a chroma block coded with a cross-component prediction mode and a bitstream of the video, an offset parameter of a cross-component prediction model that is based on a derived sample value from two or more neighbor samples of the current video block and perform the conversion based on the determining.

Aspects of the present disclosure include an apparatus for processing video data comprising a processor and a non-transitory memory with instructions thereon, wherein the instructions upon execution by the processor, cause the processor to determine, for a conversion between a current video block of a video that is a chroma block coded with a multiple-model cross-component prediction mode and a bitstream of the video, a scaling parameter associated with a model or a group is dependent on neighbor samples of the current video block associated with the model or the group and perform the conversion based on the determining.

Aspects of the present disclosure include a non-transitory computer-readable recording medium storing a bitstream of a video which is generated by a method performed by a video processing apparatus, wherein the method comprises determining, for a conversion between a current video block of a video that is a chroma block coded with a multiple-model cross-component prediction mode and a bitstream of the video, a scaling parameter associated with a model or a group is dependent on neighbor samples of the current video block associated with the model or the group and generating the bitstream from the current video block based on the determining.

Aspects of the present disclosure include a non-transitory computer-readable storage medium storing instructions that cause a processor to determine, for a conversion between a current video block of a video that is a chroma block coded with a multiple-model cross-component prediction mode and a bitstream of the video, a scaling parameter associated with a model or a group is dependent on neighbor samples of the current video block associated with the model or the group and perform the conversion based on the determining.

Aspects of the present disclosure include a apparatus for processing video data comprising a processor and a non-transitory memory with instructions thereon, wherein the instructions upon execution by the processor, cause the processor to determine, for a conversion between a current video block of a video that is a chroma block coded with a cross-component prediction mode and a bitstream of the video, model parameters for a cross-component prediction model for the current video block and perform the conversion based on the determining, wherein during the determining, resampling more than one row of neighbor samples of the current video block or more than one column of neighbor samples of the current video block is applied.

Aspects of the present disclosure include a non-transitory computer-readable recording medium storing a bitstream of a video which is generated by a method performed by a video processing apparatus, wherein the method comprises determining, for a conversion between a current video block of a video that is a chroma block coded with a cross-component prediction mode and a bitstream of the video, model parameters for a cross-component prediction model for the current video block and generating the bitstream from the current video block based on the determining, wherein during the determining, resampling more than one row of neighbor samples of the current video block or more than one column of neighbor samples of the current video block is applied.

Aspects of the present disclosure include a non-transitory computer-readable storage medium storing instructions that cause a processor to determine, for a conversion between a current video block of a video that is a chroma block coded with a cross-component prediction mode and a bitstream of the video, model parameters for a cross-component prediction model for the current video block and perform the conversion based on the determining, wherein during the determining, resampling more than one row of neighbor samples of the current video block or more than one column of neighbor samples of the current video block is applied.

Aspects of the present disclosure include an apparatus for processing video data comprising a processor and a non-transitory memory with instructions thereon, wherein the instructions upon execution by the processor, cause the processor to determine, for a conversion between a current video block of a video that is a chroma block coded with a cross-component prediction mode and a bitstream of the video, model parameters for a cross-component prediction model for the current video block and perform the conversion based on the determining, wherein the model parameters are based on neighboring samples of the current video block, wherein at least one of a number or positions of the neighboring samples are dependent on at least one of a block width or a block height of the current video block.

Aspects of the present disclosure include a non-transitory computer-readable recording medium storing a bitstream of a video which is generated by a method performed by a video processing apparatus, wherein the method comprises determining, for a conversion between a current video block of a video that is a chroma block coded with a cross-component prediction mode and a bitstream of the video, model parameters for a cross-component prediction model for the current video block and generating the bitstream from the current video block based on the determining, wherein the model parameters are based on neighboring samples of the current video block, wherein at least one of a number or positions of the neighboring samples are dependent on at least one of a block width or a block height of the current video block.

Aspects of the present disclosure include a non-transitory computer-readable storage medium storing instructions that cause a processor to determine, for a conversion between a current video block of a video that is a chroma block coded with a cross-component prediction mode and a bitstream of the video, model parameters for a cross-component prediction model for the current video block and perform the conversion based on the determining, wherein the model parameters are based on neighboring samples of the current video block, wherein at least one of a number or positions of the neighboring samples are dependent on at least one of a block width or a block height of the current video block.

Aspects of the present disclosure include an apparatus for processing video data comprising a processor and a non-transitory memory with instructions thereon, wherein the instructions upon execution by the processor, cause the processor to determine, for a conversion between a current video block of a video that is a chroma block coded with a cross-component prediction mode and a bitstream of the video, model parameters for a cross-component prediction model for the current video block and perform the conversion based on the determining, wherein, during the determining, performing a bit-depth shift operation is applied.

Aspects of the present disclosure include a non-transitory computer-readable recording medium storing a bitstream of a video which is generated by a method performed by a video processing apparatus, wherein the method comprises determining, for a conversion between a current video block of a video that is a chroma block coded with a cross-component prediction mode and a bitstream of the video, model parameters for a cross-component prediction model for the current video block and generating the bitstream from the current video block based on the determining, wherein, during the determining, performing a bit-depth shift operation is applied.

Aspects of the present disclosure include a non-transitory computer-readable storage medium storing instructions that cause a processor to determine, for a conversion between a current video block of a video that is a chroma block coded with a cross-component prediction mode and a bitstream of the video, model parameters for a cross-component prediction model for the current video block and perform the conversion based on the determining, wherein, during the determining, performing a bit-depth shift operation is applied Aspects of the present disclosure include an apparatus for processing video data comprising a processor and a non-transitory memory with instructions thereon, wherein the instructions upon execution by the processor, cause the processor to determine, for a conversion between a current video block of a video that is a chroma block coded with a cross-component prediction mode and a bitstream of the video, model parameters for a cross-component prediction model for the current video block using a non-linear model and perform the conversion based on the determining.

Aspects of the present disclosure include a non-transitory computer-readable recording medium storing a bitstream of a video which is generated by a method performed by a video processing apparatus, wherein the method comprises determining, for a conversion between a current video block of a video that is a chroma block coded with a cross-component prediction mode and a bitstream of the video, model parameters for a cross-component prediction model for the current video block using a non-linear model and generating the bitstream from the current video block based on the determining.

Aspects of the present disclosure include a non-transitory computer-readable storage medium storing instructions that cause a processor to determine, for a conversion between a current video block of a video that is a chroma block coded with a cross-component prediction mode and a bitstream of the video, model parameters for a cross-component prediction model for the current video block using a non-linear model and perform the conversion based on the determining.

Aspects of the present disclosure include an apparatus for processing video data comprising a processor and a non-transitory memory with instructions thereon, wherein the instructions upon execution by the processor, cause the processor to determine, for a conversion between a current video block of a video that is a chroma block coded with a cross-component prediction mode and a bitstream of the video, model parameters for a cross-component prediction model for the current video block and perform the conversion based on the determining, wherein, during the determining, selecting neighbor samples for a cross-component prediction is applied.

Aspects of the present disclosure include a non-transitory computer-readable recording medium storing a bitstream of a video which is generated by a method performed by a video processing apparatus, wherein the method comprises determining, for a conversion between a current video block of a video that is a chroma block coded with a cross-component prediction mode and a bitstream of the video, model parameters for a cross-component prediction model for the current video block and generating the bitstream from the current video block based on the determining, wherein, during the determining, selecting neighbor samples for a cross-component prediction is applied.

Aspects of the present disclosure include a non-transitory computer-readable storage medium storing instructions that cause a processor to determine, for a conversion between a current video block of a video that is a chroma block coded with a cross-component prediction mode and a bitstream of the video, model parameters for a cross-component prediction model for the current video block and perform the conversion based on the determining, wherein, during the determining, selecting neighbor samples for a cross-component prediction is applied.

Aspects of the present disclosure include an apparatus for processing video data comprising a processor and a non-transitory memory with instructions thereon, wherein the instructions upon execution by the processor, cause the processor to determine, for a conversion between a current video block of a video that is a chroma block coded with a cross-component prediction mode and a bitstream of the video, model parameters for a cross-component prediction model for the current video block and perform the conversion based on the determining, wherein, during the determining, filtering neighbor samples for a cross-component prediction is applied.

Aspects of the present disclosure include a non-transitory computer-readable recording medium storing a bitstream of a video which is generated by a method performed by a video processing apparatus, wherein the method comprises determining, for a conversion between a current video block of a video that is a chroma block coded with a cross-component prediction mode and a bitstream of the video, model parameters for a cross-component prediction model for the current video block and generating the bitstream from the current video block based on the determining, wherein, during the determining, filtering neighbor samples for a cross-component prediction is applied.

Aspects of the present disclosure include a non-transitory computer-readable storage medium storing instructions that cause a processor to determine, for a conversion between a current video block of a video that is a chroma block coded with a cross-component prediction mode and a bitstream of the video, model parameters for a cross-component prediction model for the current video block and perform the conversion based on the determining, wherein, during the determining, filtering neighbor samples for a cross-component prediction is applied.

Aspects of the present disclosure include an apparatus for processing video data comprising a processor and a non-transitory memory with instructions thereon, wherein the instructions upon execution by the processor, cause the processor to determine, for a conversion between a current video block of a video that is a chroma block and a bitstream of the video, utilizing one or more models for a cross-component prediction associated with a cross-component prediction mode and perform the conversion based on the determining.

Aspects of the present disclosure include a non-transitory computer-readable recording medium storing a bitstream of a video which is generated by a method performed by a video processing apparatus, wherein the method comprises determining, for a conversion between a current video block of a video that is a chroma block and a bitstream of the video, utilizing one or more models for a cross-component prediction associated with a cross-component prediction mode and generating the bitstream from the current video block based on the determining.

Aspects of the present disclosure include a non-transitory computer-readable storage medium storing instructions that cause a processor to determining, for a conversion between a current video block of a video that is a chroma block and a bitstream of the video, utilizing one or more models for a cross-component prediction associated with a cross-component prediction mode and performing the conversion based on the determining.

Aspects of the present disclosure include an apparatus for processing video data comprising a processor and a non-transitory memory with instructions thereon, wherein the instructions upon execution by the processor, cause the processor to determine, for a conversion between a current video block of a video that is a chroma block and a bitstream of the video, a first prediction for the current video block based on a first model for a cross-component prediction associated with a cross-component prediction mode and a second prediction for the current video block based on a second model for a non-cross-component prediction associated with a non-cross-component prediction mode and perform the conversion based on the determining.

Aspects of the present disclosure include a non-transitory computer-readable recording medium storing a bitstream of a video which is generated by a method performed by a video processing apparatus, wherein the method comprises determining, for a conversion between a current video block of a video that is a chroma block and a bitstream of the video, a first prediction for the current video block based on a first model for a cross-component prediction associated with a cross-component prediction mode and a second prediction for the current video block based on a second model for a non-cross-component prediction associated with a non-cross-component prediction mode and generating the bitstream from the current video block based on the determining.

Aspects of the present disclosure include a non-transitory computer-readable storage medium storing instructions that cause a processor to determine, for a conversion between a current video block of a video that is a chroma block and a bitstream of the video, a first prediction for the current video block based on a first model for a cross-component prediction associated with a cross-component prediction mode and a second prediction for the current video block based on a second model for a non-cross-component prediction associated with a non-cross-component prediction mode and perform the conversion based on the determining.

Aspects of the present disclosure include the following features.

To solve the above problems and some other problems not mentioned, methods as summarized below are disclosed. The inventions should be considered as examples to explain the general concepts and should not be interpreted in a narrow way. Furthermore, these inventions can be applied individually or combined in any manner.

In the following discussion, blockWidth, and blockHeight represent the width and height of the current block, respectively.

CCLM may refer to any kinds of CCLM modes, such as CCLM-L, CCLM-T, CCLM-LT, or multi-model CCLM.

1. Regarding the beta value derivation of cross-component predictions for solving the $1^{st}$ problem, one or more of the following approaches are disclosed:

1) In one example, the parameter "beta" may be calculated based on a function such as average/mid/median/mean luma/chroma values from all neighbors.
2) In one example, the parameter "beta" may be calculated based on a function such as average/mid/median/mean luma/chroma values from a portion of more than one neighbors.
3) In one example, "beta" derivation may be dependent on derived chroma value(s) and/or derived luma value(s). A chroma or luma derived value represent a value derived from reconstructed chroma or luma samples.
   a. In one example, the calculation of "beta" may be dependent on a derived chroma value.
   b. In one example, the calculation of "beta" may be dependent on a derived chroma value and a parameter dependent on a derived luma value.
   c. For example, a derived value (e.g., derived luma value or derived chroma value) may be calculated as (min+max+offset)>>shift, wherein,
      i. For example, shift may be a constant, e.g., 2, 4, and etc.
      ii. For example, offset may be a constant, e.g., 0, 1, 2, and etc.
      iii. For example, offset may be dependent on the value of "shift", e.g., offset is equal to (1<<shift)>>1.
      iv. For example, min may be the smallest value among all neighbor samples or a subset of neighbor samples.
         a) Additionally, max may be the greatest value among all neighbor samples or a subset of neighbor samples.
      v. For example, min may be the average of N smallest neighbor samples among all neighbor samples or a subset of neighbor samples., where N is a constant, such as N=2.
         a) Additionally, max may be the average of M greatest neighbor samples among all neighbor samples or a subset of neighbor samples., where M is a constant, such as M=2.
   d. For example, the derived sample value may be calculated as (S+offset)>>shift, wherein,
      i. For example, shift may be dependent on the number of samples that used for the above calculation.
      ii. For example, shift may be a constant, e.g., 2, 4, and etc.
      iii. For example, offset may be a constant, e.g., 0, 1, 2, and etc.
      iv. For example, offset may be dependent on the value of "shift", e.g., offset is equal to (1<<shift)>>1.
      v. For example, S may be calculated as the sum of the values of L neighbor samples, wherein L=a*blockWidth, or b*blockHeight, or c*(blockWidth+blockHeight), and a, b, and c are integers.
4) For example, the disclosed methods may be appropriate single or multiple model calculations.
   a. For example, if multiple models are used, the disclosed methods may be applied to either one (or some, or all) of the model derivation.
5) For example, the disclosed methods may be applied to any kinds of CCLM mode, such as CCLM-LT, CCLM-T or CCLM-L.

6) Beta may be calculated by the derived values as: beta=derivedChroma−((alpha*derivedLuma)>>shiftX), wherein "alpha" denotes the scaling factor applying to luma reconstructed value, "shiftX" denotes a constant value, and "derivedChroma" and "derivedLuma" may be calculated based on the disclosed methods.
7) In above examples, the neighboring samples are those adjacent from current chroma block and/or corresponding luma block of the current chroma block.
   a. Alternatively, the neighboring samples are those non-adjacent from current chroma block and/or corresponding luma block of the current chroma block.
      i. In one example, indication of the non-adjacent samples may be signaled or derived on-the-fly.
2. Suppose α used in a CCLM mode is derived as $$\alpha = \frac{Y_1 - Y_2}{X_1 - X_2}.$$

Regarding the higher accuracy/robust model derivation for cross-component predictions for solving the $2^{nd}$ problem, one or more of the following approaches are disclosed:
1) In one example, when multiple-model cross-component prediction is used, the derivation of $X_2$ and/or $Y_2$ for a particular model/group, may be dependent on (e.g. equal to) a function (e.g., the average/mid/median/mean) of N smallest neighbor samples belong to this group (or corresponding to this model).
   a. Similarly, when multiple-model cross-component prediction is used, the derivation of $X_1$ and/or $Y_1$ for a particular model/group, may be dependent on (e.g. equal to) a function (e.g., the average/mid/median/mean) of N greatest neighbor samples belong to this group (or corresponding to this model).
   b. For example, N may be a constant, such as N=2.
   c. For example, N may be dependent on coded information, e.g., the block width, and/or block height.
   d. For example, N may be dependent on how many neighbor samples belong to this group, e.g., N=1 if there are less than T counted neighbor samples belong to this group, and N=2 if the number of counted neighbor samples belong to this group is greater than or equal to T, where by T is a constant, such as T=4.
   e. For example, the above mentioned "counted neighbor sample" may be neighbor sample which satisfy a pre-determined condition, e.g., conditioned on the location, the sample value, and etc.
2) In one example, more than one rows/columns of luma neighbors which may be resampled may be taken into account for model derivation.
   a. Similarly, more than one rows/columns of chroma neighbors may be taken into account for model derivation.
3) In one example, the number and positions of neighboring samples used for model calculation may be dependent on the block width and/or height.
4) In one example, internal high bit-depth division operation may be used for model derivation.
   a. For example, the numbers may be left shifted by K bits before the division operation and right-shifted by K bits after the division operation.
5) In one example, a non-linear model may be used for cross-component predictions.
   a. For example, a chroma sample C may be predicted by a function f on a luma reconstructed sample (may be down-sampled) Y as C=f(Y), where f is a non-linear function, such as $f(Y)=aY^2+bY+c$ or f(Y)=clip3(minC, maxC, aY+b).
3. Regarding the neighbor selection for model derivation for cross-component predictions for solving the $3^{rd}$ problem, following approaches are disclosed:
1) In one example, selected neighbor samples may be used for cross-component predictions.
   a. For example, a group of selected neighbor samples may be derived based on the reference line index of the multiple reference line (MRL) coding tool.
      i. For example, the reference sample located in the same lines/rows indicated by the reference line index of the multiple reference line (MRL) coding tool, may be used for cross-component model calculation.
      ii. For example, suppose the reference line index of the multiple reference line (MRL) coding tool is denoted as "mrlIdx", the reference sample located in the k-th neighbor lines/rows wherein k="mrlIdx>>factor" may be used for cross-component model calculation, wherein "factor" is a constant, such as "factor" equal to 1.
2) In one example, filtered neighbor samples may be used for cross-component predictions.
   a. For example, neighbor samples may be filtered according to a rule, and then used for the model derivation for cross-component prediction.
   b. For example, a portion of neighbor samples may be filtered and used for the model derivation for cross-component prediction.
   c. The filter may be a low pass filter.
   d. The filter may be a 1-D filter or a 2-D filter.
   e. Different filters may be applied on luma and chroma neighbor samples.
3) For example, the above-mentioned method may be applied to either neighbor rows or neighbor columns, or both of them.
4) For example, the above-mentioned method could be applied to either single tree block partition, or dual tree block partition.
   a. Furthermore, if the above-mentioned method is applied to dual tree block partition coding, the collocated luma block (which used to derive mrlIdx for current chroma coding) may be fetched based on the top-left (or center) position associated with the current chroma block.
5) For example, if multiple models are used, the above-mentioned method may be applied to either one (or some, or all) of the models.
4. Regarding multiple models cross-component predictions for solving the $4^{th}$ problem, one or more of the following approaches are disclosed:
1) In one example, more than one models may be allowed/used for a cross-component prediction mode.

a. In one example, for a current block, it may be allowed to choose from a cross-component prediction mode classifying neighbors into one group or a cross-component prediction mode classifying neighbors into N groups.
  i. Alternatively, for a current block, it may be allowed to choose from a cross-component prediction mode classifying neighbors into M group or a cross-component prediction mode classifying neighbors into N groups, wherein M>1 and N>1.
b. In one example, whether to use single-model or multiple-model (more than one models) or how many models may be explicit signalled by one or multiple syntax element(s) (e.g., a flag, or an index).
  i. Alternatively, whether to use M-model or N-model cross-component prediction may be explicit signalled by a syntax element.
c. In one example, whether to use single-model or multiple-model (more than one models) or how many models may be on-the-fly (adaptively) determined according to a rule (e.g., without signalling a syntax element).
  i. Alternatively, whether to use M-model or N-model cross-component prediction may be on-the-fly determined.
d. In one example, whether to use a X-model cross-component prediction method or Y-model cross-component prediction method (Y!=X) may be dependent on a rule based on neighboring samples.
  i. For example, X>=1.
  ii. For example, Y>=1.
  iii. For example, the rule may be dependent on a cost (e.g., SAD, SATD, MSE) value.
    a) For example, a cost value may be calculated for each model on-the-fly.
    b) For example, the cost value may be calculated dependent the distortion between the original neighbor reconstructed values and the model fitted/predicted neighbor values. E.g. the distortion may be derived as a sum of absolute difference (SAD), or a sum of squared difference (SSD).
    c) For example, the cross-component prediction method which results in a smaller cost may be finally chosen.
e. In one example, how many groups/models is used for a cross-component prediction mode may be dependent on a predefined number.
  i. For example, M groups/models are always used for cross-component prediction mode A1, and N groups/models are always used for cross-component prediction mode A2, wherein A1 and A2 are two different cross-component prediction modes allowed in the codec.
    a) For example, M and N are constants.
    b) For example, M=2, and N=3.
    c) For example, M=1, and N=2.
    d) For example, A1/A2 could be any LM mode from {LM_A, LM_L, CCLM, . . . }.
    e) For example, single-model LM_A (denoted by mode A1), and two-model LM_A (denoted by mode A2) may be always allowed in a codec. And a coding block could be coded with either single-mode LM_A or two-model LM_A (but never both).
    f) For example, two-model LM_A (denoted by mode A1), and three-model LM_L (denoted by mode A2) may be always allowed in a codec. And a coding block could be coded with either two-mode LM_A or three-model LM_L (but never both).
  ii. Alternatively, for a specified cross-component prediction mode, how many groups/models are used to code the current coding block may be determined on-the-fly (other than predefined/fixed).
    a) For example, a cross-component prediction mode allows both single-model and two-model approaches. Therefore, in such case, a coding block using this mode may be coded with either single-model or two-model methods, depending on a certain criteria/rule (such as determined by whether single-model or two-model fits the neighbors better).
f. In one example, how many groups/models is used for a cross-component prediction mode may be adaptively determined by the distributions/activities/diversities of neighbors.
  i. For example, whether to trigger multiple-model or whether to use M-model or N-model cross-component prediction may be dependent on how flat the neighbors is.
    a) For example, M>=1.
    b) For example, N>=1.
    c) For example, a function is applied on neighboring samples to determine the how flat the neighboring samples are. E.g. the function may calculate the variance of the neighboring samples. The neighboring samples is more "flat" if the variance is smaller.
  ii. For example, if the distribution of neighbor samples/pixels is flat enough, then the multiple-model cross-component prediction may be disallowed.
g. In one example, whether to trigger multiple-model (i.e., more than one models) cross-component prediction may be dependent on how many neighbors are counted.
  i. For example, if the number of counted neighbors is greater than (or, no less than) a threshold, then the multiple-model cross-component prediction may be used.
  ii. For example, if the number of counted neighbors is less than (or, no greater than) a threshold, then the multiple-model cross-component prediction may be disallowed.
  iii. For example, the above mentioned "counted neighbors" may be the neighbor pixels/samples that are used for the cross-component prediction mode.
  iv. The threshold may depend on the dimensions of the current block.
2) In one example, different models may take different neighbor samples for model calculation.
  a. For example, what neighbors are used for the model calculation may be dependent on neighbor samples classification, e.g., neighbor samples may be classified into different groups based on the sample values, or any functions on sample values, such as the mean values, or variances, or the distributions, or the activities, or the diversities.
  b. For example, one of the models may use neighbor samples from both left and above for model calculation. And, another model may use neighbor samples from left (or, above) only for model calculation.
  c. For example, one of the models may use M neighbor samples for model calculation. And, another model may use N neighbor samples for model calculation.
    i. For example, M may be dependent on block width, and/or block height.
    ii. For example, N may be dependent on block width, and/or block height.
3) In one example, more than one cross-component prediction modes may be applied to a coding block.
  a. In one example, different cross-component prediction modes classify neighbors into different number of groups.
  b. For example, a first mode considers the neighbors as an entire group and derives a single model for the entire block. While a second mode splits the neighbors into T groups and derive T models for the entire block, i.e., one model for one group, wherein T is greater than one.
  c. In one example, multiple modes may be competed based on the neighbors samples (e.g., based on costs calculation as disclosed in bullet 4). In this case, no explicit syntax element is signalled to specify which mode among multiple modes is finally chosen for the current block coding.
  d. Alternatively, a syntax element (e.g., an index, or a flag) may be signalled in the bitstream to specify which mode (with X models wherein X>=1) is finally chosen for the current block coding.
    i. For example, the syntax element may be coded with unary (or truncated unary, or truncated rice, or truncated binary, or fix-length) binarization process.
    ii. For example, one or more bins of the syntax element may be context coded.
    iii. For example, for those cross-component prediction modes which classify neighbors into more than one group, its mode index may be greater than (or less than) the mode index of the cross-component prediction mode which treat neighbors as an entire group.
    iv. Whether to/how to signal the syntax element may depend on dimensions of the current block.
      a) For example, the syntax element may be only signalled in case of the current block is greater than a pre-defined size.
      b) For example, the syntax element may be only signalled in case of the sum of width and height of the current block is greater than a pre-defined threshold.
      c) For example, the syntax element may be only signalled in case the width is greater than a pre-defined threshold and/or height of the current block is greater than a pre-defined threshold.
      d) "greater than" may be replaced by "lower than" or "no greater than" or "no lower than".
5. Regarding combining cross-component prediction with other prediction modes for solving the 5$^{th}$ problem, one or more of the following approaches are disclosed:
  a. For example, the "non-cross-component prediction" may be a prediction block derived by intra DM mode.
  b. For example, the "non-cross-component prediction" may be a prediction block derived by any intra prediction mode other than cross-component prediction mode.
  c. In one example, how to generate the cross-component prediction (which used for blending/mixing) may be dependent on a predefined cross-component prediction mode.
  d. In one example, how to generate the cross-component prediction (which used for blending/mixing) may be dependent on an adaptive selected cross-component prediction mode (e.g., a cross-component prediction mode determined by the cost calculated from neighbors).
  e. In one example, a syntax element (e.g., a flag) may be signalled in the bitstream to specify whether the combined method (e.g., combining cross-component prediction with a particular prediction mode) is finally chosen for the current block coding.
    i. Alternatively, furthermore, the syntax element may be conditionally signalled.
    ii. For example, the syntax element may be only signalled in case of a particular prediction mode (e.g., intra DM mode) is used for the current block.
    iii. For example, the syntax element may be only signalled in case of some particular prediction modes (e.g., any intra mode excluding cross-component intra prediction mode) is used for the current block.
    iv. Whether to/how to signal the syntax element may depend on dimensions of the current block.
      a) For example, the syntax element may be only signalled in case of the current block is greater than a pre-defined size.
      b) For example, the syntax element may be only signalled in case of the sum of width and height of the current block is greater than a pre-defined threshold.
      c) For example, the syntax element may be only signalled in case the width is greater than a pre-defined threshold and/or height of the current block is greater than a pre-defined threshold.
      d) "greater than" may be replaced by "lower than" or "no greater than" or "no lower than".
  f. In the above statements, a third prediction of the current block is generated by "Mixture" or "combining" of a first prediction and a second prediction and the third prediction is then used to determine the reconstruction with residues at decoder. "Mixture" or "combining" of the first prediction and the second prediction and the third prediction may refer to:
    i. A third prediction is generated as a weighted sum of the first prediction and the second prediction.
      a) The weighting values may be fixed such as (½, ½)
      b) The weighting values may vary for different positions in a block.
    ii. A third prediction is generated as spatial mixture of the first prediction and the second prediction.

a) For some positions, the third prediction is set equal to the first prediction. For some other positions, the third prediction is set equal to the second prediction.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

The previous description is provided to enable any person having ordinary skill in the art to practice the various aspects described herein. Various modifications to these aspects will be readily apparent to a person having ordinary skill in the art, and the generic principles defined herein may be applied to other aspects. The claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to a person having ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of video processing, comprising:
   determining, for a conversion between a current video block of a video that is a chroma block and a bitstream of the video, utilizing one or more models for a cross-component prediction associated with a cross-component prediction mode, wherein utilizing the one or more models comprises utilizing a first model for first neighbor samples of the current video block and a second model for second neighbor samples of the current video block for the cross-component prediction; and
   performing the conversion based on the determining.

2. The method of claim 1, further comprising determining to utilize the one or more models based on neighbor samples classifications of at least one of sample values, mean values of the sample values, variances of the sample values, distributions of sample values, activities, or diversities.

3. The method of claim 1, wherein the first model uses a first number of neighbor samples for calculation and the second model uses a second number of neighbor samples for calculation.

4. The method of claim 3, wherein at least one of the first number or the second number is dependent on a block width of the current video block or a block height of the current video block.

5. The method of claim 1, further comprising:
   applying more than one cross-component prediction modes to the current video block.

6. The method of claim 5, wherein a first cross-component prediction mode of the more than one cross-component prediction modes classifies neighbors into a first number of groups and a second cross-component prediction mode of the more than one cross-component prediction modes classifies the neighbors into a second number of groups.

7. The method of claim 6, wherein the first cross-component prediction mode utilizes a first model for the current video block and the second cross-component prediction mode utilizes a plurality of models for the current video block.

8. The method of claim 5, wherein a syntax element indicating one or more selected modes of the more than one cross-component prediction modes for the current video block is included in the bitstream.

9. The method of claim 8, wherein the syntax element is coded with a unary, a truncated unary, a truncated rice, a truncated binary, or a fixed length binarization process.

10. The method of claim 8, wherein one or more bins of the syntax element are context coded.

11. The method of claim 5, wherein a first cross-component prediction mode of the more than one cross-component prediction modes has a first mode index and a second cross-component prediction mode of the more than one cross-component prediction modes has a second mode index, the first cross-component prediction mode classifies neighbors into a plurality of groups, the second cross-component prediction mode classifies neighbors into a group, and the first mode index is greater than the second mode index.

12. The method of claim 8, wherein the syntax element is included in the bitstream based on dimensions of the current video block.

13. The method of claim 12, wherein the syntax element is included in the bitstream in response to a size of the current video block is larger than, or larger than or equal to, a threshold size.

14. The method of claim 12, wherein the syntax element is included in the bitstream in response to a sum of a width of the current video block and a height of the current video block is larger than, or larger than or equal to, a threshold, or
   the syntax element is included in the bitstream in response to a width of the current video block is larger than, or larger than or equal to, a threshold width or a height of the current video block is larger than, or larger than or equal to, a threshold height.

15. The method of claim 1, wherein the conversion includes encoding the current video block into the bitstream.

16. The method of claim 1, wherein the conversion includes decoding the current video block from the bitstream.

17. The method of claim 1, wherein the conversion includes generating the bitstream from the current video block; and the method further comprises:

storing the bitstream in a non-transitory computer-readable recording medium.

18. An apparatus for processing video data comprising a processor and a non-transitory memory with instructions thereon, wherein the instructions upon execution by the processor, cause the processor to:

determining, for a conversion between a current video block of a video that is a chroma block and a bitstream of the video, utilizing one or more models for a cross-component prediction associated with a cross-component prediction mode, wherein utilizing the one or more models comprises utilizing a first model for first neighbor samples of the current video block and a second model for second neighbor samples of the current video block for the cross-component prediction; and performing the conversion based on the determining.

19. A non-transitory computer-readable storage medium storing instructions that cause a processor to:

determining, for a conversion between a current video block of a video that is a chroma block and a bitstream of the video, utilizing one or more models for a cross-component prediction associated with a cross-component prediction mode, wherein utilizing the one or more models comprises utilizing a first model for first neighbor samples of the current video block and a second model for second neighbor samples of the current video block for the cross-component prediction; and performing the conversion based on the determining.

20. A method for storing a bitstream of a video, comprising:

determining utilizing one or more models for a cross-component prediction associated with a cross-component prediction mode, wherein utilizing the one or more models comprises utilizing a first model for first neighbor samples of a current video block of the video that is a chroma block and a second model for second neighbor samples of the current video block for the cross-component prediction:

generating the bitstream from the current video block based on the determining; and storing the bitstream in a non-transitory computer-readable recording medium.

* * * * *